US008524887B2

(12) United States Patent
Buchanan et al.

(10) Patent No.: US 8,524,887 B2
(45) Date of Patent: Sep. 3, 2013

(54) REGIOSELECTIVELY SUBSTITUTED CELLULOSE ESTERS PRODUCED IN A TETRAALKYLAMMONIUM ALKYLPHOSPHATE IONIC LIQUID PROCESS AND PRODUCTS PRODUCED THEREFROM

(75) Inventors: Charles Michael Buchanan, Bluff City, TN (US); Norma Lindsey Buchanan, Bluff City, TN (US); Elizabeth Guzman-Morales, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 370 days.

(21) Appl. No.: 12/539,817

(22) Filed: Aug. 12, 2009

(65) Prior Publication Data

US 2010/0267942 A1    Oct. 21, 2010

Related U.S. Application Data

(60) Provisional application No. 61/169,560, filed on Apr. 15, 2009.

(51) Int. Cl.
    *C08B 1/00* (2006.01)
    *C08B 3/00* (2006.01)
    *C07H 1/06* (2006.01)
    *C07H 1/08* (2006.01)

(52) U.S. Cl.
    USPC ............ 536/56; 536/58; 536/124; 536/127

(58) Field of Classification Search
    USPC .................................... 536/56, 58, 124, 127
    See application file for complete search history.

(56) References Cited

U.S. PATENT DOCUMENTS

| | | | |
|---|---|---|---|
| 1,924,238 A | 8/1933 | Graenacher | |
| 1,943,176 A | 1/1934 | Graenacher | |
| 1,996,754 A | 4/1935 | Dreyfus et al. | |
| 2,563,506 A | 8/1951 | Werntz | |
| 3,505,313 A | 4/1970 | Ichiro | |
| 4,501,888 A | 2/1985 | Schmidt | |
| 4,592,885 A | 6/1986 | Ichino et al. | |
| 4,597,798 A | 7/1986 | Kamata et al. | |
| 5,093,486 A | 3/1992 | Diamantoglou | |
| 5,610,233 A | 3/1997 | Sharma | |
| 5,876,567 A | 3/1999 | Yamamoto et al. | |
| 5,929,229 A | 7/1999 | Edgar et al. | |
| 5,977,347 A | 11/1999 | Shuto et al. | |
| 6,500,215 B1 | 12/2002 | Login et al. | |
| 6,596,130 B2 | 7/2003 | Westman | |
| H2083 H | 10/2003 | Bogard et al. | |
| 6,808,557 B2 | 10/2004 | Holbrey et al. | |
| 6,824,599 B2 | 11/2004 | Swatloski et al. | |
| 6,827,773 B2 | 12/2004 | Cuculo et al. | |
| 6,872,766 B2 | 3/2005 | Schunk et al. | |
| 6,939,974 B2 | 9/2005 | Earle et al. | |
| 7,122,660 B1 | 10/2006 | Nakanishi et al. | |
| 7,172,713 B2 | 2/2007 | Arai et al. | |
| 7,208,605 B2 | 4/2007 | Davis, Jr. | |
| 7,252,791 B2 | 8/2007 | Wasserscheid et al. | |
| 7,351,339 B2 | 4/2008 | Maase et al. | |
| 7,501,522 B2 | 3/2009 | Maase et al. | |
| 7,550,520 B2 | 6/2009 | Daly et al. | |
| 7,605,271 B2 | 10/2009 | Uchimura et al. | |
| 7,879,994 B2 | 2/2011 | Buchanan et al. | |
| 7,919,631 B2 | 4/2011 | Buchanan et al. | |
| 2003/0036493 A1* | 2/2003 | Alam et al. ................ 510/309 |
| 2003/0094380 A1 | 5/2003 | Moulton | |
| 2004/0035293 A1 | 2/2004 | Davis, Jr. | |
| 2004/0233362 A1 | 11/2004 | Kashima | |
| 2005/0020857 A1 | 1/2005 | Volland et al. | |
| 2005/0133953 A1 | 6/2005 | Yamazaki et al. | |
| 2005/0192434 A1 | 9/2005 | Buchanan et al. | |
| 2005/0288484 A1 | 12/2005 | Holbrey et al. | |
| 2006/0004192 A1 | 1/2006 | Oya et al. | |
| 2006/0062749 A1 | 3/2006 | Shelton et al. | |
| 2006/0094615 A1 | 5/2006 | Hecht et al. | |
| 2006/0149074 A1 | 7/2006 | Maase et al. | |
| 2006/0221280 A1 | 10/2006 | Oka et al. | |

(Continued)

FOREIGN PATENT DOCUMENTS

CN    1417407 A    5/2003
CN    1491974 A    4/2004

(Continued)

OTHER PUBLICATIONS

USPTO Office Action dated Jun. 22, 2011 for copending U.S. Appl. No. 12/189,421.
USPTO Office Action dated Jun. 9, 2011 for copending U.S. Appl. No. 12/189,415.
USPTO Office Action dated May 27, 2011 for copending U.S. Appl. No. 12/189,753.
USPTO Notice of Allowance dated Jul. 26, 2011 for copending U.S. Appl. No. 12/539,814.
Acemoglu, Murat, et al.; "Synthesis of regioselectively substituted cellulose derivatives and applications in chiral chromatography"; Chirality (1998), 10(4), 294-306.
Fujimoto, et al.; "13C NMR spectral studies on the distribution of substituents in some cellulose derivatives"; J. Polym. Sci.: Part A: Polymer Chemistry Edition, 1986, 24, 2981-2993.

(Continued)

*Primary Examiner* — Patrick Lewis
*Assistant Examiner* — Everett White
(74) *Attorney, Agent, or Firm* — Polly C. Owen; Steven A Owen

(57) ABSTRACT

This invention relates a cellulose solution comprising cellulose and at least one tetraalkylammonium alkylphosphate and processes to produce the cellulose solution. Another aspect of this invention relates to shaped articles prepared from a cellulose solution comprising cellulose and at least one tetraalkylammonium alkylphosphate. Another embodiment of this invention relates to compositions comprising derivatives of cellulose prepared from a cellulose solution comprising at least one tetraalkylammonium alkylphosphate. Another embodiment of this invention relates to compositions comprising regioselectively substituted cellulose esters prepared from a cellulose solution comprising cellulose and at least one tetraalkylammonium alkylphosphate. In another embodiment of the invention, the cellulose esters of the present invention are used as protective and compensation films for liquid crystalline displays.

33 Claims, 15 Drawing Sheets

(56) References Cited

U.S. PATENT DOCUMENTS

| | | |
|---|---|---|
| 2006/0226396 A1 | 10/2006 | Majumdar et al. |
| 2006/0241287 A1 | 10/2006 | Hecht et al. |
| 2007/0006774 A1 | 1/2007 | Rogers et al. |
| 2007/0010688 A1 | 1/2007 | Ko et al. |
| 2007/0035682 A1 | 2/2007 | Ito et al. |
| 2007/0054216 A1 | 3/2007 | Habu |
| 2007/0073051 A1 | 3/2007 | Myllymaki et al. |
| 2007/0093462 A1 | 4/2007 | Rogers et al. |
| 2007/0112185 A1 | 5/2007 | Myllymaki et al. |
| 2007/0142642 A1 | 6/2007 | Szarvas et al. |
| 2007/0142646 A1 | 6/2007 | Maase et al. |
| 2007/0200987 A1 | 8/2007 | Yoda et al. |
| 2007/0215300 A1 | 9/2007 | Upfal et al. |
| 2007/0222927 A1 | 9/2007 | Uehara et al. |
| 2007/0225190 A1 | 9/2007 | Scheibel et al. |
| 2007/0225191 A1 | 9/2007 | Scheibel et al. |
| 2007/0255064 A1 | 11/2007 | Szarvas et al. |
| 2008/0003444 A1 | 1/2008 | Oya |
| 2008/0023162 A1 | 1/2008 | Myllymaki et al. |
| 2008/0033187 A1 | 2/2008 | Zhao et al. |
| 2008/0164440 A1 | 7/2008 | Maase et al. |
| 2008/0188636 A1 | 8/2008 | Argyropoulos et al. |
| 2008/0190321 A1 | 8/2008 | Maase et al. |
| 2008/0192192 A1 | 8/2008 | Toyama et al. |
| 2008/0194807 A1 | 8/2008 | Buchanan et al. |
| 2008/0194808 A1 | 8/2008 | Buchanan et al. |
| 2008/0194834 A1 | 8/2008 | Buchanan et al. |
| 2008/0227162 A1 | 9/2008 | Varanasi et al. |
| 2008/0241536 A1 | 10/2008 | Luo et al. |
| 2008/0269477 A1 | 10/2008 | Stegmann et al. |
| 2008/0287684 A1 | 11/2008 | Exner et al. |
| 2009/0011473 A1 | 1/2009 | Varanasi et al. |
| 2009/0012297 A1 | 1/2009 | Pagoria et al. |
| 2009/0020112 A1 | 1/2009 | Massonne et al. |
| 2009/0032015 A1 | 2/2009 | Myllymaki et al. |
| 2009/0033839 A1 | 2/2009 | Fukuda |
| 2009/0050842 A1 | 2/2009 | Shelby et al. |
| 2009/0053429 A1 | 2/2009 | Sasada |
| 2009/0054638 A1 | 2/2009 | Shelby et al. |
| 2009/0062524 A1 | 3/2009 | Massonne et al. |
| 2009/0084509 A1 | 4/2009 | Luo et al. |
| 2009/0088564 A1 | 4/2009 | Luo et al. |
| 2009/0096962 A1 | 4/2009 | Shelton et al. |
| 2009/0171079 A1 | 7/2009 | Higuchi |
| 2009/0182138 A1 | 7/2009 | Massonne et al. |
| 2009/0187016 A1 | 7/2009 | Massone et al. |
| 2009/0198046 A1 | 8/2009 | Fanselow et al. |
| 2009/0203899 A1 | 8/2009 | Buchanan et al. |
| 2009/0221813 A1 | 9/2009 | Moellmann et al. |
| 2009/0326216 A1* | 12/2009 | Stegmann et al. ............ 536/56 |
| 2010/0029927 A1 | 2/2010 | Buchanan et al. |
| 2010/0055356 A1 | 3/2010 | Takeda et al. |
| 2010/0267942 A1 | 10/2010 | Buchanan et al. |
| 2012/0003403 A1 | 1/2012 | Wang et al. |
| 2012/0262650 A1 | 10/2012 | Buchanan et al. |
| 2012/0263889 A1 | 10/2012 | Buchanan et al. |
| 2012/0263890 A1 | 10/2012 | Buchanan et al. |

FOREIGN PATENT DOCUMENTS

| | | |
|---|---|---|
| CN | 1804161 | 7/2006 |
| CN | 1958616 A | 5/2007 |
| CN | 1978433 A | 6/2007 |
| CN | 101085838 | 12/2007 |
| CN | 101234197 | 8/2008 |
| CN | 101240085 A | 8/2008 |
| CN | 101284913 | 10/2008 |
| CN | 101285213 | 10/2008 |
| CN | 101289817 | 10/2008 |
| CN | 100471843 C | 2/2009 |
| CN | 101240085 C | 12/2009 |
| DE | 10 2006 028 165 A1 | 12/2007 |
| DE | 10 2007 035 322 A1 | 1/2009 |
| EP | 1 215 216 A1 | 6/2002 |
| EP | 1 860 201 A | 11/2007 |
| EP | 1 911 792 A1 | 4/2008 |
| EP | 1 911 829 A1 | 4/2008 |
| EP | 1911792 A1 | 4/2008 |
| EP | 2 072 530 A1 | 6/2009 |
| EP | 2072530 A1 | 6/2009 |
| FR | 2831171 A1 | 4/2003 |
| GB | 572 017 A | 9/1945 |
| GB | 581 046 A | 9/1946 |
| GB | 611 665 A | 11/1948 |
| GB | 689 194 A | 3/1953 |
| GB | 736 964 A | 9/1955 |
| JP | 6-329603 | 11/1994 |
| JP | 2002-275132 A | 9/2002 |
| JP | 2004-175785 A | 6/2004 |
| JP | 2005-089689 | 4/2005 |
| JP | 2005089689 A | 4/2005 |
| JP | 2006-137677 | 6/2006 |
| JP | 2006-137677 A | 6/2006 |
| JP | 2006-232959 | 9/2006 |
| JP | 2006232959 A | 9/2006 |
| JP | 2008-156623 A | 7/2008 |
| JP | 2008156623 A | 7/2008 |
| JP | 2008-266625 A | 11/2008 |
| JP | 2008-303319 A | 12/2008 |
| WO | WO 99/14160 A1 | 3/1999 |
| WO | WO 01/77081 A1 | 10/2001 |
| WO | WO 03/029329 A2 | 4/2003 |
| WO | WO 2004/083253 A1 | 9/2004 |
| WO | WO 2005/054297 A2 | 6/2005 |
| WO | WO 2005/070896 A1 | 8/2005 |
| WO | WO 2006/013869 A1 | 2/2006 |
| WO | WO 2006/021302 A1 | 3/2006 |
| WO | WO 2006/027069 A1 | 3/2006 |
| WO | WO 2006-027070 A1 | 3/2006 |
| WO | WO 2006/027070 A1 | 3/2006 |
| WO | WO 2006/038013 A2 | 4/2006 |
| WO | WO 2007/049485 A1 | 5/2007 |
| WO | WO 2007/101813 A1 | 9/2007 |
| WO | WO 2007-101813 A1 | 9/2007 |
| WO | WO 2007/111339 A1 | 10/2007 |
| WO | WO 2007/144282 A1 | 12/2007 |
| WO | WO 2007/147813 A1 | 12/2007 |
| WO | WO 2008/000666 A1 | 1/2008 |
| WO | WO 2008/043837 A1 | 4/2008 |
| WO | WO 2008/062209 A2 | 5/2008 |
| WO | WO 2008/090156 A1 | 7/2008 |
| WO | WO 2008/098037 A2 | 8/2008 |
| WO | WO 2008/100566 A1 | 8/2008 |
| WO | WO 2008/100577 A1 | 8/2008 |
| WO | WO 2008/114584 | 9/2008 |
| WO | 2008119770 A1 | 10/2008 |
| WO | WO 2008/119770 A1 | 10/2008 |
| WO | 2008133269 A1 | 11/2008 |
| WO | WO 2008/133269 A1 | 11/2008 |
| WO | WO 2008/143765 A2 | 11/2008 |
| WO | WO 2009/027250 A2 | 3/2009 |
| WO | WO 2009/029220 A1 | 3/2009 |
| WO | WO 2009/030950 A1 | 3/2009 |
| WO | WO 2009/062723 A1 | 5/2009 |
| WO | WO 2009/077452 A1 | 6/2009 |
| WO | WO 2009/101111 A1 | 8/2009 |
| WO | WO 2009/102305 A1 | 8/2009 |
| WO | WO 2009/102306 A1 | 8/2009 |
| WO | WO 2009/102307 A1 | 8/2009 |
| WO | WO 2010/120268 A1 | 10/2010 |

OTHER PUBLICATIONS

Heinze, et al.; "Synthesis and carboxymethylation of organo-soluble trifluoroacetates and formates of cellulose"; J.M. S.-Pure Appl. Chem. 1996, A33(5), 613-626.

Heinze, et al.; "Synthesis path versus distribution of functional groups in cellulose esters"; Macromol. Symp. 1998, 130, 271-283.

Heinze, Thomas, et al.; "Synthesis and subsequent reactions of cellulose-p-toluenesulfonic acid esters. Pool for new functional polymers."; Papier (Darmstadt) (1996), 50(12), 721-729.

Iwata, Tadahisa, et al.; "Conformational analysis of regioselectively substituted cellulose esters"; Sen'i Gakkaishi (1991), 47(8), 379-83.

Iwata, Tadahisa, et al.; "Preparation and NMR assignments of cellulose mixed esters regioselectively substituted by acetyl and propanoyl groups"; Carbohydrate Research (1992), 224, 277-83.

Kasuya, Natsuki, et al.; "Chiral discrimination with regioselectively substituted cellulose esters as chiral stationary phases"; Chirality (2000), 12(9), 670-674.

Klemm, D., et al.; "New procedures for regioselective synthesis and modification of trialkylsilylcelluloses"; Cellulosics: Materials for Selective Separations and Other Technologies, 1993, Chapter 26, 221-226.

Klemm, D., et al.; "Polyglucane derivatives with regular substitutent distribution"; Macromol. Symp. 1995, 99, 129-140.

Klemm, D., et al.; "Readily hydrolyzable cellulose esters as intermediates for the regioselective derivatization of cellulose"; Die Angewandte Makromolekulare Chemie 1992, 198, 155-164.

Klemm, D., et al.; "Readily hydrolyzable cellulose esters as intermediates for the regioselective derivatization of cellulose"; Cellulose Chem. Technol. 1990, 24, 667-678.

Klemm, D.O., et al.; "Silylated Cellulose Materials in Design of Supramolecular Structure of Ultrathin Films"; J.M.S.-Pure Appl. Chem. 1995, A32, 899-904.

Kondo, T.; "Preparation of 6-O-alkylcelluloses"; Carbohydr. Res. 1993, 238, 231-240.

Liebert, Tim, et al.; "Readily hydrolyzable cellulose esters as intermediates for the regioselective derivatization of cellulose. Part II Soluble, highly substituted cellulose trifluoroacetates."; Cellulose (London) (1994), 1(4), 249-258.

Mayumi, Ayaka, et al.; "Partial substitution of cellulose by ring-opening esterification of cyclic esters in a homogeneous system"; Journal of Applied Polymer Science (2006), 102(5), 4358-4364.

Nishio, Naotaka, et al.; "Preparation of high regioselectively monosubstituted carboxymethyl celluloses"; Cellulose Chemistry and Technology (2005), 39(5-6), 377-387.

Philipp, B., et al.; "Regioselective esterification and etherification of cellulose and cellulose derivatives. Part 2. Synthesis of regioselective cellulose esters."; Papier (Bingen, Germany) (1995), 49(2), 58-64.

Philipp, Burkart, et al.; "Regioselective derivatization of cellulose. Routes of synthesis, effects on properties, and areas of application."; Polymer News (1996), 21(5), 155-161.

Philipp, Burkhart, et al.; "Regioselective esterification and etherification of cellulose and cellulose derivatives. Part 1. Problems and descriptions of the reaction systems."; Papier (Bingen, Germany) (1995), 49(1), 3-7.

Philipp, Burkhart, et al.; "Untersuchungen Zur Sulfatierung Von Celluloseformiat Im Vergleich Zu Cellulose-Acetat Unter Homogenen Reaktionsbedingungen"; [Investigations on Sulfation of Cellulose Formate in Comparison with Cellulose Acetate under Homogeneous reaction conditions]; Cellulose Chemistry and Technology, 24, 667-678 (1990).

Wagenknecht, W., et al.; "Regioselective homogeneous sulfaction of cellulose via unstable intermediates"; Cellulosics: Materials for Selective Separations and Other Technologies, 1993, Chapter 24, 205-211.

Wagenknecht, Wolfgang; "Regioselectively substituted cellulose derivatives by modification of commercial cellulose acetates"; Papier (Darmstadt) (1996), 50(12), 712-720.

Wenz, G., et al.; "Synthesis, control of substitution pattern and phase transitions of 2,3-di-O-methylcellulose"; Carbohydrate Research, 2000, 326, 67-79.

Xie, Jiangbing, et al.; "Enzyme-catalyzed transesterification of vinyl ester on cellulose and its regioselectivity"; Abstracts of Paper, 221st ACS National Meeting, San Diego, CA, United States, Apr. 1-5, 2001, CELL-068.

Xie, Jiangbing, et al.; "Modification of cellulose solids by enzyme-catalyzed transesterification with vinyl esters in anhydrous organic solvents"; ACS Symposium Series (2003), 840(Biocatalysis in Polymer Science), 217-230.

Xie, Jiangbing, et al.; "Regioselectivity of enzyme catalyzed transesterification of cellulose"; Polymer Preprints (American Chemical Society, Division of Polymer Chemistry) (2001), 42(1), 512-513.

USPTO Notice of Allowance dated Nov. 21, 2011 for copending U.S. Appl. No. 12/189,421.

Tsunashima et al., "Substituent Distribution in Cellulose Acetates: Its Control and the Effect on Structure Formation in Solution" Journal of Colloid and Interface Science (2000) vol. 228, pp. 279-286.

USPTO Office Action dated Jan. 5, 2012 for copending U.S. Appl. No. 13/217,326.

U.S. Provisional U.S. Appl. No. 61/169,560, filed Apr. 15, 2009.

USPTO Notice of Allowance dated Nov. 16, 2011 for copending U.S. Appl. No. 12/030,387.

Abbott, A. et al., "O-Acetylation of cellulose and monosaccharides using a based ionic liquid," Green Chemistry, 2005, pp. 705-707, vol. 7—Supplementary Information.

New Copending U.S. Appl. No. 13/278,796, filed Oct. 21, 2011, Charles Michael Buchanan et al.

New Copending U.S. Appl. No. 13/339,814, filed Dec. 29, 2011, Charles Michael Buchanan et al.

New Copending U.S. Appl. No. 13/330,828, filed Dec. 20, 2011, Charles Michael Buchanan et al.

USPTO Notice of Allowance dated Jan. 27, 2012 for copending U.S. Appl. No. 12/189,753.

USPTO Notice of Allowance dated Feb. 8, 2012 for copending U.S. Appl. No. 12/030,387.

USPTO Notice of Allowance dated Jan. 30, 2012 for copending U.S. Appl. No. 12/189,415.

USPTO Notice of Allowance dated Feb. 15, 2012 for copending U.S. Appl. No. 12/030,434.

New copending U.S. Appl. No. 13/396,700, filed Feb. 15, 2012, Charles Michael Buchanan et al.

Wasserscheid, P., et al., "Synthesis and Purification of Ionic Liquids," Ionic Liquids in Synthesis, (2002), pp. 7-40, Wiley-VCH Verlag GmbH & Co.

New copending U.S. Appl. No. 13/217,326, filed Aug. 25, 2011, Charles Buchanan et al.

New Copending U.S. Appl. No. 13/357,636, filed Jan. 25, 2012, Charles Michael Buchanan et al.

New Copending U.S. Appl. No. 13/357,635, filed Jan. 25, 2012, Charles Michael Buchanan et al.

Acemoglu, Murat, et al.; "Synthesis of regioselectively substituted cellulose derivatives and applications in chiral chromatography"; Chirality (1998), 10(4), 294-306 (Abstract).

Avalos, Martín et al.; "Grünere Medien für chemische Synthesen und Verfahren"; Angew. Chem. 2006, 118, 4008-1012 (Citation for English version is: Angewandte Chemie International Edition, 2006, 45(24), 3904-3908).

Barthel et al.; "Acylation and carbanilation of cellulose in ionic liquids"; Green Chem., 2006, 8, pp. 301-306.

Bicak, Niyazi; "A new ionic liquid: 2-hydroxy ethylammonium formate"; Journal of Molecular Liquids 116 (2005) 15-18.

Buchanan, Charles M., et al.; "Preparation and Characterization of Cellulose Monoacetates: The Relationship between Structure and Water Solubility"; Macromolecules 1991, 24, 3060-3064.

Buchanan, Charles M., et al.; "Preparation of Cellulose [1-$^{13}$C] Acetates and Determination of Monomer Compositions by NMR Spectroscopy"; Macromolecules 1991, 3050-3059.

Cao et al.; "Acetone-soluble cellulose acetates prepared by one-step homogeneous acetylation of cornhusk cellulose in an ionic liquid 1-allyl-3-methylimidazolium chloride (AmimCl)"; Elsevier, Carbohydrate Polymers, vol. 69, Issue 4, (2007), pp. 665-672.

Co-pending U.S. Appl. No. 12/030,387, titled "Cellulose Esters and Their Production in Carboxylated Ionic Liquids", filed Feb. 13, 2008.

Co-pending U.S. Appl. No. 12/030,425, titled "Production of Ionic Liquids", filed Feb. 13, 2008.

Co-Pending U.S. Appl. No. 12/030,434, titled "Reformation of Ionic Liquids", filed Feb. 13, 2008.

Co-pending U.S. Appl. No. 12/189,415, titled "Cellulose Esters and Their Production in Halogenated Ionic Liquids", filed Aug. 11, 2008.

Co-pending U.S. Appl. No. 12/189,421, titled "Treatment of Cellulose Esters", filed Aug. 11, 2008.

Co-pending U.S. Appl. No. 12/189,753, titled "Production of Cellulose Esters in the Presence of a Cosolvent", filed Aug. 11, 2008.

Crosthwaite et al.; "Phase transition and decomposition temperatures, heat capacities and viscosities of pyridinium ionic liquids"; Elsevier; J. Chem. Thermodynamics 37 (2005), pp. 559-568.

Edgar, Kevin J., et al.; "Advances in cellulose ester performance and application"; Prog. Polym. Sci. 26 (2001) 1605-1688.

El Seoud et al.; "Applications of Ionic Liquids in Carbohydrate Chemistry: A Window of Opportunities"; Biomacromolecules, Sep. 2007, Published by the American Chemical Society, vol. 8, No. 9, pp. 2629-2640, pp. 3752-3758.

Fujimoto, et al.; "13C NMR spectral studies on the distribution of substituents in some cellulose derivatives"; J. Polym. Sci.: Part A: Polymer Chemistry Edition, 1986, 24, 2981-2993 (Abstract).

Fukaya et al.; "Superior Solubility of Polysaccharides in Low Viscosity, Polar, and Halogen-Free 1,3-Dialkylimidazolium Formates"; BioMacrololecules, Dec. 2006, Published by the American Chemical Society, vol. 7, No. 12, pp. 3295-3297.

Fukaya et al.; "Supporting Information—Superior Solubility of Polysaccharides in Low Viscosity, Polar and Halogen-Free 1,3-Dialkylimidazolium Formates"; Department of Biotechnology, Tokyo University of Agriculture and Technology; pp. 1-4, Dec. 2006.

Heinze et al.; "Ionic Liquids as Reaction Medium in Cellulose Functionalization"; Macromolecular Bioscience 2005, 5, pp. 520-525.

Heinze, et al.; "Synthesis and carboxymethylation of organo-soluble trifluoroacetates and ormats of cellulose"; J.M.S.-Pure Appl. Chem. 1996, A33(5), 613-626 (Abstract).

Heinze, et al.; "Synthesis path versus distribution of functional groups in cellulose esters"; Macromol. Symp. 1998, 130, 271-283 (Abstract).

Heinze, Thomas, et al.; "Synthesis and subsequent reactions of cellulose-p-toluenesulfonic acid esters. Pool for new functional polymers."; Papier (Darmstadt) (1996), 50(12), 721-729 (Abstract).

Huddleston et al.; "Characterization and comparison of hydrophilic and hydrophobic room temperature ionic liquids incorporating the imidazolium cation"; The Royal Society of Chemistry 2001; Green Chemistry, 2001, 3, pp. 156-164.

Husemann, E. et al.; "N-Äthyl-pyridinium-chlorid als Lösungsmittel und Reaktionsmedium für Cellulose"; Makromolekulare Chemie, 128 (1969) 288-291 (nr. 3178).

Iwata, Tadahisa, et al.; "Conformational analysis of regioselectively substituted cellulose esters"; Sen'i Gakkaishi (1991), 47(8), 379-83 (Abstract).

Iwata, Tadahisa, et al.; "Preparation and NMR assignments of cellulose mixed esters regioselectively substituted by acetyl and propanoyl groups"; Carbohydrate Research (1992), 224, 277-83 (Abstract).

Kametani et al.; "Novel Methylation. III (1a). Methylation of Tertiary Amines such as Pyridine and Isoquinoline with Alkyl Carboxylates (1b)."; J. Heterocycl. Chem., 1966, 3, pp. 129-136.

Kasuya, Natsuki, et al.; "Chiral discrimination with regioselectively substituted cellulose esters as chiral stationary phases"; Chirality (2000), 12(9), 670-674 (Abstract).

Klemm, D., et al.; "New procedures for regioselective synthesis and modification of trialkylsilylcelluloses"; Cellulosics: Materials for Selective Separations and Other Technologies, Chapter 26, 221-226.

Klemm, D., et al.; "New procedures for regioselective synthesis and modification of trialylsilylcelluloses"; Cellulosics (1993), 221-6 (Abstract).

Klemm, D., et al.; "Polyglucane derivatives with regular substitutent distribution"; Macromol. Symp. 1995, 99, 129-140 (Abstract).

Klemm, D., et al.; "Readily hydrolyzable cellulose esters as intermediates for the regioselective derivatization of cellulose"; Die Angewandte Makromolekulare Chemie 1992, 198, 155-164 (Abstract).

Klemm, D., et al.; "Readily hydrolyzable cellulose esters as intermediates for the regioselective derivatization of cellulose"; Cellulose Chem. Technol. 1990, 24, 667-678 (Abstract).

Klemm, D.O., et al.; "Silylated Cellulose Materials in Design of Supramolecular Structure of Ultrathin Films"; J.M.S.-Pure Appl. Chem. 1995, A32, 899-904 (Abstract).

Klemm, D.O.; "Regiocontrol in Cellulose Chemistry: Principles and Examples of Etherification and Esterification"; Cellulose Derivatives: Modification, Characterization, and Nanostructures, ACS Symposium Series 688, T.J. Heinze and W.G. Glasser, Editors, 1998, Oxford University Press, 19-37.

Kondo, T.; "Preparation of 6-O-alkylcelluloses"; Carbohydr. Res. 1993, 238, 231-240 (Abstract).

Laus et al.; "Ionic Liquids: Current Developments, Potential and Drawbacks for Industrial Applications"; Lenzinger Berichte, 84 (2005), pp. 71-85.

Liebert et al.; "Click Chemistry with Polysaccharides"; Macromolecular Rapid Communications, 2006, 27, pp. 208-213.

Liebert, Tim, et al.; "Readily hydrolyzable cellulose esters as intermediates for the regioselective derivatization of cellulose. Part II Soluble, highly substituted cellulose trifluoroacetates."; Cellulose (London) (1994), 1(4), 249-258 (Abstract).

MacFarlane, et al.; "Lewis base ionic liquids"; The Royal Society of Chemistry 2006; Chem. Commun., 2006, 1905-1917.

Mayumi, Ayaka, et al.; "Partial substitution of cellulose by ring-opening esterification of cyclic esters in a homogeneous system"; Journal of Applied Polymer Science (2006), 102(5), 4358-4364 (Abstract).

Moulthrop et al.; "High-resolution $^{13}C$ NMR studies of cellulose and cellulose oligomers in ionic liquid solutions"; The Royal Society of Chemistry 2005; Chem. Commun., 2005, pp. 1557-1559.

Murugesan et al.; "Benzoate-based room temperature ionic liquids—thermal properties and glycosaminoglycan dissolution"; Elsevier; Carbohydrate Polymers 63 (2006), pp. 268-271.

Nishio, Naotaka, et al.; "Preparation of high regioselectively mono-substituted carboxymethyl celluloses"; Cellulose Chemistry and Technology (2005), 39(5-6), 377-387 (Abstract).

Notification of Transmittal of the International Search Report and the Written Opinion of the International Searching Authority, or the Declaration dated Jun. 20, 2008; International Application No. PCT/US2008/001952.

Notification of Transmittal of the International Search Report and the Written Opinion of the International Searching Authority, or the Declaration dated Jun. 27, 2008; International Application No. PCT/US2008/001958.

Notification of Transmittal of the International Search Report and the Written Opinion of the International Searching Authority, or the Declaration dated Jul. 4, 2008; International Application No. PCT/US2008/001975.

Philipp, B., et al.; "Regioselective esterification and etherification of cellulose and cellulose derivatives. Part 2. Synthesis of regioselective cellulose esters."; Papier (Bingen, Germany) (1995), 49(2), 58-64 (Abstract).

Philipp, Burkart, et al.; "Regioselective derivatization of cellulose. Routes of synthesis, effects on properties, and areas of application."; Polymer News (1996), 21(5), 155-161 (Abstract).

Philipp, Burkart, et al.; "Regioselective esterification and etherification of cellulose and cellulose derivatives. Part 1. Problems and descriptions of the reaction systems."; Papier (Bingen, Germany) (1995), 49(1), 3-7 (Abstract).

Philipp, Burkhart, et al.; "Untersuchungen Zur Sulfatierung Von Celluloseformiat Im Vergleich Zu Cellulose-Acetat Unter Homogenen Reaktionsbedingungen"; [Investigations on Sulfation of Cellulose Formate in Comparison with Cellulose Acetate under Homogeneous reaction conditions]; Cellulose Chemistry and Technology, 24, 667-678 (1990) (Abstract).

Potthast et al.; "Hydrolytic processes and condensation reactions in the cellulose solvent system N,N-dimethylacetamide/lithium chloride. Part 2: degradation of cellulose"; Elsevier; Polymer 44 (2003), pp. 7-17.

Ramos et al.; "Carboxymethylation of cellulose in the new solvent dimethyl sulfoxide/tetrabutylammonium fluoride"; Elsevier; Carbohydrate Polymers 60 (2005), pp. 259-267.

Remsing et al.; "Mechanism of cellulose dissolution in the ionic liquid 1-$n$-butyl-3-methylimidazolium chloride: a $^{13}C$ and $^{35/37}Cl$ NMR relaxation study on model systems"; The Royal Society of Chemistry 2006; Chem. Commun., 2006, pp. 1271-1273.

Rosenau et al.; "Hydrolytic Processes and Condensation Reactions in the Cellulose Solvent System N,N-Dimethylacetamide/Lithium Chloride. Part 1."; Holzforschung 55 (2001), pp. 661-666.

Saalwächter et al.; "Cellulose Solutions in Water Containing Metal Complexes"; Macromolecules 2000, 33, pp. 4094-4107.

Schlufter et al.; "Efficient Homogeneous Chemical Modification of Bacterial Cellulose in the Ionic Liquid 1-N-Butyl-3-methylimidazolium Chloride"; Macromolecular Rapid Communications, 2006, 27, pp. 1670-1676.

Schnabelrauch, Matthias, et al.; "Readily hydrolyzable cellulose esters as intermediates for the regioselective derivatization of cellulose. 1. Synthesis and characterization of soluble, low-substituted cellulose formates."; Angewandte Makromolekulare Chemie (1992), 198, 155-64 (Abstract).

Swatloski et al.; "Dissolution of Cellulose with Ionic Liquids"; J. Am. Chem. Soc., 2002, 124, pp. 4974-4975.

Varma et al.; "An expeditious solvent-free route to ionic liquids using microwaves"; The Royal Society of Chemistry 2001; Chem. Commun., 2001, pp. 643-644.

Wagenknecht, W., et al.; "Regioselective homogeneous sulfaction of cellulose via unstable intermediates"; Cellulosics: Materials for Selective Separations and Other Technologies, Chapter 24, 205-211.

Wagenknecht, Wolfgang; "Regioselectively substituted cellulose derivatives by modification of commercial cellulose acetates"; Papier (Darmstadt) (1996), 50(12), 712-720 (Abstract).

Wenz, G., et al.; "Synthesis, control of substitution pattern and phase transitions of 2,3-di-O-methylcellulose"; Carbohydrate Research, 2000, 326, 67-79 (Abstract).

Wu et al.; "Homogeneous Acetylation of Cellulose in a New Ionic Liquid"; Biomacromolecules 2004, 5, pp. 266-268.

Xie, Jiangbing, et al.; "Enzyme-catalyzed transesterification of vinyl ester on cellulose and its regioselectivity"; Abstracts of Paper, $221^{st}$ ACS National Meeting, San Diego, CA, United States, Apr. 1-5, 2001, CELL-068 (Abstract).

Xie, Jiangbing, et al.; "Modification of cellulose solids by enzyme-catalyzed transesterification with vinyl esters in anhydrous organic solvents"; ACS Symposium Series (2003), 840(Biocatalysis in Polymer Science), 217-230 (Abstract).

Xie, Jiangbing, et al.; "Regioselectivity of enzyme catalyzed transesterification of cellulose"; Polymer Preprints (American Chemical Society, Division of Polymer Chemistry) (2001), 42(1), 512-513 (Abstract).

Yoshida et al.; "Preparation of polymer brush-type cellulose β-ketoesters using LiCl/1,3-dimethyl-2-imidazolidinone as a solvent"; Elsevier; Polymer 46 (2005), pp. 2548-2557.

Zhang et al.; "1-Allyl-3-methylimidazolium Chloride Room Temperature Ionic Liquid: A New and Powerful Nonderivatizing Solvent for Cellulose"; Macromolecules 2005, 38, pp. 8272-8277.

Zhu et al.; "Dissolution of cellulose with ionic liquids and its application: a mini-review"; Green Chem., 2006, 8, pp. 325-327.

Notification of Transmittal of the International Search Report and the Written Opinion of the International Searching Authority, or the Declaration dated Nov. 7, 2008; International Application No. PCT/US2008/009624.

Notification of Transmittal of the International Search Report and the Written Opinion of the International Searching Authority, or the Declaration dated Nov. 5, 2008; International Application No. PCT/US2008/009625.

Notification of Transmittal of the International Search Report and the Written Opinion of the International Searching Authority, or the Declaration dated Nov. 18, 2008; International Application No. PCT/US2008/009622.

Co-pending U.S. Appl. No. 12/539,814, titled "Cellulose Solutions Comprising Tetraalkylammonium Alkylphosphate and Products Produced Therefrom", filed Aug. 12, 2009, Buchanan et al.

Co-pending U.S. Appl. No. 12/539,800, titled "Regioselectively Substituted Cellulose Esters Produced in a Carboxylated Ionic Liquid Process and Products Produced Therefrom", filed Aug. 12, 2009, Buchanan et al.

Co-pending U.S. Appl. No. 12/539,812, titled "Regioselectively Substituted Cellulose Esters Produced in a Halogenated Ionic Liquid Process and Products Produced Therefrom", filed Aug. 12, 2009, Buchanan et al.

Co-pending U.S. Appl. No. 12/539,817, titled "Regioselectively Substituted Cellulose Esters Produced in a Tetraalkylammonium Alkylphosphate Ionic Liquid Process and Products Produced Therefrom", filed Aug. 12, 2009, Buchanan et al.

Notification of Transmittal of the International Search Report and the Written Opinion of the International Searching Authority, or the Declaration dated Nov. 20, 2009; International Application No. PCT/US2009/004637.

Cao, et al.; "Room temperature ionic liquid (RTILs): A new and versatile platform for cellulose processing and derivation"; Chemical Engineering Journal 147 (2009) 13-21.

Notification of Transmittal of the International Search Report and the Written Opinion of the International Searching Authority, or the Declaration dated Nov. 13, 2009; International Application No. PCT/US2009/004638.

Ren, et al.; "Acetylation of wheat straw hemicelluloses in ionic liquid using iodine as a catalyst"; Carbohydrate Polymers 70(2007) 406-414.

Granstrom, et al.; "Tosylation and acylation of cellulose in 1-allyl-3-methylimidazolium chloride"; Springer Science + Business Media B.V. 2008; Cellulose (2008) 15:481-488.

Kohler, et al.; "Efficient synthesis of cellulose furoates in 1-N-butyl-3-methylimidazolium chloride"; Springer Science + Business Media B.V. 2007; Cellulose (2007) 14:489-495.

Meng, et al.; "Graft copolymers prepared by atom transfer radical polymerization (ATRP) from cellulose"; Polymer 50 (2009) 447-454.

Notification of Transmittal of the International Search Report and the Written Opinion of the International Searching Authority, or the Declaration dated Dec. 28, 2009; International Application No. PCT/US2009/004624.

Notification of Transmittal of the International Search Report and the Written Opinion of the International Searching Authority, or the Declaration dated Dec. 28, 2009; International Application No. PCT/US2009/004626.

Kern et al., "Synthesis, Control of Substitution Pattern and Phase Transitions of 2,3-di-O-methylcellulose," Carbohydrate Research, 2000, 326, pp. 67-79.

USPTO Office Action dated Jun. 21, 2011 for copending U.S. Appl. No. 12/030,434.

USPTO Office Action dated Sep. 14, 2011 for copending U.S. Appl. No. 12/539,817.

USPTO Office Action dated Dec. 12, 2010 for copending U.S. Appl. No. 12/539,814.

USPTO Office Action dated May 7, 2010 for copending U.S. Appl. No. 12/030,425.

USPTO Notice of Allowance dated Dec. 10, 2010 for copending U.S. Appl. No. 12/030,425.

New copending U.S. Appl. No. 13/409,724, filed Mar. 1, 2012, Charles Michael Buchanan et al.

New copending U.S. Appl. No. 13/409,735, filed Mar. 1, 2012, Charles Michael Buchanan et al.

New copending U.S. Appl. No. 13/409,743, filed Mar. 1, 2012, Charles Michael Buchanan et al.

New copending U.S. Appl. No. 13/409,747, filed Mar. 1, 2012, Charles Michael Buchanan et al.

USPTO Office Action dated Feb. 29, 2012 for copending U.S. Appl. No. 12/539,800.

Takaragi, A., et al., "Reaction Characteristics of Cellulose in the LiCl/1,3-Dimethyl-2-Imidazolidinone Solvent System," Cellulose, vol. 6, 1999, pp. 93-102, Kluwer Academic Publishers.

Buchanan, C., "Two-Dimensional NMR of Polysaccharides: Spectral Assignments of Cellulose Triesters," Macromolecules, 1987, pp. 2750-2754, vol. 20, American Chemical Society.

USPTO Office Action dated Mar. 9, 2012 for copending U.S. Appl. No. 12/539,812.

USPTO Notice of Allowance dated Mar. 15, 2012 for copending U.S. Appl. No. 12/189,421.

Notice of Allowance and Fees Due dated Oct. 15, 2012 received in co-pending U.S. Appl. No. 12/539,812.

Office Action notification date Nov. 5, 2012 received in co-pending U.S. Appl. No. 13/339,814.

Office Action notification date Nov. 5, 2012 received in co-pending U.S. Appl. No. 13/396,700.

Office Action notification date Nov. 7, 2012 received in co-pending U.S. Appl. No. 12/539,800.

Office Action notification date Dec. 21, 2012 received in co-pending U.S. Appl. No. 13/278,796.

USPTO Notice of Allowance dated Jan. 24, 2013 for copending U.S. Appl. No. 13/330,828.

Heinze, Thomas et al.; "Interactions of Ionic Liquids with Polysaccharides 1. Unexpected Acetylation of Cellulose with 1-Ethyl-3-methylimidazolium"; Macromolecular Journals; 2007; 28; pp. 2311-2317.

Heinze, Thomas et al.; "Interactions of Ionic Liquids with polysaccharides-2: Cellulose"; Macromol. Symp; 2008; pp. 8-22; 262.

Richardson, Sara and Gorton, Lo; "Characterisation of the Substituent Distribution in Starch and Cellulose Derivatives"; Analytica Chimica Acta; 2003; pp. 27-65; 497.

Notification of Transmittal of the International Search Report with Date of Mailing Jul. 26, 2012 for International Application No. PCT/US2012/031069.

Notification of Transmittal of the International Search Report with Date of Mailing Jul. 26, 2012 for International Application No. PCT/US2012/031062.

Notification of Transmittal of the International Search Report with Date of Mailing Jul. 26, 2012 for International Application No. PCT/US2012/031064.

Notification of Transmittal of the International Search Report with Date of Mailing Jul. 26, 2012 for International Application No. PCT/US2012/031077.

USPTO Notice of Allowance dated Jul. 24, 2012 for copending U.S. Appl. No. 13/217,326.

USPTO Office Action dated Jul. 2, 2012 for copending U.S. Appl. No. 13/330,828.

USPTO Office Action dated Mar. 2, 2011 for copending U.S. Appl. No. 12/030,387.

Murugesan, S. et al., "Dialkyl Imidazolium Benzoates—Room Temperature Ionic Liquids Useful in the Peracetylation and Perbenzoylation of Simple and Sulfated Saccharides," Synlett, 2003, pp. 1283-1286, No. 9, Georg Thieme Verlag Stuttgart, New York.

Kohler, S. et al., "Interactions of Ionic Liquids with Polysaccharides 1. Unexpected Acetylation of Cellulose with 1-Ethyl-3-methylimidazolium Acetate," Macromolecular Rapid Communications, published online Oct. 22, 2007, pp. 2311-2317, 28, Wiley InterScience.

Ruben S. et al., "Tracer Studies with Radioactive Carbon. The Exchange between Acetic Anhydride and Sodium Acetate," J. Am. Chem. Soc., 1942, p. 3050, vol. 64.

Avicel for Solid Dose Forms, FMC Biopolymer website, http://www.bmcbiopolymer.com/, Feb. 24, 2011.

Abbott, A. et al., "O-Acetylation of cellulose and monosaccharides using a based ionic liquid," Green Chemistry, 2005, pp. 705-707, vol. 7.

\* cited by examiner

REGIOSELECTIVELY SUBSTITUTED CELLULOSE ESTERS PRODUCED IN A TETRAALKYLAMMONIUM ALKYLPHOSPHATE IONIC LIQUID PROCESS AND PRODUCTS PRODUCED THEREFROM

RELATED APPLICATIONS

This original application claims the benefit of U.S. Provisional Application Ser. No. 61/169,560 entitled "Tetraalkylammonium Alkylphosphates" filed on Apr. 15, 2009, which is hereby incorporated by reference.

FIELD OF THE INVENTION

This invention is relates to the field of cellulose chemistry, specifically to cellulose solutions, the production of cellulose esters, and products produced therefrom.

BACKGROUND OF THE INVENTION

Cellulose is a β-1,4-linked polymer of anhydroglucose. Cellulose is typically a high molecular weight, polydisperse polymer that is insoluble in water and virtually all common organic solvents. The use of unmodified cellulose in wood or cotton products such as housing or fabric is well known. Unmodified cellulose is also utilized in a variety of other applications usually as a film, such as cellophane, as a fiber, such as viscose rayon, or as a powder, such as microcrystalline cellulose used in pharmaceutical applications. Modified cellulose such as cellulose esters are also widely utilized in a wide variety of commercial applications [Prog. Polym. Sci. 2001, 26, 1605-1688]. Cellulose esters are generally prepared by first converting cellulose to a cellulose triester before hydrolyzing the cellulose triester in an acidic aqueous media to the desired degree of substitution (DS, the number of substituents per anhydroglucose monomer). Hydrolysis of cellulose triacetate under these conditions yields a random copolymer that can consist of 8 different monomers depending upon the final DS [Macromolecules 1991, 24, 3050].

The dissolution of cellulose in ionic liquids is known. Those skilled in the art will recognize that the maximum amount of cellulose dissolved at any given temperature in a particular ionic liquid will depend upon the degree of polymerization (DP) of the initial cellulose and the extent of degradation of the cellulose during the dissolution process.

In the broadest sense, an ionic liquid (IL) is simply any liquid containing only ions. Hence, molten salts such as NaCl which melts at temperatures greater than 800° C. could be classified as ionic liquids. From a practical point of view, the term ionic liquid is now used for organic salts that melt below approximately 100° C.

Although the cations of ionic liquids are structurally diverse, they generally contain nitrogen or phosphorus that can be converted to a quaternary ammonium or phosphonium. In general, the most useful ionic liquids contain nitrogen that is part of a ring structure. Examples of these cations include pyridinum, pyridazinium, pyrimidinium, pyrazinium, imidazolium, pyrazolium, oxazolium, triazolium, thiazolium, piperidinium, pyrrolidinium, quinolinium, and isoquinolinium.

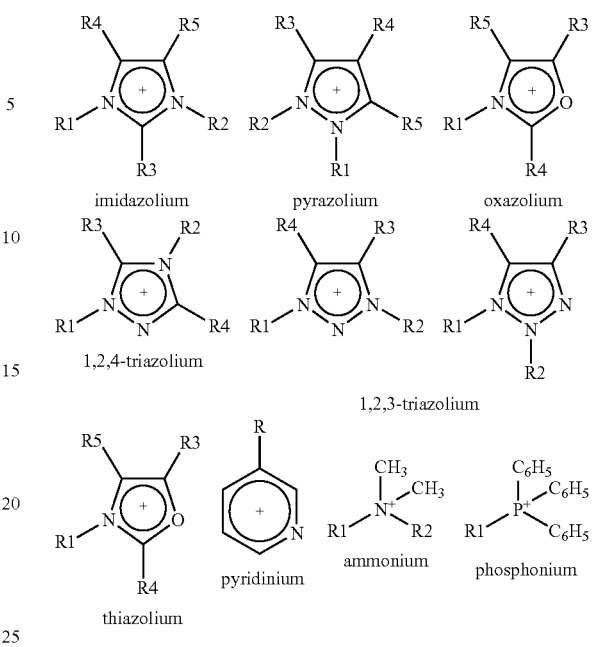

The anions of ionic liquids can also be structurally diverse. The anion can be either inorganic or organic and they can have a significant impact on the solubility of the ionic liquids in different media. For example, ionic liquids containing hydrophobic anions such as hexafluorophosphates or triflimides have very low solubilities in water while ionic liquids containing hydrophilic anions such chloride or acetate are completely miscible in water.

The names of ionic liquids are generally abbreviated. Alkyl cations are often named by the letters of the alkyl substituents and the cation which are given within a set of brackets followed by the abbreviation for the anion. Although not expressively written, it is understood that the cation has a positive charge and the anion has a negative charge. For example, [BMIm]OAc means 1-butyl-3-methylimidazolium acetate and [AMIm]Cl means 1-allyl-3-methylimidazolium chloride.

In the case in which nitrogen is part of a cyclic cation (e.g. imidazolium), these ionic liquids typically have lower melting points, are less hydroscopic, and are more stable that the corresponding ammonium or phosphonium containing ionic liquids. In terms of cellulose dissolution and esterification, ionic liquids containing imidazolium as the cation are generally preferred. With these ionic liquids, it is possible to achieve concentrated cellulose solutions (ca. 20 wt % in [EMIm]OAc) from which a variety of cellulose esters can be prepared (U.S. Pat. No. 6,824,599, US application 20080194807, US application 20080194808, and US application 20080194834).

The most commonly utilized non-cyclic ammonium based ionic liquids are tetraalkylammonium halides. This class of ionic liquids has limited utility in cellulose dissolution and esterification. Only two tetraalkylammonium halides, tetraethylammonium chloride (U.S. Pat. No. 4,597,798) and tetrabutylammonium fluoride hydrate (Macromol. Biosci. 2007, 7, 307-314), have been shown to solubilize cellulose at a significant level (ca. 6 wt % cellulose). In both cases, significant concentrations of cosolvents (30-90 wt %) such as DMSO or DMF were required for cellulose solubilization. Due to low concentrations of cellulose in the ionic liquids, the difficulty of removing water from theses ionic liquids, the instability of these ionic liquids, as well as the corrosive and toxic nature of these ionic liquids, these tetraalkylammonium halides are not practical media for making cellulose derivatives.

SUMMARY OF THE INVENTION

One embodiment of this invention relates to the dissolution of cellulose in one or more tetraalkylammonium alkylphosphates. The invention further relates to the dissolution of cellulose in a mixture comprising one or more tetraalkylammonium alkylphosphates and one or more aprotic solvents at a contact time and temperature sufficient to dissolve cellulose. The invention yet further relates to the dissolution of cellulose in a mixture comprising one or more tetraalkylammonium alkylphosphates and one or more ionic liquids wherein the cation is imidazolium. The invention still further relates to the dissolution of cellulose in a mixture comprising one or more tetraalkylammonium alkylphosphates and one or more acids wherein the acids do not combine with the cellulose at a contact time and temperature sufficient to dissolve cellulose. Another embodiment of this invention relates to shaped articles prepared from a cellulose solution comprising at least one tetraalkylammonium alkylphosphate or mixtures thereof. Another embodiment of this invention relates to compositions comprising derivatives of cellulose prepared from a cellulose solution comprising at least one tetraalkylammonium alkylphosphate or mixtures thereof. Another embodiment of this invention relates to compositions comprising regioselectively substituted cellulose esters prepared from a cellulose solution comprising at least one tetraalkylammonium alkylphosphate or mixtures thereof. In yet another embodiment of the invention, the cellulose esters of the present invention are used as protective and compensation films for liquid crystalline displays.

DETAILED DESCRIPTION OF THE INVENTION

Figure 1:
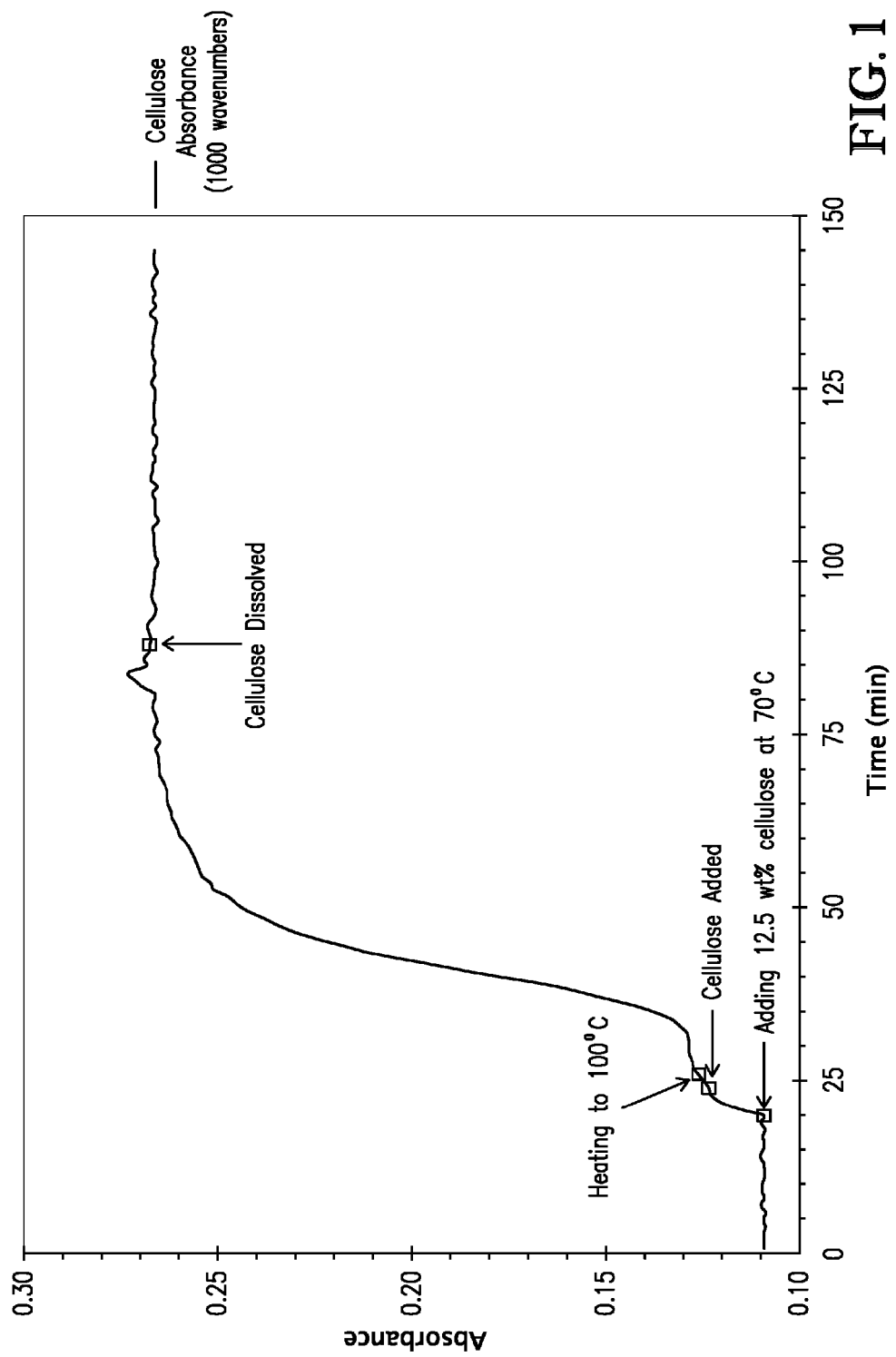
FIG. 1 shows the dissolution of 12.5 wt % cellulose in tributylmethylammonium dimethyl phosphate ([TBMA]DMP). Cellulose absorbance was measured at 1000 cm$^{-1}$.

The present invention may be understood more readily by reference to the following detailed description of the invention and the examples provided therein. It is to be understood that this invention is not limited to the specific methods, formulations, and conditions described, as such may vary. It is also to be understood that the terminology used herein is for the purpose of describing particular aspects of the invention only and is not intended to be limiting.

In this specification and in the claims that follow, reference will be made to a number of terms, which shall be defined to have the following meanings.

The singular forms "a," "an," and "the" include plural referents unless the context clearly dictates otherwise.

Values may be expressed as "about" or "approximately" a given number. Similarly, ranges may be expressed herein as from "about" one particular value and/or to "about" or another particular value. When such a range is expressed, another aspect includes from the one particular value and/or to the other particular value. Similarly, when values are expressed as approximations, by use of the antecedent "about," it will be understood that the particular value forms another aspect.

One embodiment of this invention relates to the dissolution of cellulose in one or more tetraalkylammonium alkylphosphates at a contact time and temperature sufficient to dissolve cellulose. The invention further relates to the dissolution of cellulose in a mixture comprising one or more tetraalkylammonium alkylphosphates and one or more aprotic solvents at a contact time and temperature sufficient to dissolve cellulose. The invention yet further relates to the dissolution of cellulose in a mixture comprising one or more tetraalkylammonium alkylphosphates and one or more ionic liquids wherein the cation is imidazolium at a contact time and temperature sufficient to dissolve cellulose. The invention still further relates to the dissolution of cellulose in a mixture comprising one or more tetraalkylammonium alkylphosphates and one or more acids wherein the acids do not combine with the cellulose at a contact time and temperature sufficient to dissolve cellulose. Another embodiment of this invention relates to shaped articles prepared from a cellulose solution comprising at least one tetraalkylammonium alkylphosphate.

The cellulose suitable for the present invention can be any cellulose known in the art suitable for the production of cellulose esters. In one embodiment, the cellulose can be obtained from soft or hard woods as wood pulps or from annual plants such as cotton or corn. The cellulose can be a β-1,4-linked polymer comprising a plurality of anhydroglucose monomer units. The cellulose suitable for use in the present invention can generally comprise the following structure:

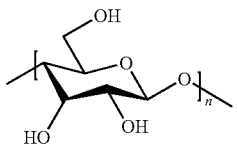

The cellulose can have an α-cellulose content of at least 90%, and more preferably, an α-cellulose content of at least 95%. The cellulose can have a degree of polymerization (DP) of at least 10, at least 250, at least 1000 or at least 5,000. As used herein, the term "degree of polymerization," when referring to cellulose and/or cellulose esters, shall denote the average number of anhydroglucose monomer units per cellulose polymer chain. Furthermore, the cellulose can have a weight average molecular weight in the range of from about 1,500 to about 850,000, in the range of from about 40,000 to about 200,000, or in the range of from 55,000 to about 160,000. Additionally, the cellulose suitable for use in the present invention can be in the form of a sheet, a hammer milled sheet, fiber, or powder. In one embodiment, the cellulose can be a powder having an average particle size of less than about 500 micrometers ("μm"), less than about 400 μm, or less than 300 μm.

The tetraalkylammonium alkylphosphates suitable for the present invention correspond to the structures:

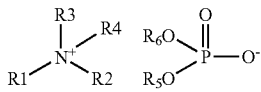

wherein R1, R2, R3, and R4 are independently a $C_1$-$C_5$ straight chain or branched alkyl group or a $C_2$-$C_{20}$ alkoxy group, and R5 and R6 are independently a hydrido, a $C_1$-$C_5$ straight chain or branched alkyl group, or a $C_2$-$C_{20}$ alkoxy group. In one embodiment of the invention, R1 is methyl or ethyl and R2, R3, and R4 are independently methyl, ethyl, propyl, butyl, isobutyl, pentyl, ethanol, ethoxyethanol wherein R1, R2, R3, and R4 are not identical, and R5 and R6 are methyl, ethyl, propyl, or butyl. In another embodiment, R1 is methyl, and R2, R3, and R4 are propyl or butyl, and R5 and R6 are methyl or ethyl. Examples of suitable tetraalkylammonium alkylphosphates include, but are not limited to, tributylmethylammonium dimethylphosphate ([TBMA]DMP), tributylethylammonium diethylphosphate ([TBEA]DEP), tripropylmethylammonium dimethylphosphate ([TPMA]DMP), tripropylethylammonium diethylphosphate ([TPEA]DEP). The preparations of these tetraalkylammonium alkylphosphates for use as lubricants and antistatic agents have been disclosed in U.S. Pat. No. 2,563,506 (1951), which is herein incorporated by reference to the extent it does not contradict the statements herein.

In one embodiment, the ratio of cation:anion of the tetraalkylammonium alkylphosphate is from about 1:1 to about 1:10. In another embodiment, the ratio of cation:anion is about 1:1. In yet another embodiment, the ratio of cation:anion is about 1:2.

One or more cosolvents mixed with tetraalkylammonium alkylphosphates can be useful in preparing solutions of cellulose. Cosolvents include, but are not limited to, aprotic solvents, protic solvents, acids, and ionic liquids other than tetraalkylammonium alkylphosphates. For example, aprotic solvents are useful in the present invention. In the present invention, aprotic solvents are those which do not contain hydrogen attached to oxygen, nitrogen, or sulfur that can dissociate and have a dielectric constant greater than about 30. Further, the suitable aprotic solvents do not have an acidic proton that can be removed by base during cellulose dissolution or esterification. When aprotic solvents are utilized with tetraalkylammonium alkylphosphates, higher cellulose concentrations with lower cellulose solution viscosities can be achieved allowing for reduced contact temperatures. Further, the cellulose ester products often have better solubility when utilizing aprotic solvents than they do in tetraalkylammonium alkylphosphates alone, which is often important when making selected cellulose ester compositions. Examples of suitable aprotic solvents include hexamethylphosphoramide, N-methylpyrrolidone, nitromethane, dimethylformamide, dimethylacetamide, acetonitrile, sulfolane, dimethyl sulfoxide, and the like. In one embodiment, aprotic solvents include, but are not limited to, N-methylpyrrolidone (NMP) and dimethylformamide (DMF). The aprotic solvents may be present in an amount from about 0.1 to about 99 wt % based on total weight of the cosolvents and tetraalkylammonium alkylphosphates. In another embodiment of the invention, the amount of cosolvents is from about 5 to about 90 wt % or from about 10 to about 25 wt % based on total weight of the cosolvents and tetraalkylammonium alkylphosphates.

Certain protic solvents are also useful as cosolvents in the present invention. For the purpose of this invention, protic solvents are those which contain hydrogen attached to oxygen, nitrogen, or sulfur that can dissociate and have a dielectric constant less than about 10. Examples of suitable protic solvents include aliphatic carboxylic acids such as acetic acid, propionic acid, butyric acid, isobutyric acid and amines such as diethyl amine, butyl amine, dibutyl amine, propyl amine, dipropyl amine. In another embodiment of the invention, protic solvents include acetic acid, propionic acid, butyric acid and combinations thereof. The protic solvents may be present in an amount from about 0.1 to about 25 wt % based on total weight of the cosolvents and tetraalkylammonium alkylphosphates. In another embodiment, the amount of cosolvents is from about 1 to about 15 wt % or from about 3 to about 10 wt % based on total weight of the cosolvents and tetraalkylammonium alkylphosphates.

In another embodiment of the invention, ionic liquids, other than tetraalkylammonium alkylphosphates, can be utilized as a cosolvent. The ionic liquid can be any known in the art capable of assisting in dissolving the cellulose in the tetraalkylammonium alkylphosphate. Suitable examples of such ionic liquids are disclosed in U.S. patent application entitled "Cellulose Esters and Their Production In Carboxylated Ionic Liquids" filed on Feb. 13, 2008 and having Ser. No. 12/030,387 and in U.S. patent application entitled "Cellulose Esters and Their Production in Halogenated Ionic Liquids filed on Aug. 11, 2008 and having Ser. No. 12/189,415; both of which are herein incorporated by reference to the extent they do not contradict the statements herein.

In one embodiment of the invention, the ionic liquids useful as cosolvents in the present invention are alkyl or alkenyl substituted imidazolium salts corresponding to the structure:

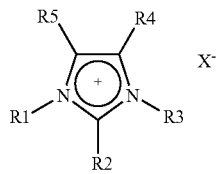

wherein R1 and R3 are independently a $C_1$-$C_8$ alkyl group, a C2-C8 alkenyl group, or a $C_1$-$C_8$ alkoxyalkyl group, and R2, R4, and R5 are independently a hydrido, a $C_1$-$C_8$ alkyl group, a C2-C8 alkenyl group, a $C_1$-$C_8$ alkoxyalkyl group, or a $C_1$-$C_8$ alkoxy group. The anions (k) are chloride, $C_1$-$C_{20}$ straight chain or branched carboxylate or substituted carboxylate, or alkylphosphates. Examples of carboxylate anions include formate, acetate, propionate, butyrate, valerate, hexanoate, lactate, oxalate, or chloro-, bromo-, fluoro-substituted acetate, propionate, or butyrate and the like. Examples of dialkylphosphates include dimethylphosphate, diethylphosphate, dipropylphosphate, or dibutylphosphate and the like. Examples of these types of imidazolium salts for cellulose dissolution can be found in US applications 20080194807, 20080194808, 20080194834; Green Chemistry 2008, 10, 44-46; Green Chemistry 2007, 9, 233-242. The imidazolium based ionic liquids may be present in an amount from about 99 wt % to about 1 wt % based on the total weight of liquid components used to dissolve cellulose. In another embodiment, the amount of imidazolium based ionic liquid is from about 75 wt % to about 2 wt % or about 20 wt % to about 5 wt % based on the total weight of liquid used to dissolve cellulose.

Acids that may be mixed with one or more tetraalkylammonium alkylphosphates as a cosolvent are those which do not combine with the cellulose during cellulose dissolution or esterification. Examples of suitable acids include, but are not limited to, alkyl sulfonic acids, such as, methane sulfonic acid and aryl sulfonic acids, such as, p-toluene sulfonic acid. The acids may be present in an amount from about 0.01 to about 10 wt % based on total weight of the acid and tetraalkylammonium alkylphosphate, and optionally, other mixture components. In another embodiment of the invention, the amount of acid is from about 0.1 to about 7 wt % and or from about 1 to about 5 wt % based on total weight of the acid plus tetraalkylammonium alkylphosphate and, optionally, other mixture components. In one aspect of this embodiment, the acid does not significantly alter the molecular weight of the cellulose.

In another aspect of this embodiment, at least one acid can be mixed in after the cellulose is dissolved in with one or more tetraalkylammonium alkylphosphates. In another aspect of this embodiment, the acid can be mixed with the tetraalkylammonium alkylphosphates prior to cellulose dissolution. In another embodiment, the acid can be added as a mixture with a portion of the acylating reagents. Surprisingly, it has been found that an acid can slow reaction rates and does not lead to significant molecular weight reduction. Moreover, the color of the cellulose ester product is improved relative to when the acid is absent. Hence, in one aspect of this embodiment, the acid can lead to a slower reaction rate relative to when no acid is present. In another aspect, the acid does not significantly alter the molecular weight of the cellulose. In yet another aspect, the acid provides improved cellulose ester color relative to when no acid is present. The precise reaction rate change, the product molecular weights, and the improvement in product color depends upon a number of factors such as selection of the acid, acid concentration, contact temperature, and contact time.

When dissolving cellulose in the present invention to produce a cellulose solution, the contact temperature and time is that which is sufficient to obtain a homogeneous mixture of the cellulose in the tetraalkylammonium alkylphosphate. In one embodiment of the invention, the contact temperature is from about 20° C. to about 150° C. or from about 50° C. to about 120° C. In one embodiment of the invention, the contact time is from about 5 min to about 24 hours or from about 30 min to about 3 hours. Those skilled in the art will understand that the rate of dissolution is dependent upon temperature and how well the cellulose is dispersed in the tetraalkylammonium alkylphosphate. The amount of cellulose that can be dissolved in the tetraalkylammonium alkylphosphate of the present invention depends upon the particular tetraalkylammonium alkylphosphate used to dissolve the cellulose and the DP of the cellulose. In one embodiment, the concentration of cellulose in the cellulose solution is from about 1 wt % to about 40 wt % based on the total weight of the cellulose solution or from about 7 wt % to about 20 wt %.

In one embodiment of the invention, it is not necessary for the liquid in which at least one component is tetraalkylammonium alkylphosphate to be free of $H_2O$, nitrogen containing bases, or alcohol acid prior to dissolution of the cellulose. Therefore, the cellulose solution can comprise cellulose and tetraalkylammonium alkylphosphate, and at least one component selected from the group consisting of water, nitrogen containing bases, and alcohol. In one embodiment, the tetraalkylammonium alkylphosphates contains less than about 20 wt % water, nitrogen containing base, and/or alcohol based on the total weight of liquids contained in the cellulose solution. In another embodiment, the tetraalkylammonium alkylphosphate contains less than about 5 wt % water, base, and/or alcohol or less than about 2 wt % water, base, and/or alcohol based on the total weight of liquids contained in the cellulose solution.

In another embodiment of the invention, a variety of shaped articles can be prepared from a cellulose solution comprising at least one tetraalkylammonium alkylphosphate or mixtures thereof. These shaped forms include powders, films, fibers, tubes, and the like. Typically, the cellulose solution is formed into the desired shape and then immediately contacted with a non-solvent that will cause regeneration or precipitation of the cellulose but is miscible with the tetraalkylammonium alkylphosphate. Examples of such non-solvents include, but are not limited to, water and alcohols, such as, methanol, ethanol, n-propanol, iso-propanol, and the like. As an example of this process, the cellulose solution can be extruded through a die which imparts a certain shape, and then, the cellulose solution is contacted with the non-solvent thereby forming a fiber. In the case of electro spinning, it is possible to form nano fibers. Another example is casting of a thin film onto a surface which is then contacted with the non-solvent thereby forming a solid film.

Another embodiment of this invention relates to compositions comprising cellulose derivatives prepared from a cellulose solution comprising cellulose and at least one tetraalkylammonium alkylphosphate or mixtures thereof. The cellulose derivatives may be cellulose esters, cellulose ethers, or mixed cellulose ester-ethers.

Cellulose esters can be prepared by contacting the cellulose solution with one or more $C_1$-$C_{20}$ acylating reagents at a contact temperature and contact time sufficient to provide a cellulose ester with the desired degree of substitution (DS) and degree of polymerization (DP). The cellulose esters thus prepared generally comprise the following structure:

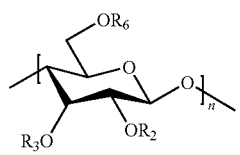

wherein $R_2$, $R_3$, $R_6$ are hydrogen, with the proviso that $R_2$, $R_3$, $R_6$ are not hydrogen simultaneously, or $C_1$-$C_{20}$ straight- or branched-chain alkyl or aryl groups bound to the cellulose via an ester linkage.

The cellulose esters prepared by the methods of the present invention have a DS from about 0.1 to about 3.5, from about 0.1 to about 3.08, from about 0.1 to about 3.0, from about 1.8 to about 2.9, or from about 2.0 to about 2.6. The DP of the cellulose esters prepared by the methods of the present invention will be at least 5 or at least 10. In another embodiment, the DP of the cellulose esters is at least 50 or at least 100, or at least 250. In yet another embodiment, the DP of the cellulose esters is from about 5 to about 1000, from about 10 to about 250 or from about 10 to about 50.

The acylating agents can be any known in the art for acylating cellulose to produce cellulose esters. In one embodiment of the invention, the acylating reagent is one or more $C_1$-$C_{20}$ straight- or branched-chain alkyl or aryl carboxylic anhydrides, carboxylic acid halides, diketene, or acetoacetic acid esters. Examples of carboxylic anhydrides include, but are not limited to, acetic anhydride, propionic anhydride, butyric anhydride, isobutyric anhydride, valeric anhydride, hexanoic anhydride, 2-ethylhexanoic anhydride, nonanoic anhydride, lauric anhydride, palmitic anhydride, stearic anhydride, benzoic anhydride, substituted benzoic anhydrides, phthalic anhydride, and isophthalic anhydride. Examples of carboxylic acid halides include, but are not limited to, acetyl, propionyl, butyryl, hexanoyl, 2-ethylhexanoyl, lauroyl, palmitoyl, benzoyl, substituted benzoyl, and stearoyl halides. Examples of acetoacetic acid esters include, but are not limited to, methyl acetoacetate, ethyl acetoacetate, propyl acetoacetate, butyl acetoacetate, and tert-butyl acetoacetate. In one embodiment of the invention, the acylating reagent is at least one $C_2$-$C_9$ straight- or branched-chain alkyl carboxylic anhydrides selected from the group consisting of acetic anhydride, propionic anhydride, butyric anhydride, 2-ethylhexanoic anhydride, nonanoic anhydride, and stearic anhydride. The acylating reagents can be added after the cellulose has been dissolved in the tetraalkylammonium alkylphosphate. If so desired, the acylating reagent can be added to the tetraalkylammonium alkylphosphate prior to dissolving the cellulose in the tetraalkylammonium alkylphosphate. In another embodiment, the tetraalkylammonium alkylphosphate and the acylating reagent can be added simultaneously to the cellulose to produce the cellulose solution.

In the esterification of cellulose dissolved in tetraalkylammonium alkylphosphates, the contact temperature is that which is sufficient to produce the desired cellulose ester. In one embodiment, the contact temperature is from about 20° C. to about 140° C. In another embodiment, the contact temperature is from about 50° C. to about 100° C. or from about 60° C. to about 80° C.

In the esterification of cellulose dissolved in tetraalkylammonium alkylphosphates, the contact time is that which is sufficient to produce the desired cellulose ester. In one embodiment of the invention, the contact time is from about 1 min to about 48 hours. In another embodiment, the contact time is from about 10 min to about 24 hours, or from about 30 min to about 5 hours.

It is important to understand that in the present invention, little or no cellulose phosphate ester is formed during the cellulose esterification. That is, the tetraalkylammonium alkylphosphate is not acting as a phosphate donor. This is in contrast to ionic liquids, such as, 1,3-dialkylimidazolium carboxylates wherein at least one of the acyl groups of the cellulose ester is donated by the ionic liquid, which is described in U.S. patent application entitled "Cellulose Esters and Their Production In Carboxylated Ionic Liquids" filed on Feb. 13, 2008 and having Ser. No. 12/030,387, which has previously been incorporated by reference to the extent it does not contradict the statements herein. That is, the ionic liquid acts as an acylating reagent. The cellulose esters of the present invention can be prepared by a process comprising:

a) contacting cellulose with at least one tetraalkylammonium alkylphosphate to form a cellulose solution;

b) contacting the cellulose solution with at least one acylating reagent at a contact temperature and contact time sufficient to produce an acylated cellulose solution comprising at least one cellulose ester;

c) contacting the acylated cellulose solution with at least one non-solvent to cause the cellulose ester to precipitate to produce a cellulose ester slurry comprising precipitated cellulose ester and the tetraalkylammonium alkylphosphate;

d) separating at least a portion of the precipitated cellulose ester from the cellulose ester slurry to produce a recovered cellulose ester and precipitation liquids comprising the tetraalkylammonium alkylphosphate.

In another embodiment of this invention, the process of producing cellulose esters further comprises washing the recovered cellulose ester with a wash liquid to produce a washed cellulose ester.

In another embodiment of the invention, the process of producing cellulose esters further comprises drying the washed cellulose ester to produce a dried cellulose ester product.

In another embodiment of the invention, the process of producing cellulose esters further comprises separating the tetraalkylammonium alkylphosphate from the precipitation liquids to produce a recovered tetraalkylammonium alkylphosphate.

In another embodiment of the invention, the process of producing cellulose esters further comprises recycling the recovered tetraalkylammonium alkylphosphate to dissolve cellulose to produce a cellulose solution.

In the process of the present invention, when contacting the one or more acylating reagents with the cellulose solution the amount of acylating reagent that is added and the order of which the acylating reagent is added can significantly influence factors such as solution viscosity, product quality, and relative degree of substitution (RDS).

In one aspect of the invention, the one or more acylating reagents are added in a single addition. In this aspect, about 0.1 equivalents to about 20 equivalents of acylating reagent are added during one addition period wherein equivalents is the number of moles of acylating reagent per mole of anhydroglucose. In another embodiment about 0.5 equivalents to about 5 equivalents of acylating reagent are added during one addition period. Most preferred is when about 1 equivalents to about 3 equivalents acylating reagent is added during one addition period.

In another aspect of the invention, the acylating reagent addition is staged meaning that the acylating reagent is added consecutively. In this aspect, a total of 0.5 equivalent to about 20 equivalents of acylating reagent is added to the cellulose solution or a total of about 1.5 equivalents to about 5 equivalents acylating reagent is added. However, in a staged addition, about 0.1 equivalents to about 2 equivalents acylating reagent is added during one addition period, and the remaining acylating reagent is added in one or more different addition periods. In another embodiment, about 0.5 equivalents to about 1 equivalent of acylating reagent are added during one addition period, and the remaining acylating reagent is added in one or more different addition periods. One benefit of this aspect of the invention is that the initial acylating reagent addition can lead to a reduction in solution viscosity of the contact mixture. Reduction in solution viscosity allows easier movement from one vessel to another and also can allow reduction of contact temperature during subsequent acylating reagent additions which can impact product quality. Another benefit of this aspect of the invention relates to when two or more acylating reagents are added in a staged addition. In this aspect, one acylating reagent can be added and allowed to react during the $1^{st}$ stage then a second acylating reagent can be added and allowed to react during the $2^{nd}$ stage thereby leading to novel cellulose esters with unique substitution patterns.

In the present invention, we found that when adding one or more acylating reagents, the $C_6$ position of cellulose was acylated much faster than $C_2$ and $C_3$. Consequentially, the $C_6/C_3$ and $C_6/C_2$ RDS ratios are greater than 1 which is characteristic of a regioselectively substituted cellulose ester. The degree of regioselectivity depends upon at least one of the following factors: type of acyl substituent, contact temperature, ionic liquid interaction, equivalents of acyl reagent, order of additions, and the like. Typically, the larger the number of carbon atoms in the acyl substituent, the $C_6$ position of the cellulose is acylated preferentially over the $C_2$ and $C_3$ position. In addition, as the contact temperature is lowered in the esterification, the $C_6$ position of the cellulose can be acylated preferentially over the $C_2$ or $C_3$ position. As mentioned previously, the type of ionic liquid and its interaction with cellulose in the process can affect the regioselectivity of the cellulose ester. For example, when carboxylated ionic liquids are utilized, a regioselectively substituted cellulose ester is produced where the RDS is $C_6 > C_2 > C_3$. When the tretraalkylammonium dialkylphosphates of the present invention are utilized, a regioselectively substituted cellulose ester is produced where the RDS is $C_6 > C_3 > C_2$. This is significant in that regioselective placement of substituents in a cellulose ester leads to regioselectively substituted cellulose esters with different physical properties relative to conventional cellulose esters.

In one embodiment of this invention, no protective groups are utilized to prevent reaction of the cellulose with the acylating reagent.

In one embodiment of the present invention, the ring RDS ratio for $C_6/C_3$ or $C_6/C_2$ is at least 1.05. In another embodiment, the ring RDS ratio for $C_6/C_3$ or $C_6/C_2$ is at least 1.1. Another embodiment of the present invention is when the ring RDS ratio for $C_6/C_3$ or $C_6/C_2$ is at least 1.3.

In another embodiment of the present invention, the product of the ring RDS ratio for $C_6/C_3$ or $C_6/C_2$ times the total DS [$(C_6/C_3)*DS$ or $(C_6/C_2)*DS$] is at least 2.9. In another embodiment, the product of the ring RDS ratio for $C_6/C_3$ or $C_6/C_2$ times the total DS is at least 3.0. In another embodiment, the product of the ring RDS ratio for $C_6/C_3$ or $C_6/C_2$ times the total DS is at least 3.2.

In another embodiment of the present invention, the ring RDS ratio for $C_6/C_3$ or $C_6/C_2$ is at least 1.05, and the product of the ring RDS ratio for $C_6/C_3$ or $C_6/C_2$ times the total DS is at least 2.9. In another embodiment, the ring RDS ratio for $C_6/C_3$ or $C_6/C_2$ is at least 1.1, and the product of the ring RDS ratio for $C_6/C_3$ or $C_6/C_2$ times the total DS is at least 3.0. In yet another embodiment, the ring RDS ratio for $C_6/C_3$ or $C_6/C_2$ is at least 1.3, and the product of the ring RDS ratio for $C_6/C_3$ or $C_6/C_2$ times the total DS is at least 3.2.

As noted previously, when 2 or more acyl substituents are present in more equal amounts, it is sometimes desirable to integrate the carbonyl carbons in order to determine the RDS of each substituent independently. Hence, in one embodiment of the present invention, the carbonyl RDS ratio of at least one acyl substituent for $C_6/C_3$ or $C_6/C_2$ is at least 1.3. In another embodiment, the carbonyl RDS ratio of at least one acyl substituent for $C_6/C_3$ or $C_6/C_2$ is at least 1.5. In another embodiment, the carbonyl RDS ratio of at least one acyl substituent for $C_6/C_3$ or $C_6/C_2$ is at least 1.7.

In another embodiment of the present invention, the product of the carbonyl RDS ratio of at least one acyl substituent for $C_6/C_3$ or $C_6/C_2$ times the DS of the acyl substituent [$(C_6/C_3)*DS_{acyl}$ or $(C_6/C_2)*DS_{acyl}$] is at least 2.3. In another embodiment, the product of the carbonyl RDS ratio for $C_6/C_3$ or $C_6/C_2$ times the DS of the acyl substituent is at least 2.5. In another embodiment, the product of the carbonyl RDS ratio for $C_6/C_3$ or $C_6/C_2$ times the DS of the acyl substituent is at least 2.7. In another embodiment of the present invention, the carbonyl RDS ratio of at least one acyl substituent for $C_6/C_3$ or $C_6/C_2$ is at least 1.3, and the product of the carbonyl RDS ratio for $C_6/C_3$ or $C_6/C_2$ times the acyl DS is at least 2.3. In another embodiment, the carbonyl RDS ratio for $C_6/C_3$ or $C_6/C_2$ is at least 1.5, and the product of the carbonyl RDS ratio for $C_6/C_3$ or $C_6/C_2$ times the acyl DS is at least 2.5. In yet another embodiment, the carbonyl RDS ratio for $C_6/C_3$ or $C_6/C_2$ is at least 1.7 and the product of the carbonyl RDS ratio for $C_6/C_3$ or $C_6/C_2$ times the acyl DS is at least 2.7.

Surprisingly, in one embodiment of the invention, staged additions of the acylating reagent gave a relative degree of substitution (RDS) different from that obtained in the mixed addition of acylating reagent. Moreover, both the staged and mixed additions of the present invention provide a different RDS relative to other means known in the prior art for making mixed cellulose esters which generally provide cellulose esters with a RDS at $C_6$, $C_3$, and $C_2$ of about 1:1:1. In some cases, the prior art methods provide a RDS where the RDS at $C_6$ is less than that of $C_2$ and $C_3$.

The cellulose esters prepared by the process of the present invention are precipitated by contacting the cellulose ester solution with a non-solvent to precipitate at least a portion of the cellulose ester, and thereby produce a slurry comprising precipitated cellulose ester and precipitation liquids. Examples of non-solvents include, but are not limited to, $C_1$-$C_8$ alcohols, water, or a mixture thereof. In one embodiment, the methanol is utilized for precipitation of the cellulose esters. The amount of non-solvent can be any amount sufficient to cause at least a portion of the cellulose ester to precipitate. In one embodiment, the amount of non-solvent can be at least about 10 volumes, at least 5 volumes, or at least 0.5 volumes, based on the total volume of the acylated cellulose solution. The contact time and temperature required for precipitation of the cellulose ester can be any time or temperature required to achieve the desired level of precipitation. In embodiments of this invention, the contact time for precipitation is from about 1 to about 300 min, from about 10 to about 200 min, or from 20 to 100 min. The contact temperature for precipitation can range from about 0 to about 120° C., from about 20 to about 100° C., or from 25 to about 50° C.

Following precipitation, the cellulose esters prepared by the process of the present invention can be separated from the cellulose ester slurry to produce a recovered cellulose ester and precipitation liquids. Any solid/liquid separation technique known in the art for separating at least a portion of a liquid from slurries of solids can be utilized. Examples of suitable solid/liquid separation techniques suitable for use in the present invention include, but are not limited to, centrifugation, filtration, and the like. In one embodiment, at least 50 weight percent, at least 70 weight percent, or at least 90 weight percent of the precipitation liquids of the cellulose ester slurry can be removed.

Following separation, the recovered cellulose esters, or wet cake of cellulose esters, prepared by the process of the present invention can be washed with a wash liquid using any method known in the art suitable for washing a wet cake. An example of a washing technique suitable for use in the present invention includes, but is not limited to, a multi-stage countercurrent wash. The wash liquid can be any cellulose ester non-solvent. Non-solvents have been previously discussed in this disclosure. Examples of suitable non-solvents include, but are not limited to, $C_1$-$C_8$ alcohols, water, or a mixture thereof.

In one embodiment, washing of the recovered cellulose ester can be performed in such a manner that at least a portion of any undesired by-products and/or color bodies are removed from the recovered cellulose ester to produce a washed cellulose ester. In one embodiment, the non-solvent utilized as a wash liquid can contain a bleaching agent in the range of from about 0.001 to about 50 weight percent, or in the range of from 0.01 to 5 weight percent based on the total weight of the wash liquid. Examples of bleaching agents suitable for use in the present invention include, but are not limited to, chlorites, such as sodium chlorite ($NaClO_2$); hypohalites, such as NaOCl, NaOBr, and the like; peroxides, such as hydrogen peroxide and the like; peracids, such as peracetic acid and the like; metals, such as Fe, Mn, Cu, Cr and the like; sodium sulfites, such as sodium sulfite ($Na_2SO_3$), sodium metabisulfite ($Na_2S_2O_5$), sodium bisulfite ($NaHSO_3$) and the like; perborates, such as sodium perborate ($NaBO_3.nH_2O$ where n=1 or 4); chlorine dioxide ($ClO_2$); oxygen; and ozone. In one embodiment, the bleaching agent employed in the present invention can include hydrogen peroxide, NaOCl, sodium chlorite and/or sodium sulfite. In one embodiment, at least 70 percent, or at least 90 percent of the total amount of byproducts and/or color bodies are removed from the recovered cellulose ester.

Following washing, the washed cellulose esters prepared by the process of the present invention can be dried by any drying methods known in the art to remove at least a portion of the liquid content of the washed cellulose ester product. Examples of drying equipment include, but are not limited to, rotary dryers, screw-type dryers, paddle dryers, and/or jacketed dryers. In one embodiment, the dried cellulose ester product comprises less than 5, less than 3, or less than 1 weight percent liquids.

In one embodiment of the invention, following separation of the precipitated cellulose esters from the cellulose ester slurry prepared by the process of the present invention, at least a portion of the tetraalkylammonium alkylphosphate is recovered from the precipitation liquids described above to produce a recycled tetraalkylammonium alkylphosphate for possible reuse in cellulose dissolution. In one embodiment, the one or more alcohols, water, and/or residual carboxylic acids and optionally cosolvents are substantially removed by treating the precipitation liquids with at least one liquid/liquid separation process. Such separation process can comprise any liquid/liquid separation process known in the art, such as, for example, flash vaporization and/or distillation. In one embodiment, at least 80, at least 90, or at least 95 weight percent of the one or more alcohols, water, and/or residual carboxylic acids and optionally cosolvents can be removed from the precipitation liquids, thereby producing a recycled tetraalkylammonium alkylphosphate.

In another embodiment, when the cellulose ester non-solvent is a $C_1$-$C_8$ alcohol or a mixture thereof, such as, MeOH, only a portion of alcohol is removed from the precipitation liquids by a liquid/liquid separation process to produce a fractionated precipitation liquid. After partial separation, the total amount of alcohols in the fractionated precipitation liquid is in the range of from about 0.1 to about 60 weight percent, in the range of from about 5 to about 55 weight percent, or in the range of from 15 to 50 weight percent. The fractionated precipitation liquid can then be treated at a temperature, pressure, and time sufficient to convert the at least a portion of the carboxylic acid contained in the precipitation liquids to alkyl esters, such as, methyl esters, by reacting the carboxylic acids with the alcohol present in the fractionated precipitation liquids. The esterification can be conducted at a temperature in the range of from 100° C. to 180° C., or in the range of from 130° C. to 160° C. Additionally, the pressure during esterification can be in the range of from about 10 to about 1,000 pounds per square inch gauge ("psig"), or in the range of from 100 to 300 psig. The fractionated precipitation liquids can have a residence time during esterification in the range of from about 10 to about 1,000 minutes, or in the range of from 120 to 600 minutes. In one embodiment, at least 5, at least 20, or at least 50 mole percent of the carboxylic acids in the precipitation liquids can be esterified during the above-described esterification to produce a reformed fractionated precipitation liquids. Following the above-described esterification, the carboxylate esters, one or more alcohols, and water produced during the esterification can be substantially removed by treating the reformed fractionated precipitation liquids with at least one liquid/liquid separation process. It has been found that conversion of the carboxylic acid to an alkyl ester facilitates its removal from the precipitation liquids. In this embodiment, at least 80, at least 90, or at least 95 weight percent of the one or more alcohols, carboxylate esters, water, and/or residual carboxylic acids and optionally cosolvents can be removed from the precipitation mixture, thereby producing a recycled tetraalkylammonium alkylphosphate stream. At least a portion of the carboxylate esters removed in this process can be converted to anhydrides by CO insertion.

The cellulose esters prepared by the methods of this invention are useful in a variety of applications. Those skilled in the art will understand that the specific application will depend upon the specific type of cellulose ester as factors such as the type of acyl substituent, DS, MW, and type of cellulose ester copolymer significantly impact cellulose ester physical properties [Prog. Polym. Sci. 2001, 26, 1605-1688].

In one embodiment of the invention the cellulose esters are used in thermoplastic applications in which the cellulose ester is used to make film or molded objects. Examples of preferred cellulose ester for use in thermoplastic applications include cellulose acetate, cellulose propionate, cellulose butyrate, cellulose acetate propionate, cellulose acetate butyrate, or a mixture thereof.

In yet another embodiment of the invention, the cellulose esters are used in coating applications. Examples of coating applications include but, are not limited to, automotive, wood, plastic, or metal coatings. Examples of preferred cellulose esters for use in coating applications include cellulose acetate, cellulose propionate, cellulose butyrate, cellulose acetate propionate, cellulose acetate butyrate, or a mixture thereof.

In still another embodiment of the invention, the cellulose esters are used in personal care applications. In personal care applications cellulose esters generally are dissolved or suspended in appropriate solvents. The cellulose ester can then act as a structuring agent, delivery agent, and film forming agent when applied to skin or hair. Examples of preferred cellulose ester for use in personal applications include cellulose acetate, cellulose propionate, cellulose butyrate, cellulose acetate propionate, cellulose acetate butyrate, cellulose hexanoate, cellulose 2-ethylhexanate, cellulose laurate, cellulose palmitate, cellulose stearate, or a mixture thereof.

In still another embodiment of the invention, the cellulose esters are used in drug delivery applications. In drug delivery applications, the cellulose ester can act as a film former such as in the coating of tablets or particles. The cellulose ester can also be used to form amorphous mixtures of poorly soluble drugs thereby improving the solubility and bioavailability of the drugs. The cellulose esters can be used in controlled drug delivery wherein the drug is released from the cellulose ester matrix in response to external stimuli such as a change in pH. Examples of preferred cellulose ester for use in drug delivery applications include cellulose acetate, cellulose propionate, cellulose butyrate, cellulose acetate propionate, cellulose acetate butyrate, cellulose acetate phthalate, or a mixture thereof.

In still another embodiment of the invention, the cellulose esters are used in applications involving solvent casting of film. Examples of these applications include photographic film and protective and compensation films for liquid crystalline displays. Examples of preferred cellulose ester for use in solvent cast film applications include cellulose triacetate, cellulose acetate, cellulose propionate, and cellulose acetate propionate.

In still another embodiment of the invention, the cellulose esters of the present invention can be used in applications involving solvent casting of film. Examples of such applications include photographic film, protective film, and compensation film for liquid crystalline displays. Examples of cellulose esters suitable for use in solvent cast film applications include, but are not limited to, cellulose triacetate, cellulose acetate, cellulose propionate, and cellulose acetate propionate.

In an embodiment of the invention, films are produced comprising cellulose esters of the present invention and are used as protective and compensation films for liquid crystalline displays (LCD). These films can be prepared by solvent casting as described in US application 2009/0096962 or by melt extrusion as described in US application 2009/0050842, both of which are incorporated in their entirety in this invention to the extent they do not contradict the statements herein.

When used as a protective film, the film is typically laminated to either side of an oriented, iodinated polyvinyl alcohol (PVOH) polarizing film to protect the PVOH layer from scratching and moisture, while also increasing structural rigidity. When used as compensation films (or plates), they can be laminated with the polarizer stack or otherwise included between the polarizer and liquid crystal layers. These compensation films can improve the contrast ratio, wide viewing angle, and color shift performance of the LCD. The reason for this important function is that for a typical set of crossed polarizers used in an LCD, there is significant light leakage along the diagonals (leading to poor contrast ratio), particularly as the viewing angle is increased. It is known that various combinations of optical films can be used to correct or "compensate" for this light leakage. These compensation films must have certain well-defined retardation (or birefringence) values, which vary depending on the type of liquid crystal cell or mode used because the liquid crystal cell itself will also impart a certain degree of undesirable optical retardation that must be corrected.

Compensation films are commonly quantified in terms of birefringence, which is, in turn, related to the refractive index n. For cellulose esters, the refractive index is approximately 1.46 to 1.50. For an unoriented isotropic material, the refractive index will be the same regardless of the polarization state of the entering light wave. As the material becomes oriented, or otherwise anisotropic, the refractive index becomes dependent on material direction. For purposes of the present invention, there are three refractive indices of importance denoted $n_x$, $n_y$, and $n_z$, which correspond to the machine direction (MD), the transverse direction (TD), and the thickness direction, respectively. As the material becomes more anisotropic (e.g. by stretching), the difference between any two refractive indices will increase. This difference in refractive index is referred to as the birefringence of the material for that particular combination of refractive indices. Because there are many combinations of material directions to choose from, there are correspondingly different values of birefringence. The two most common birefringence parameters are the planar birefringence defined as $\Delta_e = n_x - n_y$, and the thickness birefringence ($\Delta_{th}$) defined as: $\Delta_{th} = n_z - (n_x + n_y)/2$. The birefringence $\Delta_e$ is a measure of the relative in-plane orientation between the MD and TD and is dimensionless. In contrast, $\Delta_{th}$ gives a measure of the orientation of the thickness direction, relative to the average planar orientation.

Optical retardation (R) is related the birefringence by the thickness (d) of the film: $R_e = \Delta_e d = (n_x - n_y)d$; $R_{th} = \Delta_{th} d = [n_z - (n_x + n_y)/2]$. Retardation is a direct measure of the relative phase shift between the two orthogonal optical waves and is typically reported in units of nanometers (nm). Note that the definition of $R_{th}$ varies with some authors, particularly with regards to the sign ($\pm$).

Compensation films or plates can take many forms depending upon the mode in which the LCD display device operates. For example, a C-plate compensation film is isotropic in the x-y plane, and the plate can be positive (+C) or negative (−C). In the case of +C plates, $n_x = n_y < n_z$. In the case of −C plates, $n_x = n_y > n_z$. Another example is A-plate compensation film which is isotropic in the y-z direction, and again, the plate can be positive (+A) or negative (−A). In the case of +A plates, $n_x > n_y = n_z$. In the case of −A plates, $n_x < n_y = n_z$.

In general, aliphatic cellulose esters provide values of $R_{th}$ ranging from about 0 to about −350 nm at a film thickness of 60 µm. The most important factors that influence the observed $R_{th}$ is type of substituent and the degree of substitution of hydroxyl ($DS_{OH}$). Film produced using cellulose mixed esters with very low $DS_{OH}$ in Shelby et al. (US 2009/0050842) had $R_{th}$ values ranging from about 0 to about −50 nm. By significantly increasing $DS_{OH}$ of the cellulose mixed ester, Shelton et al. (US 2009/0096962) demonstrated that larger absolute values of $R_{th}$ ranging from about −100 to about −350 nm could be obtained. Cellulose acetates typically provide $R_{th}$ values ranging from about −40 to about −90 nm depending upon $DS_{OH}$.

One aspect of the present invention relates to compensation film comprising regioselectively substituted cellulose esters wherein the compensation film has an Rth range from about −400 to about +100 nm. In another embodiment of the invention, compensation films are provided comprising regioselectively substituted cellulose esters having a total DS from about 1.5 to about 2.95 of a single acyl substituent (DS≦0.2 of a second acyl substituent) and wherein the compensation film has an Rth value from about −400 to about +100 nm.

In one embodiment of the invention, the regioselectively substituted cellulose esters utilized for producing films are selected from the group consisting of cellulose acetate, cellulose propionate, and cellulose butyrate wherein the regioselectively substituted cellulose ester has a total DS from about 1.6 to about 2.9. In another embodiment of the invention, the compensation film has $R_{th}$ values from about −380 to about −110 nm and is comprised of a regioselectively substituted cellulose propionate having a total DS of about 1.7 to about 2.5. In yet another embodiment, the compensation film has $R_{th}$ values from about −380 to about −110 nm and is comprised of a regioselectively substituted cellulose propionate having a total DS of about 1.7 to about 2.5 and a ring RDS ratio for $C_6/C_3$ or $C_6/C_2$ of at least 1.05. In another embodiment, the compensation film has $R_{th}$ values from about −60 to about +100 nm and is comprised of regioselectively substituted cellulose propionate having a total DS of about 2.6 to about 2.9. In yet another embodiment, the compensation film has $R_{th}$ values from about −60 to about +100 nm and is comprised of regioselectively substituted cellulose propionate having a total DS of about 2.6 to about 2.9 and a ring RDS ratio for $C_6/C_3$ or $C_6/C_2$ of at least 1.05. In another embodiment, the compensation film has $R_{th}$ values from about 0 to about +100 nm and is comprised of a regioselectively substituted cellulose propionate having a total DS of about 2.75 to about 2.9. In yet another embodiment, the compensation film has $R_{th}$ values from about 0 to about +100 nm and is comprised of a regioselectively substituted cellulose propionate having a total DS of about 2.75 to about 2.9 and a ring RDS ratio for $C_6/C_3$ or $C_6/C_2$ of at least 1.05.

Another aspect of the present invention relates to compensation film with an $R_{th}$ range from about −160 to about +270 nm comprised of regioselectively substituted cellulose esters having a total DS from about 1.5 to about 3.0 of a plurality of 2 or more acyl substituents. In one embodiment of this invention, the cellulose esters can be selected from the group consisting of cellulose acetate propionate, cellulose acetate butyrate, cellulose benzoate propionate, and cellulose benzoate butyrate; wherein the regioselectively substituted cellulose ester has a total DS from about 2.0 to about 3.0. In another embodiment, the compensation film has $R_{th}$ values from about −160 to about 0 nm and is comprised of a regioselectively substituted cellulose acetate propionate having a total DS of about 2.0 to about 3.0, a ring RDS ratio for $C_6/C_3$ or $C_6/C_2$ of at least 1.05, and a carbonyl RDS ratio for at least one acyl substituent for $C_6/C_3$ or $C_6/C_2$ of at least about 1.3. In another embodiment, the compensation film has $R_{th}$ values from about +100 to about +270 nm and is comprised of a regioselectively substituted cellulose benzoate propionate having a total DS of about 2.0 to about 3.0, a ring RDS ratio for $C_6/C_3$ or $C_6/C_2$ of at least 1.05, and a carbonyl RDS ratio for at least one acyl substituent for $C_6/C_3$ or $C_6/C_2$ of at least about 1.3. In another embodiment, the compensation film has $R_{th}$ values from about +100 to about +270 nm and is comprised of a regioselectively substituted cellulose benzoate propionate having a total DS of about 2.0 to about 2.85, a benzoate DS of about 0.75 to about 0.90, a ring RDS ratio for $C_6/C_3$ or $C_6/C_2$ of at least 1.05, a carbonyl RDS ratio for propionate for $C_6/C_3$ or $C_6/C_2$ of at least about 1.3.

Further information concerning ionic liquids, their use in the production of cellulose esters and cellulose derivatives, the use of cosolvents with ionic liquids in processes to produce cellulose esters and cellulose derivatives, and treatment of cellulose esters are disclosed in U.S. patent application entitled "Cellulose Esters and Their Production In Carboxylated Ionic Liquids" filed on Feb. 13, 2008 and having Ser. No. 12/030,387 and its Continuation-In-Part Application entitled "Regioselectively Substituted Cellulose Esters Produced In A Carboxylated Ionic Liquid Process and Products Produced Therefrom" filed on Sep. 12, 2009; U.S. patent application entitled "Cellulose Esters and Their Production in Halogenated Ionic Liquids filed on Aug. 11, 2008 and having Ser. No. 12/189,415 and its Continuation-In-Part Application entitled "Regioselectively Substituted Cellulose Esters Produced In A Halogenated Ionic Liquid Process and Products Produced Therefrom" filed on Sep. 12, 2009; U.S. patent application "Production of Ionic Liquids" filed on Feb. 13, 2008 having Ser. No. 12/030,425; and U.S. patent application entitled "Reformation of Ionic Liquids" filed on Feb. 13, 2008 having Ser. No. 12/030,424; U.S. patent application entitled "Treatment of Cellulose Esters" filed on Aug. 11, 2008, having Ser. No. 12/189,421; U.S. patent application entitled "Production of Cellulose Esters In the Presence of A Cosolvent" filed on Aug. 11, 2008 having Ser. No. 12/189,753; and U.S. Provisional Application entitled "Regioselectively Substituted Cellulose Esters and Their Production in Ionic Liquids" filed on Aug. 13, 2008 having Ser. No. 61/088,423; all of which are incorporated by reference to the extent they do not contradict the statements herein.

This invention can be further illustrated by the following examples, although it will be understood that these examples are included merely for purposes of illustration and are not intended to limit the scope of the invention.

EXAMPLES

Materials and Methods

Experimental tetraalkylammonium alkylphosphates were prepared as described in the examples. The degree of polymerization of the cellulose was determined by capillary viscometry using copper ethylenediamine (Cuen) as the solvent. Prior to dissolution, the cellulose was typically dried for 14-18 h at 50° C. and 5 mm Hg.

The relative degree of substitution (RDS) at $C_6$, $C_3$, and $C_2$ in the cellulose ester of the present invention was determined by carbon 13 NMR following the general methods described in "Cellulose Derivatives", ACS Symposium Series 688, 1998, T. J. Heinze and W. G. Glasser, Editors, herein incorporated by reference to the extent it does not contradict the statements herein. Briefly, the carbon 13 NMR data was obtained using a JEOL NMR spectrometer operating at 100 MHz or a Bruker NMR spectrometer operating at 125 MHz. The sample concentration was 100 mg/mL of DMSO-$d_6$. Five mg of $Cr(OAcAc)_3$ per 100 mg of sample were added as a relaxation agent. The spectra were collected at 80° C. using a pulse delay of 1 second. Normally, 15,000 scans were collected in each experiment. Conversion of a hydroxyl to an ester results in a downfield shift of the carbon bearing the hydroxyl and an upfield shift of a carbon gamma to the carbonyl functionality. Hence, the RDS of the C2 and C6 ring carbons were determined by direct integration of the substituted and unsubstituted $C_1$ and $C_6$ carbons. The RDS at $C_3$ was determined by subtraction of the sum of the $C_6$ and $C_2$ RDS from the total DS. The carbonyl RDS was determined by integration of the carbonyl carbons using the general assignments described in Macromolecules, 1991, 24, 3050-3059, herein incorporated by reference to the extent it does not contradict the statements herein. In the case of cellulose mixed esters containing a plurality of acyl groups, the cellulose ester was first converted to a fully substituted cellulose mixed p-nitrobenzoate ester. The position of the p-nitrobenzoate esters indicate the location of the hydroxyls in the cellulose mixed ester.

Color measurements were made following the general protocol of ASTM D1925. Samples for color measurements were prepared by dissolving 1.7 g of cellulose ester in 41.1 g of n-methylpyrrolidone (NMP). A HunterLab Color Quest XE colorimeter with a 20 mm path length cell operating in transmittance mode was used for the measurements. The colorimeter was interfaced to a standard computer running Easy Match QC Software (HunterLab). Values (L*; white to black, a*; + red to – green, b*; + yellow to – blue) were obtained for NMP (no cellulose ester) and for the cellulose ester/NMP solutions. Color difference (E*) between the NMP solvent and the sample solutions were then calculated (E*=$[(\Delta a^*)2+[(\Delta b^*)2+[(\Delta L^*)2]0.5$ where $\Delta$ is the value for the sample solutions minus the value for the solvent. As the value for E* approaches zero, the better the color.

Sulfur and phosphorus concentration in cellulose esters were determined by Inductively Coupled Plasma-Optical Emission Spectroscopy (ICP). The samples were prepared by digestion in concentrated $HNO_3$ followed by dilution with ultra pure water after addition of an internal standard. The final matrix was 5% by weight $HNO_3$ in water. The samples were then analyzed for phosphorus (177.434 nm) and sulfur (180.669 nm) content using a Perkin Elmer 2100DV Inductively Coupled Plasma-Optical Emission Spectrometer that was calibrated using NIST traceable standards.

Solvent casting of film was performed according to the following general procedure. Dried cellulose ester and 10 wt % plasticizer were added to a 90/10 wt % solvent mixture of $CH_2Cl_2$/methanol (or ethanol) to give a final concentration of 5-30 wt % based on cellulose ester+plasticizer to produce a cellulose ester/solvent mixture. The cellulose ester/solvent mixture was sealed, placed on a roller, and mixed for 24 hours to create a uniform cellulose ester solution. After mixing, the cellulose ester solution was cast onto a glass plate using a doctor blade to obtain a film with the desired thickness. Casting was conducted in a fume hood with relative humidity controlled at 50%. After casting, the film and glass were allowed to dry for one hour under a cover pan (to minimize rate of solvent evaporation). After this initial drying, the film was peeled from the glass and annealed in a forced air oven for 10 minutes at 100° C. After annealing at 100° C., the film was annealed at a higher temperature (120° C.) for another 10 minutes.

Film optical retardation measurements were made using a J. A. Woollam M-2000V Spectroscopic Ellipsometer having a spectral range of 370 to 1000 nm. RetMeas (Retardation Measurement) program from J. A. Woollam Co., Inc. was used to obtain optical film in-plane ($R_e$) and out-of-plane ($R_{th}$) retardations. Values are reported at 589 or 633 nm at a film thickness of 60 μm.

Example 1

Preparation of Tributylmethylammonium Dimethylphosphate [TBMA]DMP

To a 1 L 3-neck round bottom flask equipped for mechanical stirring 400 g of freshly distilled tributylamine and 302 g trimethylphosphate (1 eq) were added. This resulted in two clear phases with the top phase being tributylamine. The flask was then placed in an oil bath, and the reaction mixture was blanked with $N_2$. The oil bath was heated to 120° C. and the contact mixture was stirred for 49 h resulting in a pale, yellow, homogeneous mixture. After cooling to ambient temperature, the sample solidified giving a white solid (Yield >99%).

Analysis by proton NMR indicated >99% conversion of the starting materials to tributylmethylammonium dimethylphosphate. Thermogravimetric analysis (TGA) indicated the onset of thermal decomposition of the [TBMA]DMP at ca. 240° C. Analysis by differential scanning calorimetry (DSC) showed a melt (Tm) centered at 55° C. during the first heating scan to 100° C. at 20° C./min. After cooling from the melt at 20° C./min to –100° C. and heating again to 100° C. at 20° C./min, a Tg (glass transition temperature) was observed at –52° C., two Tc (crystallization temperature) were observed at 14 and 23° C., and two Tm were observed at 54 and 66° C.

This example illustrates the preparation of a tetraalkylammonium alkylphosphate having a melting point less than 100° C.

Example 2

Dissolution of Cellulose in Tributylmethylammonium Dimethylphosphate ([TMBA]DMP)

Prior to cellulose dissolution, 52.26 g tributylmethylammonium dimethylphosphate ([TBMA]DMP) was added to a 3-neck 100 mL round bottom flask equipped for mechanical stirring and with a $N_2$/vacuum inlet. The flask was placed in an 80° C. oil bath, and the [TBMA]DMP was stirred for 17 hours at ca. 0.9 mm Hg. The [TBMA]DMP was cooled to 70° C., and an iC10 diamond tipped infrared probe (Mettler-Toledo AutoChem, Inc., Columbia, Md., USA) was inserted to measure absorbance.

To the [TBMA]DMP was added 7.46 g (12.5 wt %) of cellulose (DP ca. 335) while stirring vigorously (5 min addition). The cellulose easily and quickly dispersed in the [TBMA]DMP to produce a cellulose solution. Vacuum was applied with the aid of a bleed valve (ca. 1 mm Hg), and the oil bath was heated to 100° C. By the time the cellulose and [TBMA]DMP reached 100° C. (ca. 60 min), the mixture was a viscous, translucent cellulose solution with no visible particles. The cellulose solution was stirred for an additional 65 min at 100° C. at which point it was a clear cellulose solution.

FIG. 1 shows the dissolution of 12.5 wt % cellulose in [TBMA]DMP. Cellulose absorbance was measured at 1000 cm$^{-1}$. The cellulose was added to the [TBMA]DMP while heated to 70° C. in order to insure dispersion of the cellulose and to avoid clumping. By the time all of the cellulose was added, the cellulose was beginning to dissolve. The contact temperature was then increased to 100° C. As the contact temperature increased, the rate of cellulose dissolution increased significantly and by the time the cellulose and [TBMA]DMP reached 100° C., the cellulose was essentially dissolved in the [TBMA]DMP to produce a homogeneous cellulose solution.

This example shows that cellulose can be rapidly and easily dissolved in [TBMA]DMP at significant concentrations.

Example 3

Figure 2:
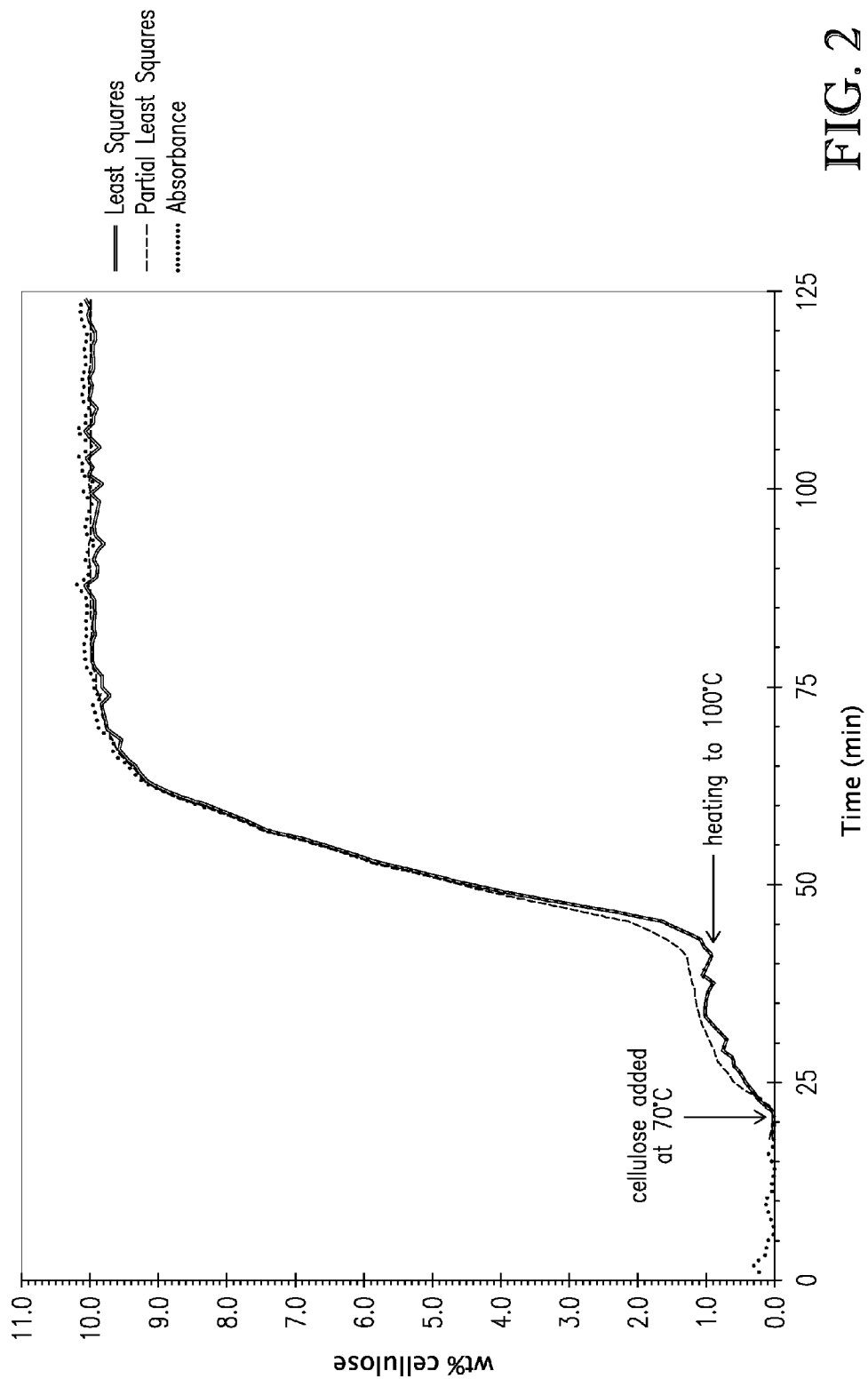
FIG. 2 shows modeled wt % cellulose and the experimental absorbance values for 10 wt % cellulose dissolved in [TBMA]DMP.

Development of Models for Analysis of the Amount of Cellulose Dissolved in Tetraalkylammonium Alkyl Phosphates Following the general procedure of Example 2, different concentrations of cellulose (2.5, 5.0, 7.5, 10.0, 12.5 wt %)

were dissolved in tributylmethylammonium dimethylphosphate. Using initial and final concentrations, absorbances at the different concentrations were fit using a partial least-squares method over the spectral region of 860-1320 cm$^{-1}$. Additionally, a linear least squares fit was made to the second derivative of a cellulose absorbance band at 1157 cm$^{-1}$. This band was selected on the basis that there is little or no interference from tetraalkylammonium alkylphosphates in this spectral region. FIG. 2 shows modeled wt % cellulose, and the experimental absorbance values for 10 wt % cellulose dissolved in tributylmethylammonium dimethylphosphate. As can be seen, the modeled wt % cellulose and the experimental absorbance were in excellent agreement.

This example illustrates that models based on in situ infrared spectroscopy can be used to determine the concentration of cellulose in tetraalkylammonium alkylphosphates. This type of analysis is particularly useful when the cellulose is only partially soluble at a given concentration in a particular tetraalkylammonium alkyl phosphate.

Example 4

Comparison of the Dissolution of Cellulose in Different Tetraalkylammonium Alkylphosphates The following additional tetraalkylammonium alkylphosphates were prepared by the general method of Example 1: tributylmethylammonium dimethylphosphate [TBMA]DMP, tripentylmethylammonium dimethylphosphate [TPMA]DMP, trioctylmethylammonium dimethylphosphate [TOMA]DMP, trimethylethanolammonium dimethylphosphate [TMEA]DMP, trimethylethoxyethanolammonium dimethylphosphate [TMEEA]DMP, and trimethylethylacetateammonium dimethylphosphate [TMEAA]DMP. Following the general method of Example 2 using a fixed concentration of cellulose (7.5 wt %, DP 335), the solubility of cellulose in each of these tetraalkylammonium alkylphosphates were evaluated. The total amount of cellulose dissolved was determined using the linear model described in Example 3. The results are summarized in Table 1.

TABLE 1

The amount of cellulose dissolved in selected tetraalkylammonium alkylphosphates.

| tetraalkylammonium alkylphosphates | wt % cellulose dissolved | % cellulose dissolved |
|---|---|---|
| [TBMA]DMP | 7.5 | 100 |
| [TMEA]DMP | 6.5 | 87 |
| [TMEEA]DMP | 5.9 | 79 |
| [TPMA]DMP | 2.1 | 28 |
| [TMEAA]DMP | 1.0 | 13 |
| [TOMA]DMP | 0.0 | 0 |

This example illustrates that alkyl groups attached to the ammonium cation with the same alkyl phosphate anion have a very significant effect on the solubility of cellulose in the ionic liquid. For example, in the case of methylammonium, as the other 3 alkyl groups are changed in the order of C4 (tributyl), C5 (tripentyl), C8 (trioctyl), the weight % cellulose dissolved is 100, 28, and 0 wt %, respectively. With trimethylammonium, moving from ethanol to ethoxyethanol diminishes cellulose solubility. Upon acetylation of the ethanol, cellulose solubility is significantly reduced. Clearly, cellulose has excellent solubility in certain tetraalkylammonium alkylphosphates. Only by careful experimentation can the utility of a particular tetraalkylammonium alkylphosphates in cellulose dissolution be determined.

Example 5

Dissolution of Cellulose in a Mixture of Tributylmethylammonium Dimethylphosphate and Dimethylsulfoxide To a 3-neck 100 mL round bottom flask equipped for mechanical stirring and having a N$_2$/vacuum inlet and an iC10 diamond tipped infrared probe (Mettler-Toledo AutoChem, Inc., Columbia, Md., USA) was added a mixture of 51.31 g of [TBMA]DMP and 17.10 g of dimethyl sulfoxide (DMSO) (25 wt %). While stirring rapidly at room temperature, 7.60 g of cellulose (10 wt %, DP ca. 335) was added to the [TBMA]DMP and DMSO solution (6 min addition). The cellulose/[TBMA]DMP/DMSO mixture was stirred for an additional 4 min to insure that the cellulose was well dispersed before raising a preheated 80° C. oil bath to the flask. Ten minutes after raising the oil bath, all of the cellulose was dissolved giving a pale yellow, low viscosity, cellulose solution.

This example illustrates that cosolvents may be utilized when dissolving cellulose in tetraalkylammonium alkylphosphates as a means to lower cellulose solution viscosity.

Example 6

Esterification of Cellulose Dissolved in Tributylmethylammonium Dimethylphosphate in the Absence of a Catalyst A 7.5 wt % cellulose solution was prepared according to the general method of Example 2. The temperature of the cellulose solution was adjusted to 80° C. prior to adding 3 equivalents of acetic anhydride (Ac$_2$O) drop wise (6 min) to produce an acylated cellulose solution. Samples of the acylated cellulose solution were removed during the course of the reaction, and the cellulose ester was isolated by precipitation in methanol to produce a cellulose ester slurry. The cellulose ester slurry was filtered to produce a recovered cellulose ester. Each recovered cellulose ester sample was washed with four 200 mL portions of methanol to produce a washed cellulose, then dried at 50° C., 10 mm Hg, to yield a dried cellulose ester product.

Figure 3:
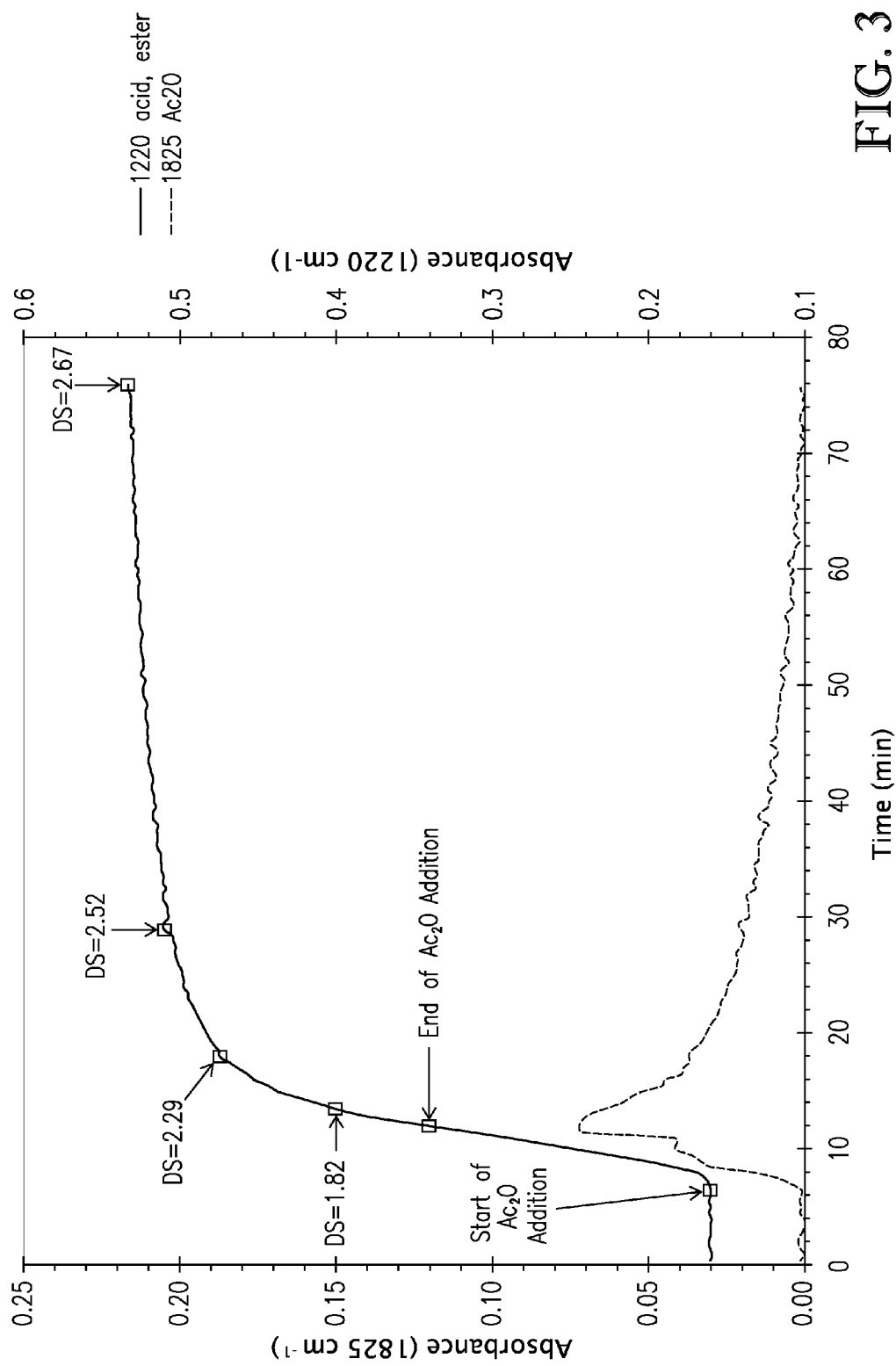
FIG. 3 shows a plot of absorbance for infrared bands at 1825 cm$^{-1}$ (acetic anhydride and 1220 cm$^{-1}$ (acetate ester and acetic acid) versus contact time during esterification (3 eq acetic anhydride) of cellulose dissolved in [TBMA]DMP.

FIG. 3 shows a plot of absorbance for infrared bands at 1825 cm$^{-1}$ (acetic anhydride and 1220 cm$^{-1}$ (acetate ester and acetic acid) versus contact time during esterification (3 eq acetic anhydride) of cellulose dissolved in [TBMA]DMP. The DS values shown in FIG. 3 were determined by proton NMR spectroscopy and correspond to the acylated cellulose solution samples removed during the course of the contact period. As FIG. 3 illustrates, the rate of reaction was very fast. After the start of anhydride addition, only 23 minutes were required to reach a DS of 2.52.

This example shows that in the esterification of cellulose dissolved in tetraalkylammonium alkylphosphates, it is not necessary to add catalysts to promote the reaction.

Example 7

Esterification of Cellulose Dissolved in 1-butyl-3-Methylimmidazolium Dimethylphosphate Comparative A 3-neck 100 mL round bottom flask was equipped for mechanical stirring, with an iC10 diamond tipped IR probe (Mettler-Toledo AutoChem, Inc., Columbia, Md., USA), and with an N2/vacuum inlet. To the flask were added 50.65 g of 1-butyl-3-methylimidazolium dimethylphosphate ([BMIm] DMP). While stirring at room temperature 4.11 g (7.5 wt %) of cellulose (DP ca. 335, 6 min addition) were added. Vacuum (2 mm Hg) was then applied with the aid of a bleed valve and a preheated 80° C. oil bath was raised to the flask. Six minutes after raising the oil bath, a clear cellulose solution was produced. The cellulose solution was stirred for an additional 11 min before the oil bath was dropped, and the cellulose solution was allowed to cool to room temperature.

9.57 g (3.7 eq) of acetic anhydride was added dropwise over the course of 10 minutes to produce a reaction mixture. After the addition was complete, the reaction mixture was stirred for 33 min before a sample was removed, and the cellulose ester precipitated in methanol (Sample 1). At this point, no color had formed in the reaction mixture. A preheated 50° C. oil bath was raised to the flask. The reaction mixture was stirred for 34 min before a sample was removed, and cellulose ester precipitated in methanol (Sample 2). There was little change in the reaction mixture color. The oil bath temperature setting was increased to 80° C. Within 13 minutes, the reaction mixture color was deep amber, and the viscosity started to increase. After an additional 8 minutes, the reaction mixture gelled. Stirring was continued for an additional 30 minutes before dropping the oil bath. The reaction mixture was a black gel. To solidify the gel, methanol was added directly to the flask (Sample 3). After filtration, each sample was washed with four 200 mL portions of methanol, and the cellulose ester solids were dried overnight at 50° C., 5 mm Hg. Sample 1 (white solid) and Sample 2 (tan solid) were soluble in solvents like DMSO and NMP. Sample 3 (black solid) was insoluble in all solvents evaluated. It is important to note that sample 2 (DS=2.48) was not soluble in acetone at 100 mg/mL; a gel was formed. In this invention, we have found that cellulose acetates prepared from cellulose dissolved in tetraalkylammonium alkylphosphates are fully soluble in acetone at 100 mg/mL when they have a DS from about 2.45 to about 2.55.

Figure 4:
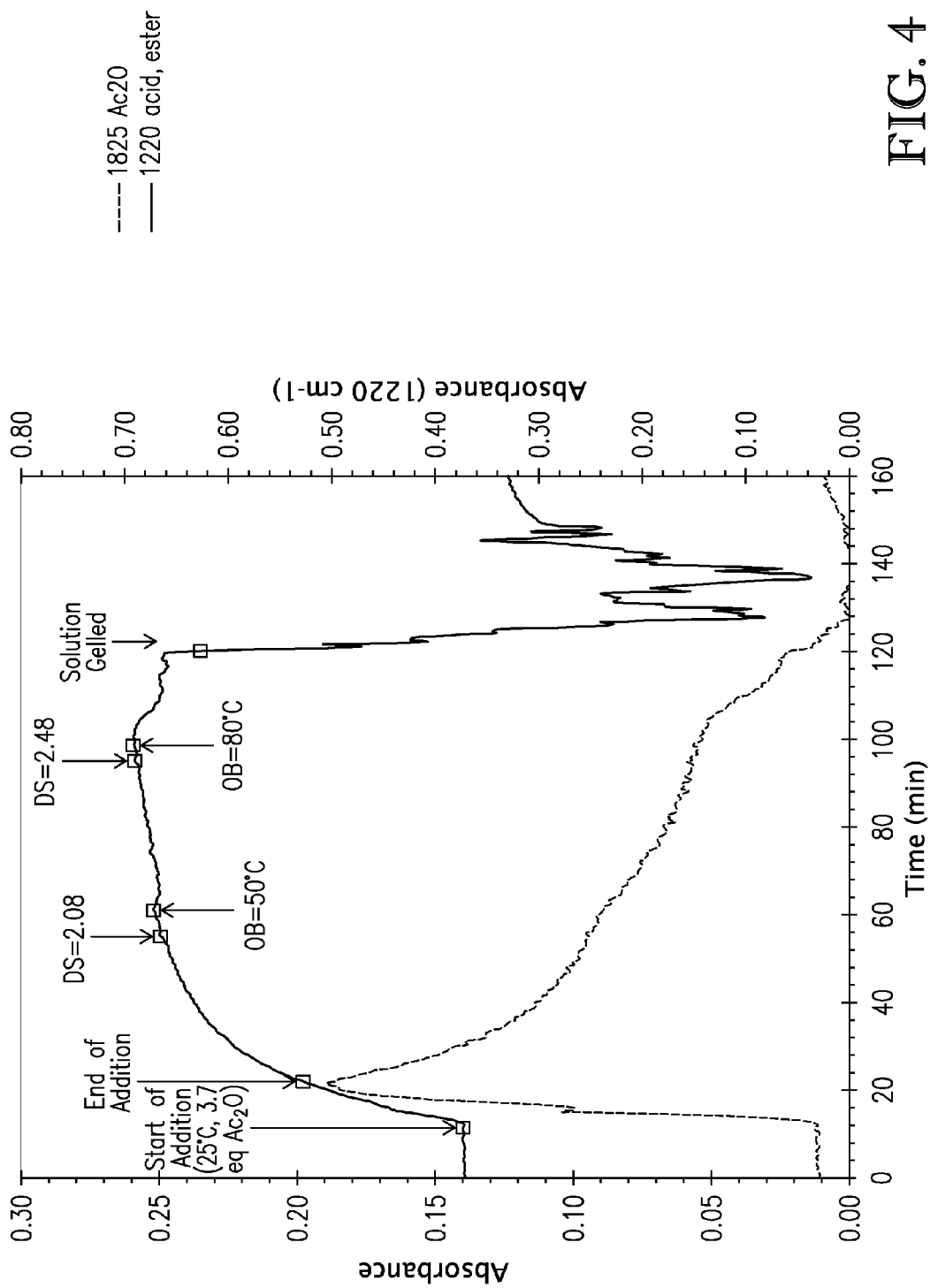
FIG. 4 shows a plot of absorbance for infrared bands at 1825 cm$^{-1}$ (acetic anhydride and 1220 cm$^{-1}$ (acetate ester and acetic acid) versus contact time during esterification of the cellulose dissolved in [BMIm]DMP.

FIG. 4 shows a plot of absorbance for infrared bands at 1825 cm$^{-1}$ (acetic anhydride and 1220 cm$^{-1}$ (acetate ester and acetic acid) versus contact time during esterification of the cellulose dissolved in [BMIm]DMP.

Figure 5:
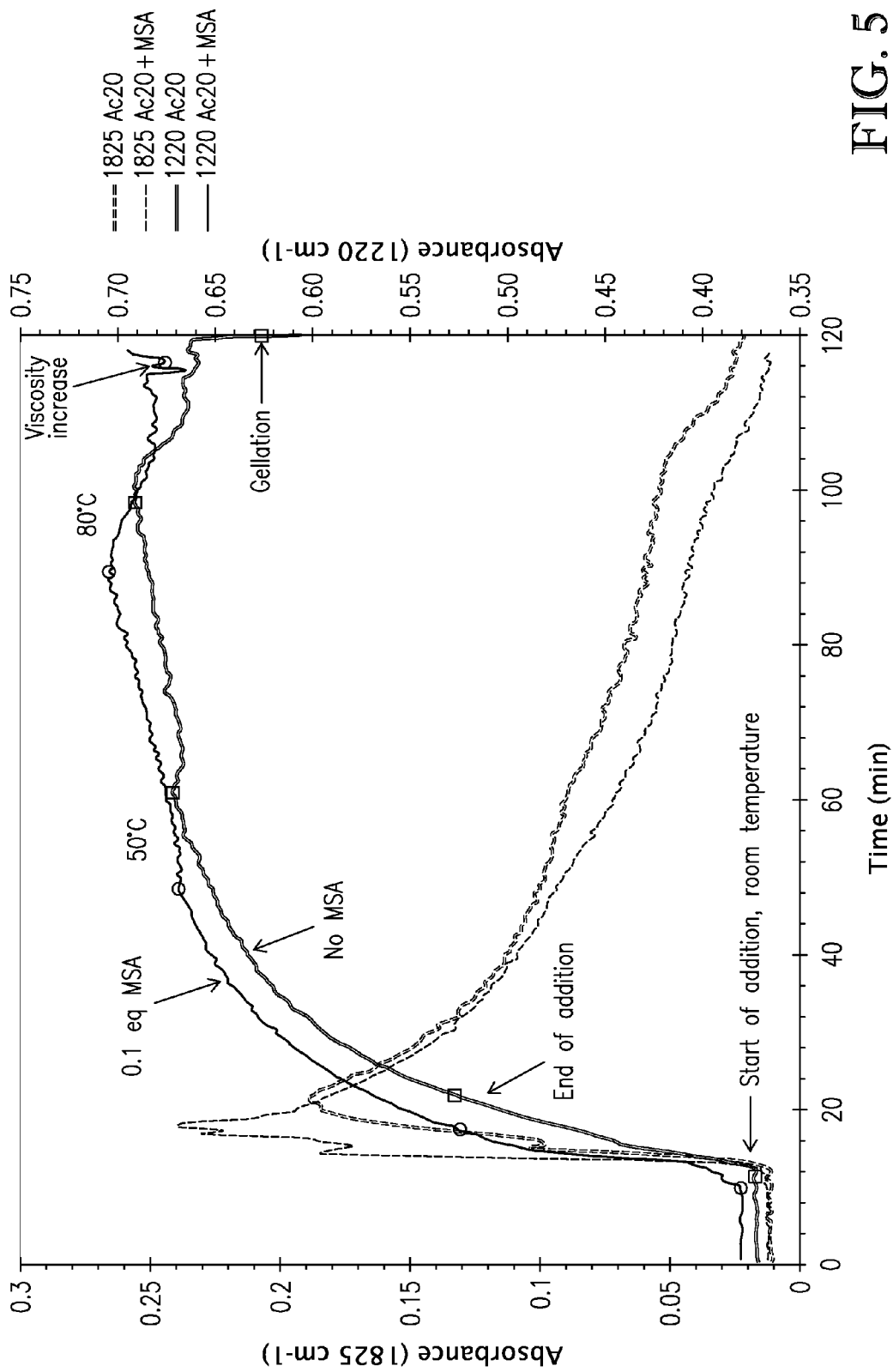
FIG. 5 compares the absorbance for infrared bands at 1825 cm$^{-1}$ (acetic anhydride and 1220 cm$^{-1}$ (acetate ester and acetic acid) versus contact time during esterification of the cellulose dissolved in [BMIm]DMP in the absence and in the presence of MSA.

Another reaction was conducted in an identical manner to prior reaction except that 0.1 eq MSA was used as a catalyst. As shown in FIG. 5, inclusion of methyl sulfonic acid (MSA) did not change the reaction rate relative to when no MSA was present. As in the case of the reaction involving no MSA, after raising the reaction temperature to 80° C., the reaction mixture viscosity was observed to increase. A sample was quickly removed and precipitated in MeOH. Within a few minutes of sampling, the reaction mixture also gelled. That is, the presence of MSA did not inhibit gelation.

These examples illustrate a number of important points. Dissolution of cellulose in [BMIm]DMP is known (Green Chemistry 2008, 10, 44-46; Green Chemistry 2007, 9, 233-242). However, this example shows that esterification of cellulose dissolved in [BMIm]DMP is not successful. Esterification of cellulose dissolved in [TBMA]DMP at 80° C. does not lead to gelation (Example 6). The cellulose ester product obtained is typically a white solid having a DS range of 2.45-2.55 and is completely soluble in acetone. In contrast, esterification of cellulose dissolved in [BMIm]DMP at 80° C. leads to rapid gelation. The cellulose ester product is always highly colored and is insoluble in all solvents. Inclusion of MSA does not change the reaction rates nor does it prevent gelation. This is in contrast to what is observed in the esterification of cellulose dissolved in [BMIm]Cl where inclusion of MSA both accelerates the rates of reaction and prevents gelation as disclosed in U.S. patent application entitled "Cellulose Esters and Their Production in Halogenated Ionic Liquids filed on Aug. 11, 2008 and having Ser. No. 12/189,415.

Example 8

Esterification of Cellulose Dissolved in Tetraalkylammonium Alkylphosphates-Strong Acid Mixtures Prior to cellulose dissolution, to a 3-neck 100 mL round bottom flask equipped for mechanical stirring and with a N$_2$/vacuum inlet, 53.46 g of tributylmethylammonium dimethylphosphate ([TBMA]DMP) were added. The flask was placed in an 80° C. oil bath, and the solution was stirred overnight under vacuum (16.5 h at ca. 0.5 mm Hg). The [TBMA]DMP was cooled to 70° C., and an IR probe (Mettler-Toledo AutoChem, Inc., Columbia, Md., USA) was inserted to obtain absorbance data.

To the [TBMA]DMP was added 5.94 g (10 wt %) of microcrystalline cellulose while stirring vigorously (5 min addition). The cellulose easily and quickly dispersed in the [TBMA]DMP. Vacuum was applied with the aid of a bleed valve (ca. 1 mm Hg), and the oil bath was heated to 100° C. By the time the cellulose and [TBMA]DMP reached 98° C. (ca. 20 min), nearly all of the cellulose was dissolved. The cellulose and [TMBA]DMP were stirred for an additional 100 min at 100° C. at which point the mixture was a clear, pale yellow, cellulose solution.

To the cellulose solution was added 1.87 g (0.5 eq) of acetic anhydride (Ac$_2$O) drop wise over the course of 3 min. The cellulose solution viscosity dropped significantly, and the cellulose solution color became slightly darker. At this point, the cellulose solution was cooled to 80° C. before adding 9.35 g (2.5 eq) Ac$_2$O drop wise over the course of 9 min to produce an acylated cellulose solution. Samples of the acylated cellulose solution were removed at different time intervals, and the cellulose ester was isolated by precipitation in 200 mL methanol to produce a cellulose ester slurry. Precipitated cellulose ester was isolated by filtration to produce a recovered cellulose ester. Each recovered cellulose ester sample was washed with four 200 mL portions of methanol to produce a washed cellulose ester then dried invacuo (50° C., ca. 10 mm Hg). Based on in situ IR, the reaction was nearly complete 11 min after the end of the 2$^{nd}$ anhydride addition. The contact period was extended further in order to see how the acylated cellulose solution color changed. As the reaction progressed, the acylated cellulose solution became darker amber, nearly brown at the end of the reaction.

Figure 6:
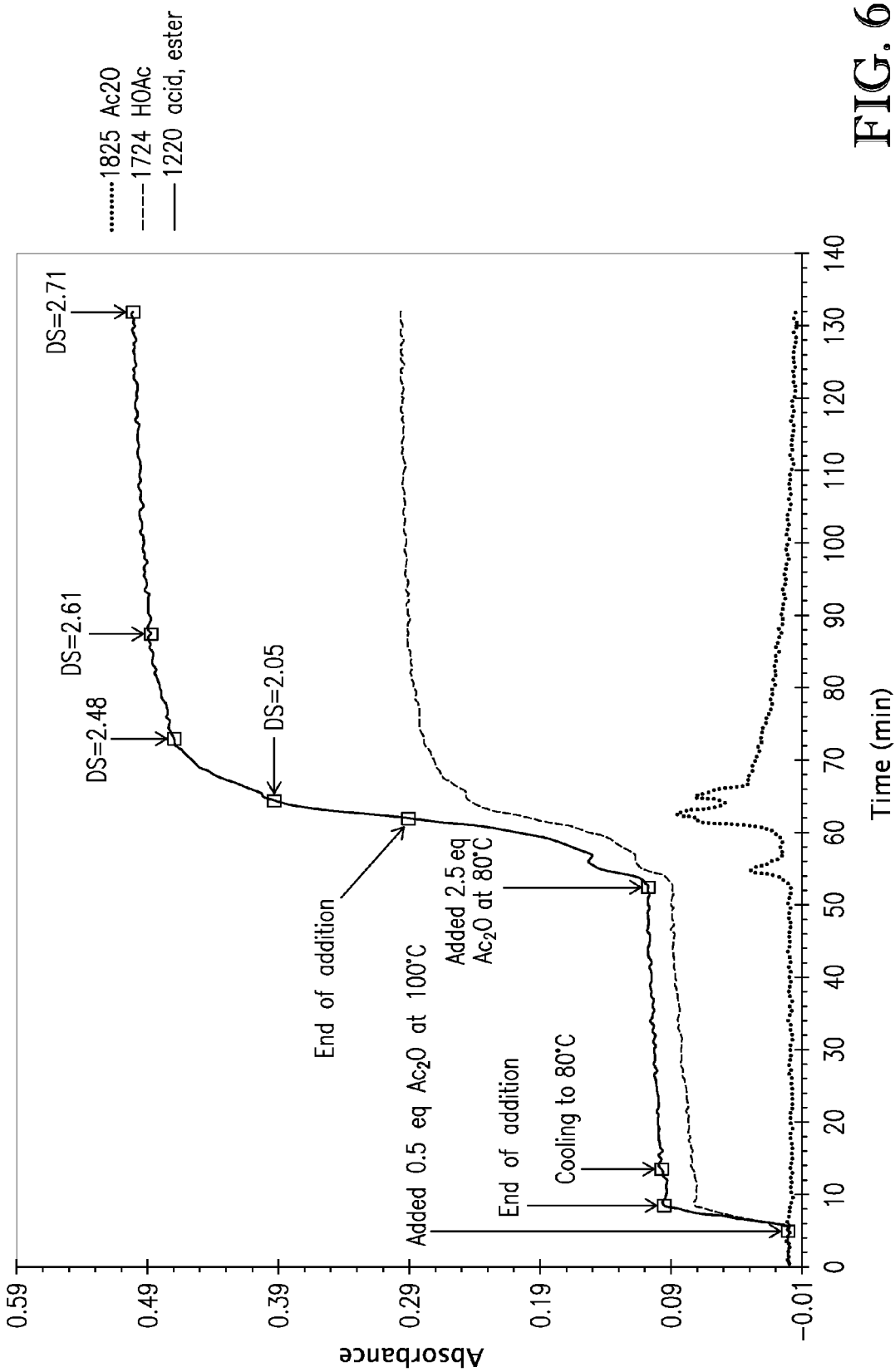
FIG. 6 shows a plot of absorbance for infrared bands at 1825 cm$^{-1}$ (acetic anhydride) and 1724 cm$^{-1}$ (acetic acid) versus contact time during esterification of cellulose dissolved in [TBMA]DMP.

FIG. 6 shows a plot of absorbance for infrared bands at 1825 cm$^{-1}$ (acetic anhydride) and 1724 cm$^{-1}$ (acetic acid shifted to a higher wave number due to interaction with the [TBMA]DMP) versus contact time during esterification of cellulose dissolved in [TBMA]DMP. The DS values shown in FIG. 6 were determined by proton NMR spectroscopy and correspond to the samples removed during the course of the contact period. As FIG. 6 illustrates, the rate of reaction at 100° C. was extremely fast. The Ac$_2$O was consumed so rapidly that Ac$_2$O was not observed during the addition. At 80° C., the rate of reaction slowed slightly but was still very rapid. After the start of 2$^{nd}$ anhydride addition, only 21 minutes were required to reach a DS of 2.48.

After precipitation, washing, and drying, sample 1 (DS=2.04) was a white solid. Sample 2 (DS=2.48) was a white solid. Sample 3 (DS=2.61) was an off-white solid.

Sample 4 (DS=2.71) was a pale tan solid. Samples 2 (DS=2.48) was fully soluble in acetone at 100 mg/mL.

The precipitation liquids were concentrated in vacuo giving [TBMA]DMP that contained 8.3 wt % residual acetic acid (HOAc). The cation:anion ratio in the [TBMA]DMP was 1:1 indicating no anion exchange.

Figure 7:
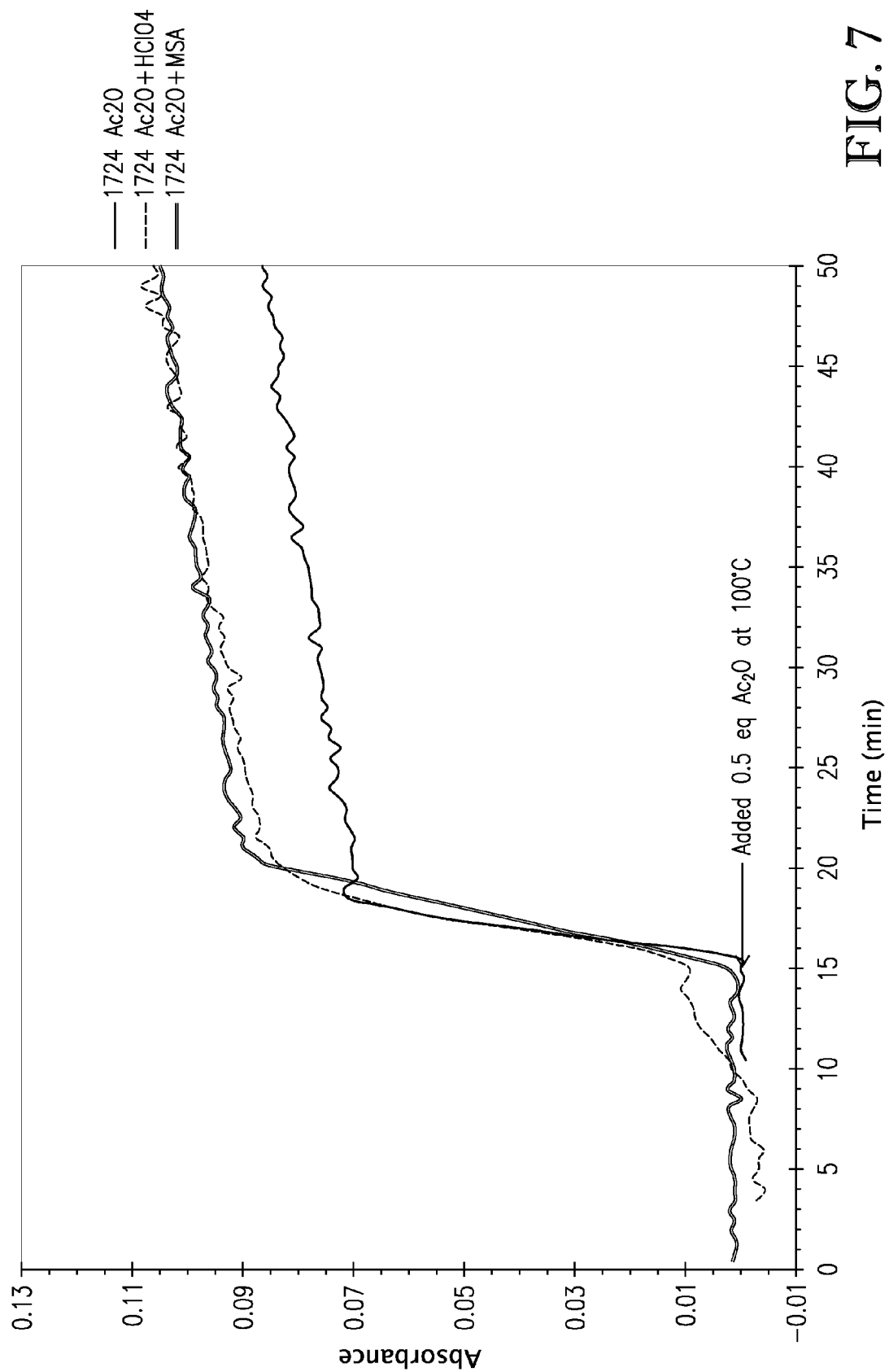
FIG. 7 shows the contact period involving the addition of 0.5 eq Ac2O at 100° C. The x axis has been shifted so that each reaction begins at the same point of anhydride addition (15 min).
Figure 8:
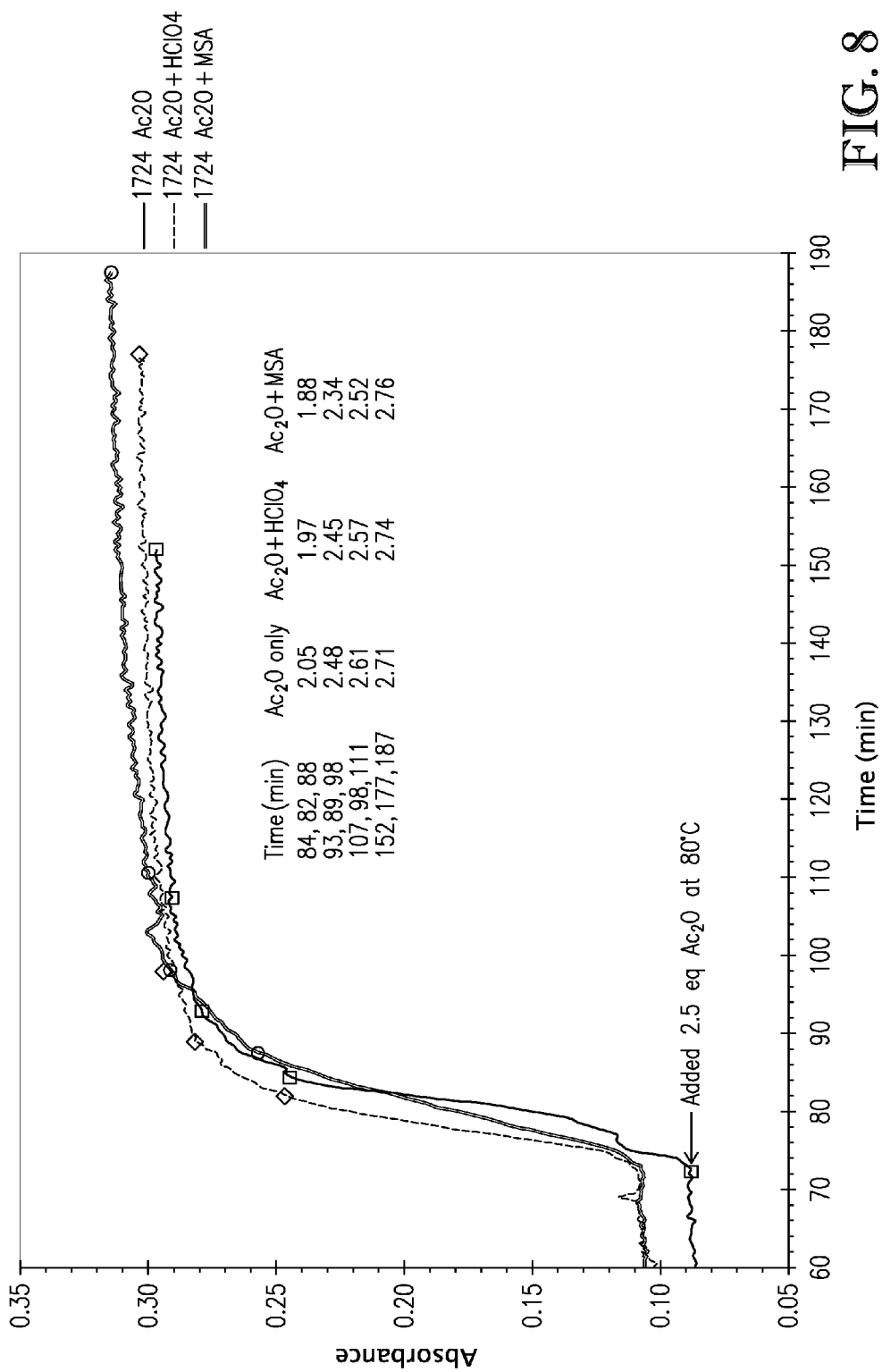
FIG. 8 shows the contact period involving the addition of 2.5 eq Ac$_2$O at 80° C. The x axis has been shifted so that each reaction begins at the same point of anhydride addition (72 min).
Figure 9:
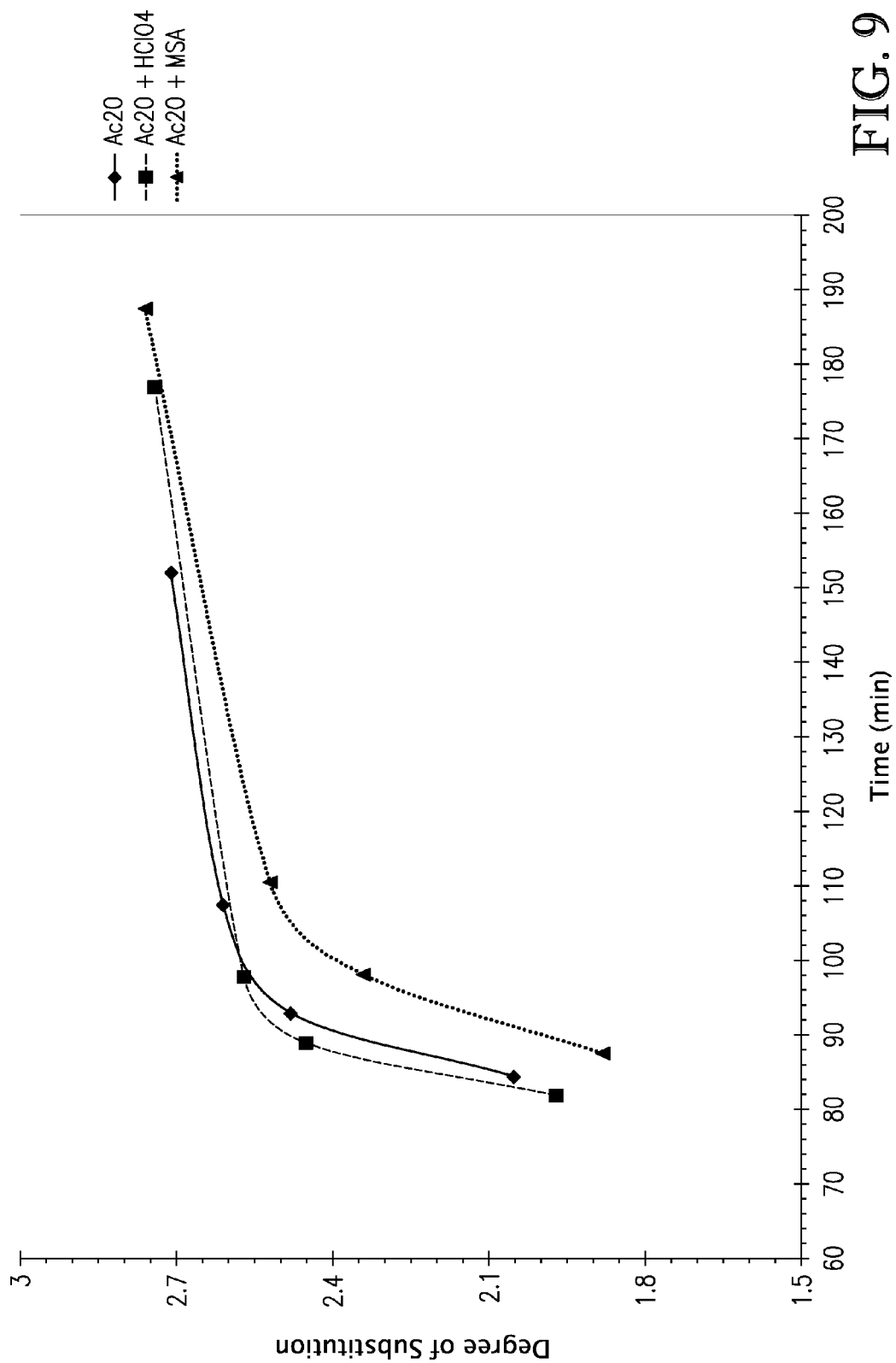
FIG. 9 shows a plot of DS versus time for the time period involving addition of 2.5 eq Ac$_2$O in the absence and presence of acid at 80° C.

Two additional reactions were conducted following the exact same protocol described above except that 1 wt % perchloric acid ($HClO_4$) (based on [TBMA]DMP) or 1 wt % methane sulfonic acid (MSA) (based on [TBMA]DMP) was added with the 0.5 eq $Ac_2O$ as a mixture. FIGS. 7 and 8 compares a plot of absorbance for infrared bands at 1724 $cm^{-1}$ versus contact time during the esterification of cellulose dissolved in [TBMA]DMP when $Ac_2O$, $Ac_2O+HClO_4$, or $Ac_2O+MSA$ are added. The DS values shown in FIG. 8 were determined by proton NMR spectroscopy and correspond to the samples removed during the course of the contact period. FIG. 7 shows the contact period involving the addition of 0.5 eq $Ac_2O$ at 100° C. The x axis has been shifted so that each reaction begins at the same point of anhydride addition (15 min). In all 3 cases, the rate of reaction at 100° C. was extremely fast. The $Ac_2O$ was consumed so rapidly that $Ac_2O$ was not observed during the addition. FIG. 8 shows the contact period involving the addition of 2.5 eq $Ac_2O$ at 80° C. The x axis has been shifted so that each reaction begins at the same point of anhydride addition (72 min). In all 3 cases, the rate of reaction slowed slightly due to a decrease in temperature but was still very rapid. That is, inclusion of these acids did not accelerate the reaction rates. In fact, comparing the initial slopes (72-90 min) of the plots and the DS values obtained for each reaction showed that inclusion of MSA slowed the reaction rates significantly. This is more easily seen by FIG. 9 which shows a plot of DS versus time for the time period involving addition of 2.5 eq $Ac_2O$ in the absence and presence of acid at 80° C. Furthermore, analysis of these samples by gel permeation chromatography (GPC, Table 2) showed that inclusion of these strong acids at high concentrations had a negligible impact on the molecular weights of the cellulose ester products. Typically, inclusion of these acids at these concentrations would significantly reduce the molecular weights of the cellulose ester products.

TABLE 2

Molecular weights and sample colors for each sample removed from the contact mixture during esterification of cellulose dissolved in [TBMA]DMP in the presence and absence of 1 wt % acid.

|  | Mn | Mw | Mz | Mw/Mn | Sample Color |
|---|---|---|---|---|---|
| $Ac_2O$ | | | | | |
| Sample 1 | 35171 | 118384 | 313653 | 3.37 | white |
| Sample 2 | 32990 | 119285 | 304868 | 3.62 | white |
| Sample 3 | 30601 | 119971 | 328116 | 3.92 | off-white |
| Sample 4 | 29996 | 125338 | 334972 | 4.18 | tan |
| $Ac_2O + HClO_4$ | | | | | |
| Sample 1 | 33266 | 120082 | 317027 | 3.61 | white |
| Sample 2 | 31528 | 124730 | 325057 | 3.96 | white |
| Sample 3 | 31788 | 129486 | 337277 | 4.07 | off-white |
| Sample 4 | 30956 | 137136 | 365184 | 4.43 | tan |
| $Ac_2O + MSA$ | | | | | |
| Sample 1 | 34895 | 114799 | 291538 | 3.29 | white |
| Sample 2 | 32423 | 114750 | 288847 | 3.54 | white |
| Sample 3 | 31805 | 117425 | 300574 | 3.69 | white |
| Sample 4 | 29832 | 121941 | 320374 | 4.09 | white |

Very surprisingly, as noted in Table 2, inclusion of MSA significantly improved the color of the reaction solution and of the cellulose ester product. In the case of $HClO_4$ (a strong oxidant), the colors of the cellulose ester products were very similar to that noted above for the reaction involving only $Ac_2O$ (no acid). In the case of MSA, all four samples removed from the acylated cellulose solution were white. The cellulose ester of Sample 4 that was isolated from the Ac2O+MSA acylated cellulose solution was dissolved in NMP, and the cellulose ester/NMP solution had an E* of 17.8 while the cellulose ester of Sample 4 isolated from the Ac2O acylated cellulose solution when dissolved in NMP had an E* of 31.4. That is, under identical contact conditions, inclusion of MSA in the acylated cellulose solution decreased solution color by ca. 45%.

Sample 2 isolated from the $Ac_2O$ acylated cellulose solution, and sample 3 from the $Ac_2O+MSA$ acylated cellulose solution were analyzed for residual sulfur and phosphorus by ICP. Sample 2 isolated from the $Ac_2O$ acylated cellulose solution was found to contain 14.8 ppm S and 12.9 ppm phosphorus. Sample 3 from the $Ac_2O+MSA$ acylated cellulose solution was found to contain 15.3 ppm S and 24.5 ppm phosphorus. This data indicates that cellulose ester product contains little or no sulfate or phosphate inorganic ester.

This example illustrates a number of surprising and important features of this invention. When using tetraalkylammonium alkylphosphates as a solvent for cellulose and during subsequent esterification of the cellulose, strong acids can be used to modify the outcome of the reaction. Inclusion of these acids has little or no impact on molecular weights nor do they accelerate reaction rates. Quite surprisingly, at sufficient concentration, the reactions rates are decreased. Inclusion of these acids in the tetraalkylammonium alkylphosphates can change or improve the color of the products obtained during esterification of the cellulose. Further, it should be noted that the addition of a small amount of anhydride to the tetraalkylammonium alkylphosphate-cellulose solutions leads to a significant reduction in solution viscosity allowing a reduction in contact temperatures.

Example 9

Preparation of Cellulose Mixed Esters from Cellulose Dissolved in Tetraalkylammonium Alkylphosphates-Strong Acid Mixtures Prior to cellulose dissolution, 61.11 g tributylmethylammonium dimethylphosphate ([TBMA]DMP) was added to a 3-neck 100 mL round bottom flask equipped for mechanical stirring and with a $N_2$/vacuum inlet. The flask was placed in an 80° C. oil bath, and the [TBMA]DMP was stirred overnight under vacuum (ca. 16.5 h at ca. 0.5 mm Hg). The liquid was cooled to 70° C., and an IR probe (Mettler-Toledo AutoChem, Inc., Columbia, Md., USA) was inserted.

To the [TBMA]DMP was added 6.79 g (10 wt %) of microcrystalline cellulose while stirring vigorously (5 min addition). The cellulose easily and quickly dispersed in the [TBMA]DMP. The oil bath was then heated to 100° C. By the time the cellulose and [TBMA]DMP reached 97° C. (ca. 35 min), nearly all of the cellulose was dissolved. The cellulose and [TBMA]DMP was stirred for an additional 75 min at 100° C. at which point the mixture was a clear, pale yellow, cellulose solution.

To the cellulose solution was added a chilled mixture of 2.14 g (0.5 eq) of acetic anhydride ($Ac_2O$) and 2.73 g propionic anhydride ($Pr_2O$) drop wise over the course of 3 minutes to produce an acylated cellulose solution. The acylated cellulose solution viscosity dropped significantly, and the acylated cellulose solution color became slightly darker. At this point, the acylated cellulose solution was cooled to 60° C. before adding a chilled mixture of 4.28 g (1 eq) of $Ac_2O$ and 5.45 g $Pr_2O$ drop wise over the course of 7 minutes. Samples of the acylated cellulose solution were removed at different time intervals, and the cellulose ester was isolated by precipitation in 200 mL of 75/25 $MeOH/H_2O$ to produce a cellulose ester slurry. The cellulose ester slurry was filtered to produce a recovered cellulose ester and precipitation liquids. Each recovered cellulose ester sample was washed with four 200 mL portions of 75/25 $MeOH/H_2O$ to produce a washed cellulose ester then dried invacuo (50° C., ca. 10 mm Hg) to produce a dried cellulose ester product.

Figure 10:
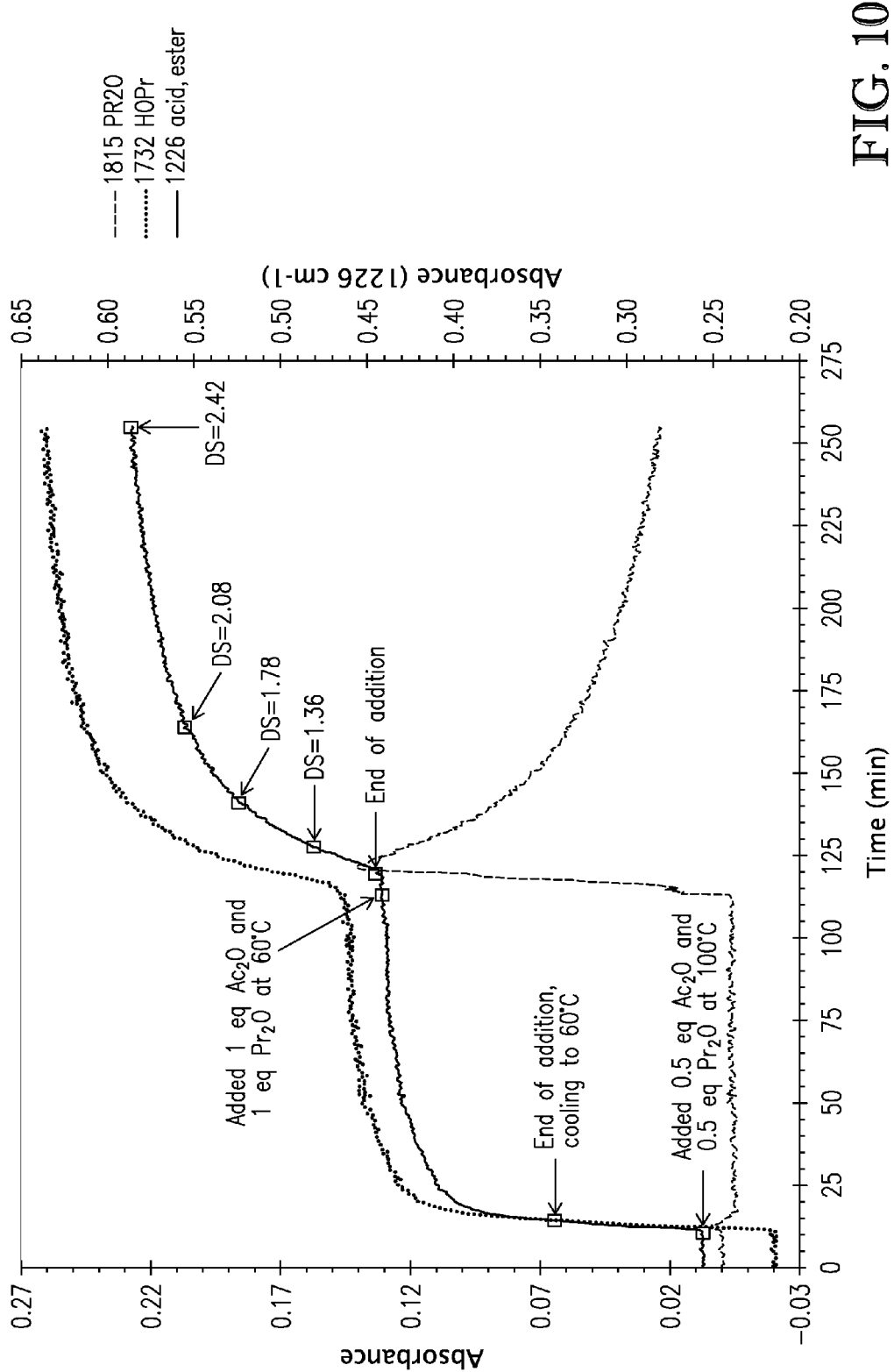
FIG. 10 shows a plot of absorbance for infrared bands at 1815 cm$^{-1}$ (anhydride), 1732 cm$^{-1}$ (acid), and 1226 cm$^{-1}$ (ester+acid) versus contact time during esterification of cellulose dissolved in [TBMA]DMP.

FIG. 10 shows a plot of absorbance for infrared bands at 1815 $cm^{-1}$ (anhydride), 1732 $cm^{-1}$ (acid shifted to a higher wave number due to interaction with the [TBMA]DMP), and 1226 $cm^{-1}$ (ester+acid) versus contact time during esterification of cellulose dissolved in [TBMA]DMP. The DS values shown in FIG. 10 were determined by proton NMR spectroscopy and correspond to the samples removed during the course of the contact period. As FIG. 10 illustrates, the rate of reaction at 100° C. was sufficiently fast that anhydride was not observed during the addition. At 60° C., the rate of reaction slowed. After the start of the $2^{nd}$ anhydride addition, 142 minutes were required to reach a DS of 2.42. Relative to Example 8, the reaction rate after the $2^{nd}$ addition was slower primarily due to the difference in contact temperature.

After precipitation, washing, and drying, samples 1 (DS=1.36), 2 (DS=1.78), and 3 (DS=2.08) were white solids. Sample 4 (DS=2.42) was a pale yellow solid.

Figure 11:
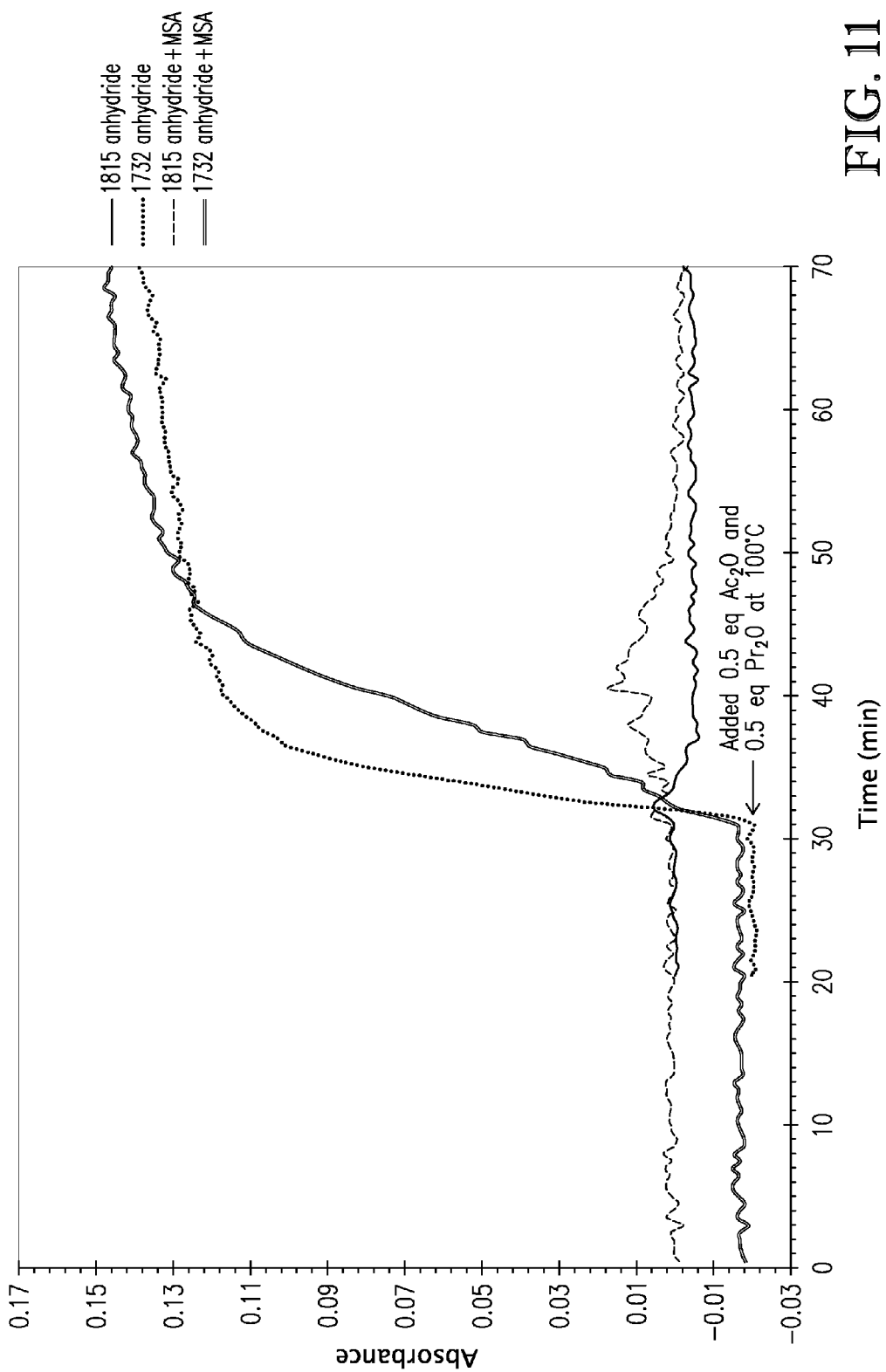
FIG. 11 compares a plot of absorbance for infrared bands at 1815 cm$^{-1}$ and 1732 cm$^{-1}$ versus contact time during the esterification of cellulose dissolved in [TBMA]DMP when Ac$_2$O/Pr$_2$O or Ac$_2$O/Pr$_2$O+MSA are added at 100° C.
Figure 12:
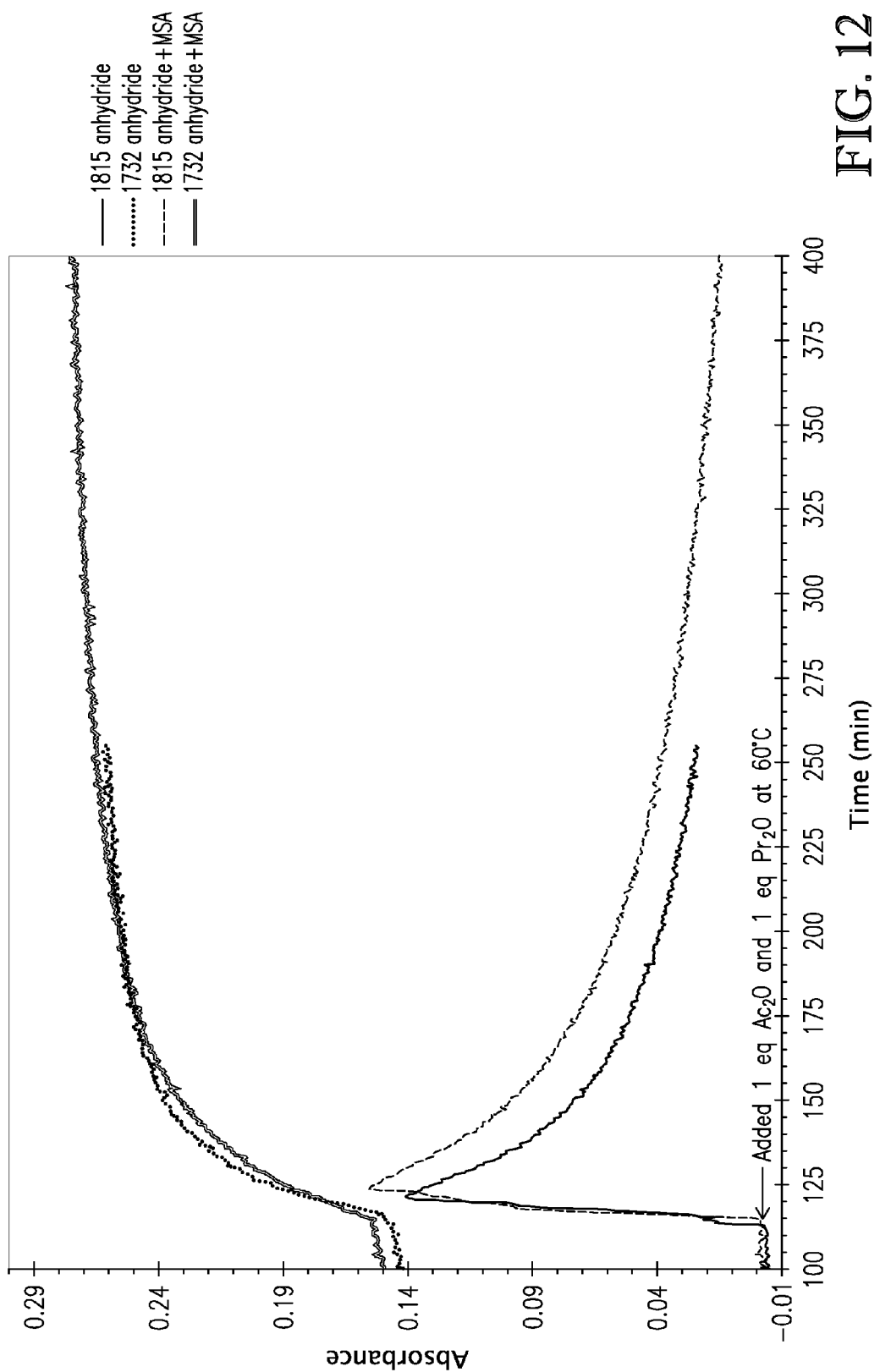
FIG. 12 compares a plot of absorbance for infrared bands at 1815 cm$^{-1}$ and 1732 cm$^{-1}$ versus contact time during the esterification of cellulose dissolved in [TBMA]DMP when Ac2O/Pr2O or Ac2O/Pr2O+MSA are added at 60° C.
Figure 13:
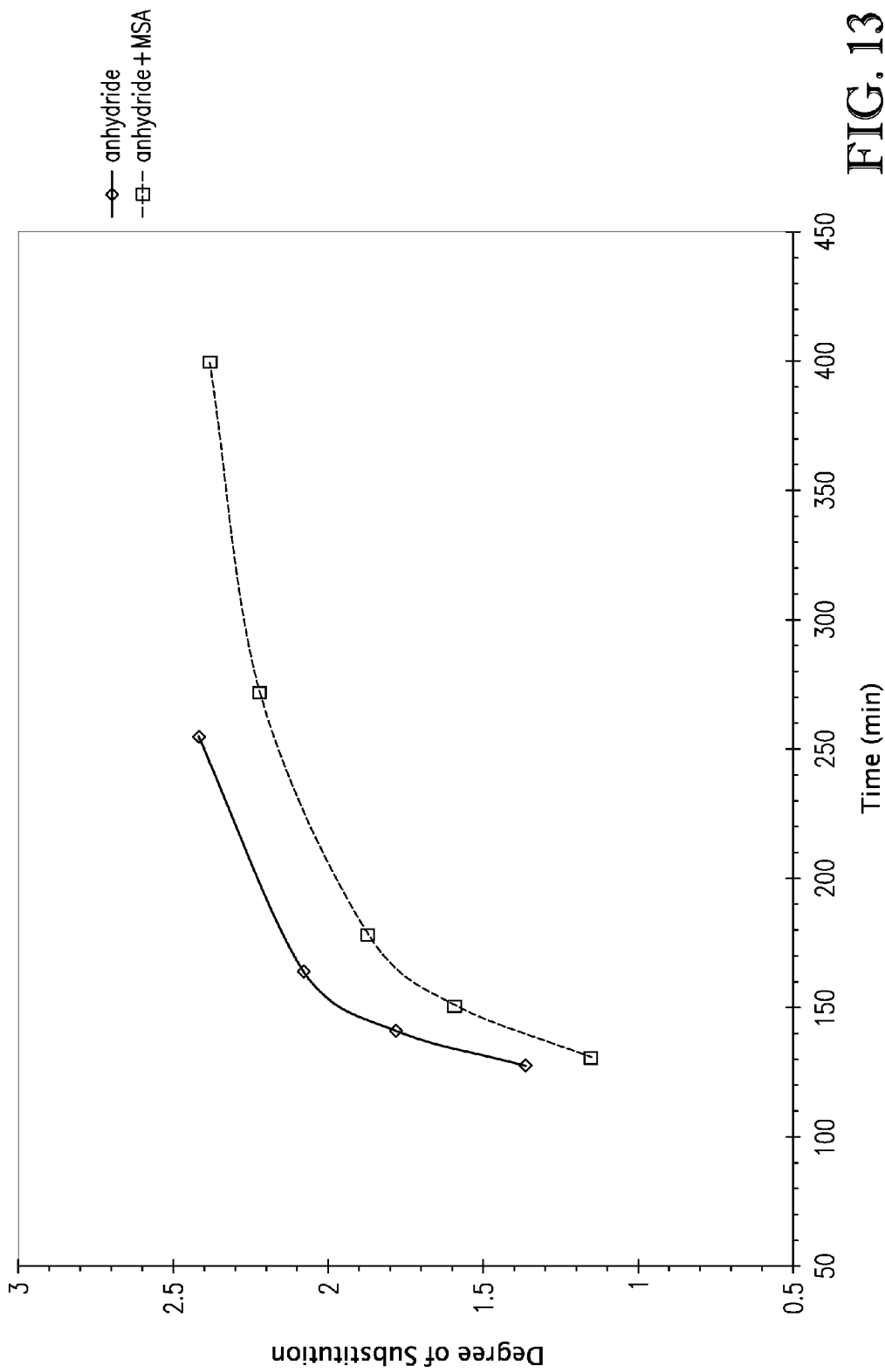
FIG. 13 shows a plot of DS versus time for the time period involving addition of 1.0 eq Ac2O and 1.0 eq Pr2O in the absence and presence of MSA at 60° C.

An additional reaction was conducted following the exact same protocol described above except 1 wt % methane sulfonic acid (MSA) was added with the 0.5 eq $Ac_2O$+0.5 eq $Pr_2O$ as a mixture. FIGS. 11 and 12 compares a plot of absorbance for infrared bands at 1815 $cm^{-1}$ and 1732 $cm^{-1}$ versus contact time during the esterification of cellulose dissolved in [TBMA]DMP when $Ac_2O/Pr_2O$ or $Ac_2O/Pr_2O$+MSA was added. FIG. 11 shows the contact period involving the addition of 0.5 eq $Ac_2O$ and 0.5 eq $Pr_2O$ at 100° C. The x axis has been shifted so that each reaction begins at the same point of anhydride addition (30 min). In both cases, the rate of reaction at 100° C. was fast. In the case of $Ac_2O/Pr_2O$ (no MSA), anhydride was consumed so rapidly that none was observed during the addition. However, with $Ac_2O/Pr_2O$+MSA, a small concentration of anhydride was observed during the addition period. FIG. 12 shows the contact period involving the addition of 1 eq $Ac_2O$ and 1 eq $Pr_2O$ with and without MSA at 60° C. The x axis has been shifted so that each reaction begins at the same point of anhydride addition (113 min). In both cases, the rate of reaction slowed due to the lower contact temperature. Based on FIG. 12, it is evident that the rate of anhydride consumption was slower when MSA was present in the contact mixture. Moreover, comparing the initial slopes (115-175 min) of the 1732 $cm^{-1}$ absorbances also indicates that inclusion of MSA slowed the reaction rate. This is easily seen in FIG. 14 which shows a plot of DS versus time for the time period involving addition of 1.0 eq $Ac_2O$ and 1.0 eq $Pr_2O$ in the absence and presence of acid at 60° C. Furthermore, analysis of these samples by gel permeation chromatography (Table 3) showed that inclusion of these strong acids at high concentrations had a negligible impact on the molecular weights of the products. In esterification of cellulose using typical solvents, inclusion of these acids at these concentrations would significantly reduce the molecular weights of the cellulose ester products.

TABLE 3

Molecular weights and sample colors for each sample removed from the contact mixture during esterification of cellulose dissolved in [TBMA]DMP in the presence and absence of 1 wt % MSA. Reaction times were measured from the point of $2^{nd}$ anhydride addition at 60° C.

| | reaction time (min) | Mn | Mw | Mz | Mw/Mn | Sample Color |
|---|---|---|---|---|---|---|
| $Ac_2O/Pr_2O$ | | | | | | |
| Sample 1 | 14 | 51153 | 151020 | 412998 | 2.95 | white |
| Sample 2 | 28 | 52243 | 143508 | 387475 | 2.75 | white |
| Sample 3 | 51 | 43906 | 134878 | 378363 | 3.07 | white |
| Sample 4 | 142 | 34520 | 131462 | 390056 | 3.81 | pale yellow |
| $Ac_2O/Pr_2O$ + MSA | | | | | | |
| Sample 1 | 9 | 53846 | 140171 | 365799 | 2.6 | white |
| Sample 2 | 29 | 49959 | 132034 | 353502 | 2.64 | white |
| Sample 3 | 56 | 46795 | 129352 | 344249 | 2.76 | white |
| Sample 4 | 150 | 37879 | 129378 | 375018 | 3.42 | white |
| Sample 5 | 277 | 33913 | 129788 | 390131 | 3.83 | white |

Additionally, MSA improved the color of the final cellulose ester product relative to when MSA is absent. The cellulose ester of Sample 5 that was isolated from the $Ac_2O$+MSA acylated cellulose solution was dissolved in NMP, and the cellulose ester/NMP solution had an E* of 14.3. The cellulose ester of Sample 4 that was isolated from the $Ac_2O$ acylated cellulose solution was also dissolved in NMP, and the cellulose ester/NMP solution had an E* of 17.8. That is, despite a longer contact time of 135 min, inclusion of MSA in the acylated cellulose solution has decreased color in the acylated cellulose solution relative to when MSA was absent.

The cellulose ester of Sample 4 isolated from the $Ac_2O/Pr_2O$ acylated cellulose solution, and the cellulose ester of Sample 5 from the $Ac_2O/Pr_2O$+MSA acylated cellulose solution were analyzed for residual sulfur and phosphorus by ICP. Sample 4 isolated from the $Ac_2O/Pr_2O$ acylated cellulose solution was found to contain 9.1 ppm S and 121.9 ppm phosphorus. Sample 5 from the $Ac_2O/Pr_2O$+MSA acylated cellulose solution was found to contain 9.4 ppm S and 67.8 ppm phosphorus. These data indicate that the cellulose ester product contains little or no sulfate or phosphate inorganic ester.

This example illustrates a number of surprising and important features of this invention. When using tetraalkylammonium alkylphosphates as a solvent for cellulose and during subsequent esterification of the cellulose, strong acids can be used to modify the outcome of the acylated cellulose solution. Inclusion of these acids has little or no impact on molecular weights, and they can decrease reaction rates. Inclusion of these acids in the tetraalkylammonium alkylphosphates can change or improve the color of the products obtained during esterification of the cellulose. Further, it should be noted that the addition of a small amount of anhydride to the cellulose solutions leads to a significant reduction in cellulose solution viscosity allowing a reduction in contact temperature. Finally, it should be noted that in preparing mixed esters as shown in this example, the distribution (regioselectivity) of the acyl groups can be controlled by the order the acylating reagents are added and the concentration at which the acylating reagents are added.

Example 10

Preparation of Cellulose Esters from Cellulose Dissolved in Tetraalkylammonium Alkylphosphates-Aprotic Solvent Mixtures Cellulose (10 wt %, DP ca. 335) was dissolved in a 75/25 mixture by weight of [TBMA]DMP/dimethylformamide according to the general procedure of Example 5 which gave a light yellow solution. The temperature of the cellulose solution was adjusted to 50° C. prior to adding 3 equivalents of $Ac_2O$ drop wise over the course of 16 minutes to produce an acylated cellulose solution. After adding the $Ac_2O$, the acylated cellulose solution was stirred for 64 min at 50° C. before raising the contact temperature to 80° C. The color of the acylated cellulose solution was light yellow throughout the contact period. Samples of the acylated cellulose solution were removed during the course of the reaction, and the cellulose ester was isolated by precipitation in methanol to produce a cellulose ester slurry. The cellulose ester slurry was filtered to produce a white, recovered cellulose ester and precipitation liquids. Each sample of the recovered cellulose ester was washed with three 200 mL portions of to produce a washed cellulose ester then dried at 50° C., 10 mm Hg to produce a dried cellulose ester product.

Figure 14:
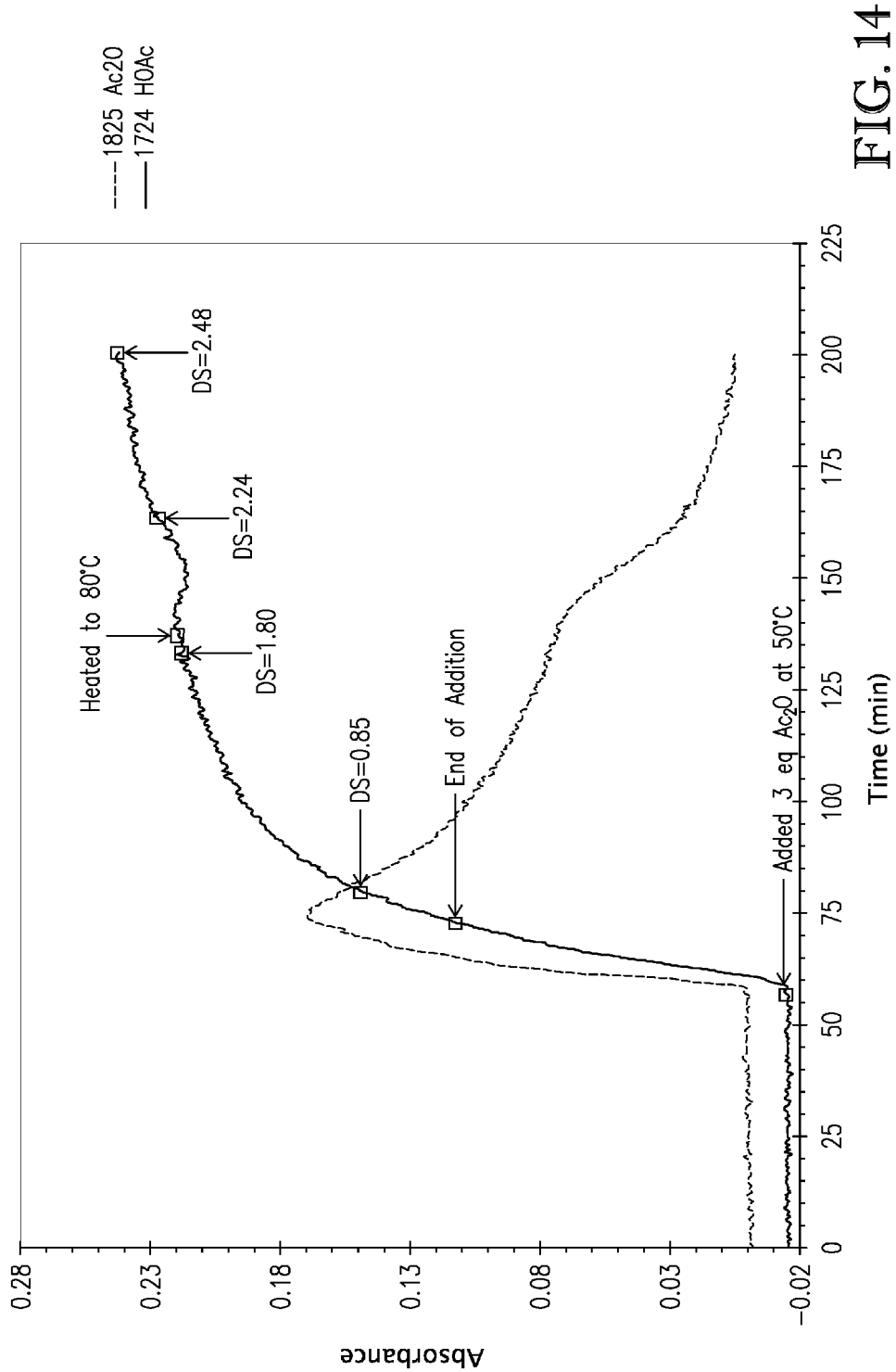
FIG. 14 shows a plot of absorbance for infrared bands at 1825 cm$^{-1}$ (acetic anhydride and 1724 cm$^{-1}$ (acetic acid) versus contact time during esterification of cellulose dissolved in 75/25 wt/wt [TBMA]DMP/DMF mixture.

FIG. 14 shows a plot of absorbance for infrared bands at 1825 $cm^{-1}$ (acetic anhydride and 1724 $cm^{-1}$ (acetic acid) versus contact time during esterification of cellulose dissolved in [TBMA]DMP/DMF. The DS values shown in FIG. 14 were determined by proton NMR spectroscopy and correspond to the acylated cellulose solution samples removed during the course of the contact period. As FIG. 14 illustrates, even at 50° C. the rate of reaction was adequate. After the start of anhydride addition, only 23 minutes were required to reach a DS of 0.85. When the contact temperature was increased to 80° C., reaction rates increased leading to a DS of 2.48 when the reaction was terminated. It is important to note that the acylated cellulose solution color was maintained throughout the contact period and that the cellulose esters obtained by sampling the acylated cellulose solution were white.

A second reaction was conducted in an identical manner using the cellulose solution prepared in Example 5 (10 wt % cellulose in 75/25 [TBMA]DMP/DMSO). In this case, even at 50° C., the acylated cellulose solution color rapidly darkened, and the acylated cellulose solution viscosity decreased significantly. When the contact temperature was increased to 80° C., the acylated cellulose solution color turned black, and the solution viscosity became extremely low. The cellulose esters were isolated by precipitating with methanol to produce a cellulose ester slurry followed by filtration to produce a recovered cellulose ester. The cellulose esters of Samples 1 and 2 were white; Sample 3 was deep brown; and Sample 4 was gray-black in appearance. Table 4 compares the molecular weights of the cellulose ester products obtained from the [TBMA]DMP/DMSO acylated cellulose solution to the cellulose ester products from the [TBMA]DMP/DMF acylated cellulose solution (Table 4). In the case of the [TBMA]DMP/DMSO acylated cellulose solution, both Mn and Mw for the cellulose acetates were significantly lower relative to the cellulose acetates from the [TBMA]DMP/DMF acylated cellulose solution. Without wishing to be bound by theory, the discoloration and cellulose ester product degradation is believed to be arise from the relatively acidic proton alpha to the SO double bond which is absent in the case of DMF.

TABLE 4

Molecular weights for each sample removed from the acylated cellulose solution during esterification of cellulose dissolved in [TBMA]DMP/DMSO or [TBMA]DMP/DMF. Reaction times are from the end of anhydride addition.

|  | reaction time (min) | DS | Mn | Mw | Mz | Mw/Mn |
|---|---|---|---|---|---|---|
| [TBMA]DMP/ DMSO |  |  |  |  |  |  |
| Sample 1 | 6 | 0.73 | 19441 | 75483 | 272860 | 3.88 |
| Sample 2 | 60 | 1.68 | 8531 | 28050 | 146489 | 3.29 |
| Sample 3 | 86 | 2.12 | 8413 | 41964 | 383794 | 4.99 |
| Sample 4 | 113 | 2.23 | 7717 | 43316 | 389919 | 5.61 |
| [TBMA]DMP/ DMF |  |  |  |  |  |  |
| Sample 1 | 7 | 0.85 | 25365 | 120596 | 499556 | 4.75 |
| Sample 2 | 60 | 1.80 | 23833 | 126008 | 502791 | 5.29 |
| Sample 3 | 91 | 2.24 | 21452 | 128833 | 513726 | 6.01 |
| Sample 4 | 128 | 2.48 | 18857 | 134760 | 553723 | 7.15 |

This example shows that although a variety of aprotic solvents can be used as co-solvents with tetraalkylammonium alkylphosphates to dissolve cellulose, only selected aprotic solvents, e.g. N,N-dimethylformamide or N-methylpyrrolidone, are appropriate co-solvents during cellulose esterification. In general, any aprotic solvent having a dielectric constant greater than about 30 that does not bear an acidic proton leading to side reactions is suitable for use in cellulose dissolution and esterification when used in conjunction with tetraalkylammonium alkylphosphates.

Example 11

Preparation of Cellulose Acetate Propionate from Cellulose Dissolved in 75/25 Tributylmethylammonium Dimethylphosphate/N-Methylpyrrolidone Cellulose (10 wt %, DP ca. 335) was dissolved in a 75/25 mixture by weight of [TBMA]DMP/NMP at 100° C. in 10 minutes according to the general procedure of Example 5 which gave a light yellow cellulose solution. To the cellulose solution at 100° C. was added 3.3 eq $Pr_2O$ (contained trace amount of $Ac_2O$) drop wise over the course of 13 minutes to produce an acylated cellulose solution. Fifteen minutes from the end of addition, the IR absorbance values begin to plateau, and the absorbance values indicated that the DS was near the desired value. The IR probe was removed from the acylated cellulose solution, and the acylated cellulose solution was immediately poured into 300 mL of 75/25 Methanol/$H_2O$ while mixing with a Heidolph homogenizer to produce a cellulose ester slurry comprising precipitated cellulose ester and precipitation liquids. The precipitated cellulose ester was isolated by filtration than washed 3× with 200 mL portions of 75/25 MeOH/$H_2O$ to produce a washed cellulose ester before drying overnight at 10 mm Hg, 50° C. which provided 11.9 g of a snow white, dried cellulose ester solid. Analysis by $^1H$ NMR revealed that the cellulose ester had a DS of 2.34 ($DS_{Pr}$=2.30, $DS_{Ac}$=0.04). Analysis by quantitative carbon 13 NMR showed that the dried cellulose ester product was regioselectively substituted having a ring RDS of: RDS $C_6$=0.97, RDS $C_3$=0.64, RDS $C_2$=0.73. The cellulose ester product was fully soluble in a variety of solvents including DMSO, NMP, acetone, and 90/10 $CH_2Cl_2$/MeOH at 100 mg/1 mL.

This example illustrates that cellulose can be rapidly dissolved in tetraalkylammonium-aprotic solvents mixtures then esterified at elevated temperatures to obtain high quality cellulose esters.

Example 12

Casting of Film and Film Optical Measurements

A series of essentially 6,3- and 6,2-regioselectively substituted cellulose esters (1-3) were prepared according to the general procedure of Example 11 (high $C_6$ RDS). Commercial (Comparative Examples 4 and 6) cellulose esters available from Eastman Chemical Company, were produced by the general procedures described in U.S. Patent Publication 2009/0096962 and U.S. Patent Publication 2009/0050842. Comparative Example 5 was prepared as described in U.S. Patent Publication 2005/0192434. The cellulose ester in Example 5 is essentially 2,3-regioselectively substituted and differed from the examples of the present invention in that it has a low RDS at $C_6$ while the cellulose esters of the present invention have a high RDS at $C_6$. The ring RDS was determined for each sample before film was cast, and the film optical properties determined. The results are summarized in Table 5.

TABLE 5

The degree of substitution, relative degree of substitution, and out-of-plane retardation (nm) for compensation film for cellulose esters of the present invention versus comparative (C) cellulose esters.

| Example | DS | $DS_{Pr}$ | $DS_{Ac}$ | RDS $C_6$ | RDS $C_3$ | RDS $C_2$ | $R_{th}$ (589) |
|---|---|---|---|---|---|---|---|
| 1 | 2.49 | 2.44 | 0.05 | 1.00 | 0.70 | 0.78 | −118.7 |
| 2 | 2.45 | 2.44 | 0.01 | 1.00 | 0.68 | 0.76 | −140.4 |
| 3 | 2.10 | 2.08 | 0.02 | 0.95 | 0.60 | 0.55 | −381.9 |
| 4 (C) | 2.73 | 2.69 | 0.04 | 0.83 | 0.98 | 0.90 | −29.2 |
| 5 (C) | 1.99 | 1.94 | 0.05 | 0.36 | 0.80 | 0.83 | −80.2 |
| 6 (C) | 1.93 | 1.77 | 0.16 | 0.56 | 0.71 | 0.66 | −209.9 |

Figure 15:
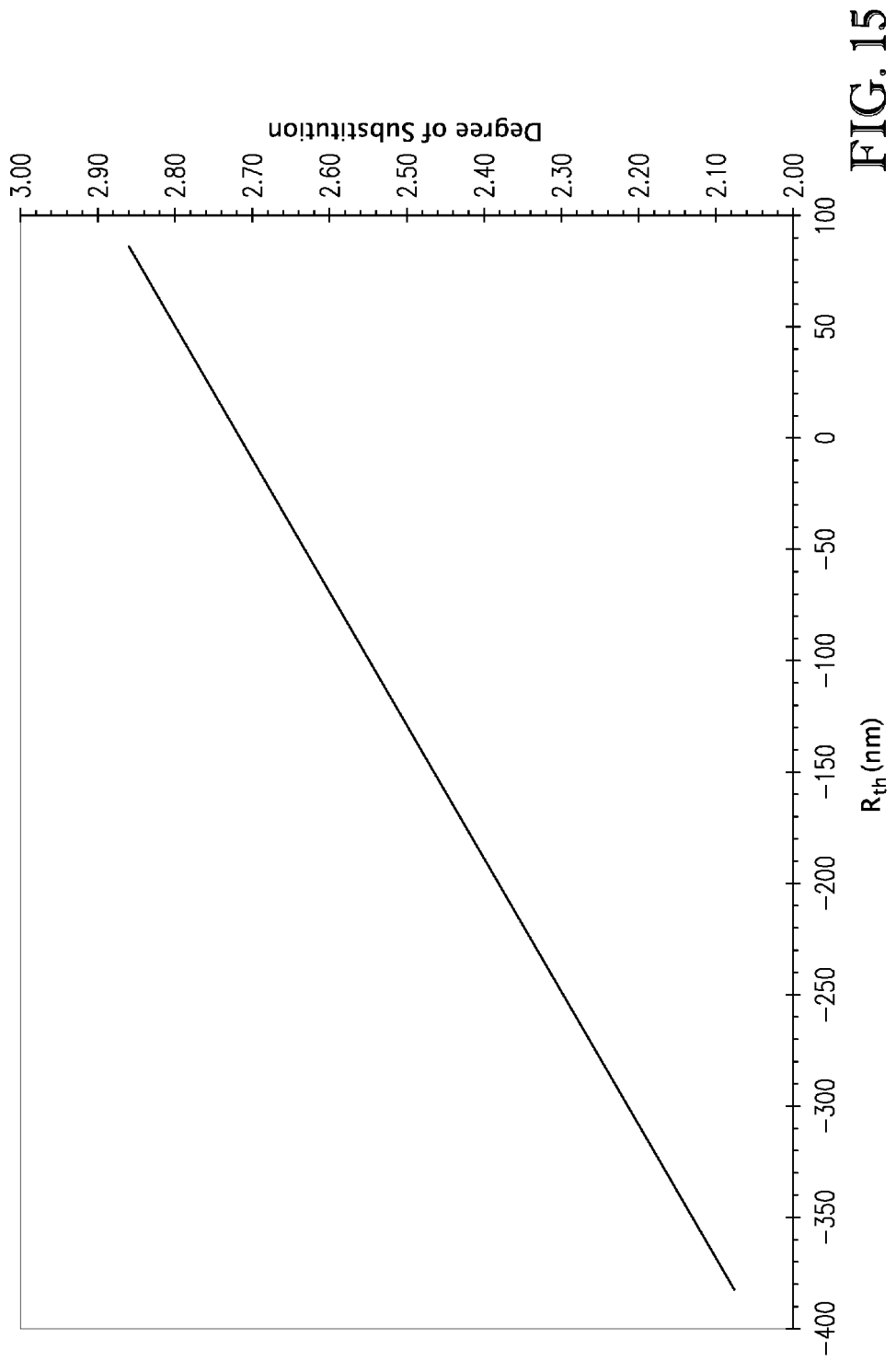
FIG. 15 shows the relationship between R$_{th}$ and the total degree of substitution for the regioselectively substituted cellulose esters of the present invention.

Comparing the values of $R_{th}$ for the 6,3-, 6,2-cellulose propionate (Example 3, DS=2.10 $C_6/C_3$=1.58, $C_6/C_2$=1.73, DS*$C_6/C_3$=3.3, DS*$C_6/C_2$=3.6) to the 2,3-cellulose propionate (Example 5, DS=1.99, $C_6/C_3$=0.45, $C_6/C_2$=0.43, DS*$C_6/C_3$=0.90, DS*$C_6/C_2$=0.86), it was evident that the 6,3-, 6,2-cellulose propionate provided a much more negative $R_{th}$ value (−382 nm versus −80 nm) even though the two cellulose esters had similar DS values. Similarly, the $R_{th}$ value was significantly more negative for Example 3 relative to Example 6 (DS=1.93 $C_6/C_3$=0.79, $C_6/C_2$=0.85, DS*$C_6/C_3$=1.5, DS*$C_6/C_2$=1.6). When the total DS of the regioselectively substituted 6,3-, 6,2-cellulose propionate was increased (Examples 1 and 2), the values of $R_{th}$ increased rapidly and significantly. For example, at a DS of 2.45 (Example 2), $R_{th}$ increased to −140 nm. If the DS is increased slightly to DS 2.49 (Example 2), $R_{th}$ increased further to −119 nm. As FIG. 15 illustrates, if the total DS was increased further, $R_{th}$ became positive. This behavior was significantly different relative to that observed with commercial cellulose esters (cf. Example 4).

This example illustrates that the substitution pattern of the cellulose ester can significantly impact out-of-plane retardation. Specifically, the regioselectively substituted cellulose esters of the present invention can provide retardation values not accessible using cellulose esters with different substitution patterns. At lower total DS, $R_{th}$ for the cellulose propionates of the present invention was much more negative relative to conventional cellulose propionates. At a higher total DS, $R_{th}$ for the cellulose propionates of the present invention are less negative or more positive relative to conventional cellulose propionates.

Example 13

Preparation of Cellulose Acetate Propionate Benzoate from a Regioselectively Substituted Cellulose Acetate Propionate The cellulose acetate propionate prepared in Example 11 (5 g) and pyridine (50 g) was charged to a 300 mL, round-bottom flask equipped with a mechanical stirrer and water condenser. The mixture was stirred at room temperature under nitrogen atmosphere to yield a clear solution. Benzoyl chloride (12.8 g) was then added drop wise through an addition funnel. After the completion of addition (ca. 1 h), the temperature was raised to 70° C. The mixture was stirred for additional 5 h and then allowed to cool to room temperature. The resulting solution was precipitated into methanol (800 g) with vigorous stirring, filtered, washed repeatedly with methanol, and dried under vacuum to yield a fibrous product (4.7 g). Analysis by $^1$H NMR revealed a $DS_{Pr}$=2.29, $DS_{Ac}$=0.04, $DS_{Bz}$=0.70. Analysis by $^{13}$C NMR revealed that the regioselectivity of the initial sample was preserved under the reaction conditions.

Following the general procedure for film casting and for measuring film optical properties, the cellulose acetate propionate benzoate was found to have an out-of-plane retardation ($R_{th}$, 633) of +156 nm at a film thickness of 43 μm (+218 at 60 μm).

This example showed that regioselective placement of aliphatic acyl groups led to cellulose esters with high $C_6/C_3$ or $C_6/C_2$ ratios followed by subsequent placement of an aromatic group at C2 and C3 provided cellulose esters having large, positive values of $R_{th}$. This example showed that these types cellulose esters can be prepared by a 2-step process without perturbing the substitution pattern established in the first step.

Example 14

Preparation of Cellulose Benzoate Propionate from Cellulose Dissolved in 70/30 Tributylmethylammonium Dimethylphosphate/N-Methylpyrrolidone Using a Staged Anhydride Addition Cellulose (10 wt %, DP ca. 335) was dissolved in a 70/30 mixture by weight of [TBMA]DMP/NMP at 100° C. according to the general procedure of Example 5 which gave a light yellow cellulose solution. To the cellulose solution at 100° C. was added 2.5 eq $Pr_2O$ drop wise over the course of 3 minutes, to produce an acylated cellulose solution. Ten minutes after the end of $Pr_2O$ addition, benzoic anhydride (4 eq) was added in one portion as a melt (melted at 85° C.). The acylated cellulose solution was stirred for an additional 35 minutes at which time the IR absorbance values indicated that the DS was near the desired value. The IR probe was removed from the acylated cellulose solution, and the acylated cellulose solution was immediately poured into 300 mL of methanol while mixing with a Heidolph homogenizer to produce a cellulose benzoate propionate slurry. The cellulose benzoate propionate was isolated by filtration then washed 8× with 200 mL portions of methanol before drying overnight at 10 mm Hg, 50° C. Analysis by $^1$H NMR revealed that the cellulose benzoate propionate had a DS of 2.91 ($DS_{Pr}$=2.58, $DS_{Bz}$=0.33). Analysis by quantitative carbon 13 NMR showed that the product was regioselectively substituted having a ring RDS of: RDS $C_6$=1.00, RDS $C_3$=0.91, RDS $C_2$=1.00 and a benzoate carbonyl RDS of: RDS $C_6$=0.04, RDS $C_3$=0.12, RDS $C_2$=0.17. The product was soluble in a variety of solvents including DMSO, NMP, and $CH_2Cl_2$.

Following the general procedure for film casting and for measuring film optical properties, the cellulose benzoate propionate was found to have an out-of-plane retardation ($R_{th}$, 589) of +50.5 nm at a film thickness of 27 μm (+112.2 at 60 μm).

This example showed that by employing a staged addition in which the aliphatic reagent is added first followed by addition of the aromatic reagent led to regioselective placement of aliphatic acyl groups (high $C_6/C_3$ or $C_6/C_2$ ratios) and installation of the aromatic group at $C_2$ and $C_3$. Compensation film prepared from these regioselective substituted cellulose esters exhibited large, positive values of $R_{th}$.

That which is claimed is:

1. A process for producing cellulose esters, said process comprising:
   a) contacting cellulose with at least one tetraalkylammonium alkylphosphate to form a cellulose solution;
   b) contacting said cellulose solution with at least one acylating reagent at a contact temperature and contact time sufficient to produce an acylated cellulose solution comprising at least one cellulose ester;
   c) contacting said acylated cellulose solution with at least one non-solvent to cause said cellulose ester to precipitate to produce a cellulose ester slurry comprising precipitated cellulose ester and said tetraalkylammonium alkylphosphate; and
   d) separating at least a portion of said precipitated cellulose ester from said cellulose ester slurry to produce a recovered cellulose ester and precipitation liquids comprising said tetraalkylammonium alkylphosphate.

2. The process for producing cellulose esters according to claim 1 wherein said acylating reagent comprises at least one compound selected from the group consisting of $C_1$-$C_{20}$ straight- or branched-chain alkyl or aryl carboxylic anhydrides, carboxylic acid halides, diketene, and acetoacetic acid esters.

3. The process for producing cellulose esters according to claim 2 wherein said carboxylic anhydride comprises at least one compound selected from the group consisting of acetic anhydride, propionic anhydride, butyric anhydride, isobutyric anhydride, valeric anhydride, hexanoic anhydride, 2-ethylhexanoic anhydride, nonanoic anhydride, lauric anhydride, palmitic anhydride, stearic anhydride, benzoic anhydride, substituted benzoic anhydrides, phthalic anhydride, and isophthalic anhydride.

4. The process for producing cellulose esters according to claim 2 wherein said carboxylic acid halide comprises at least one compound selected from the group consisting of acetyl halides, propionyl halides, butyryl halides, hexanoyl halides, 2-ethylhexanoyl halides, lauroyl halides, palmitoyl halides, benzoyl halides, substituted benzoyl halides, and stearoyl halides.

5. The process for producing cellulose esters according to claim 2 wherein said acetoacetic acid ester comprises at least one compound selected from the group consisting of methyl acetoacetate, ethyl acetoacetate, propyl acetoacetate, butyl acetoacetate, and tert-butyl acetoacetate.

6. The process for producing cellulose esters according to claim 1 wherein said cellulose solution and said acylating reagent are contacted at a temperature in the range of from about 20° C. to about 140° C.

7. The process for producing cellulose esters according to claim 1 wherein said cellulose solution and said acylating reagent are contacted for a time in the range of about 1 minute to about 48 hours.

8. The process for producing cellulose esters according to claim 1 wherein said acylating reagent is added to said cellulose solution in one addition.

9. The process for producing cellulose esters according to claim 8 wherein about 0.1 equivalents to about 20 equivalents of acylating reagent are added during said one addition period, wherein equivalents is the number of moles of acylating reagent per mole of anhydroglucose.

10. The process for producing cellulose esters according to claim 1 wherein said acylating reagent is added in stages.

11. The process for producing cellulose esters according to claim 10 wherein a total of 0.5 equivalents to about 20 equivalents of acylating reagent is added to said cellulose solution; and wherein about 0.1 equivalents to about 2 equivalents of acylating reagent is added during one addition period, and the remaining acylating reagent is added in one or more different addition periods.

12. The process for producing cellulose esters according to claim 1 wherein said non-solvent comprises a $C_1$-$C_8$ alcohol, water, or a mixture thereof.

13. The process for producing cellulose esters according to claim 12 wherein the amount of non-solvent is at least 10 volumes based on the total volume of said acylated cellulose solution.

14. The process for producing cellulose esters according to claim 13 wherein the amount of non-solvent is at least 0.5 volumes based on the total volume of said acylated cellulose solution.

15. The process for producing cellulose esters according to claim 1 wherein the contact time required for precipitation of said cellulose ester is from about 1 to about 300 minutes.

16. The process for producing cellulose esters according to claim 1 wherein the contact temperature for precipitation ranges from about 0 to about 120° C.

17. The process for producing cellulose esters according to claim 1 wherein at least 50 weight percent of said precipitation liquids of the cellulose ester slurry is removed from said recovered cellulose ester.

18. The process for producing cellulose esters according to claim 1 further comprising: washing said recovered cellulose ester with a wash liquid to produce a washed cellulose ester.

19. The process for producing cellulose esters according to claim 18 wherein said wash liquid comprises a non-solvent.

20. The process for producing cellulose esters according to claim 18 wherein said wash liquid comprises a non-solvent and a bleaching agent.

21. The process for producing cellulose esters according to claim 20 wherein the amount of said bleaching agent ranges from about 0.001 to about 50 weight percent based on the total weight of the wash liquid.

22. The process for producing cellulose esters according to claim 20 wherein said bleaching agent comprises at least one compound selected from the group consisting of chlorites, hypohalites, peroxides, peracids, metals, sodium sulfites, perborates, chlorine dioxide, oxygen, and ozone.

23. The process for producing cellulose esters according to claim 18, further comprising: drying said washed cellulose ester to produce a dried cellulose ester product.

24. The process for producing cellulose esters according to claim 1 further comprising: separating said tetraalkylammonium alkylphosphate from said precipitation liquids to produce a recycled tetraalkylammonium alkylphosphate.

25. The process for producing cellulose esters according to claim 24 further comprising substantially removing at least one compound selected from the group consisting of alcohols, water, residual carboxylic acids, and cosolvents from said precipitation liquids by at least one liquid/liquid separation process to produce said recycled tetraalkylammonium alkylphosphate.

26. The process for producing cellulose esters according to claim 24 further comprising removing only a portion of said alcohol from said precipitation liquids by a liquid/liquid separation process to produce a fractionated precipitation liquid; wherein said fractionated precipitation liquid comprises tetraalkylammonium alkyl phosphates, carboxylic acids, alcohols, and water.

27. The process for producing cellulose esters according to claim 26 wherein the total amount of alcohol in said fractionated precipitation liquid is in the range of from about 0.1 to about 60 weight percent.

28. The process for producing cellulose esters according to claim 26 further comprising:
converting at least a portion of said carboxylic acid contained in the fractionated precipitation liquids to alkyl esters by reacting said carboxylic acids with said alcohol present in the fractionated precipitation liquids to produce a reformed fractionated precipitation liquid; and
removing at least one compound selected from the group consisting of alkyl esters, alcohols, and water from the fractionated precipitation liquid to produce said recycled tetraalkylammonium alkylphosphate.

29. The process for producing cellulose esters according to claim 1, wherein said cellulose solution further comprises one or more ionic liquids comprising an imidazolium cation.

30. The process for producing cellulose esters according to claim 1, wherein said tetraalkylammonium alkylphosphate is represented by the following formula:

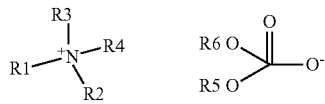

wherein $R_1$, $R_2$, $R_3$, and $R_4$
are independently selected from the group consisting of $C_1$-$C_5$ straight chain alkyl groups, $C_1$-$C_5$ branched alkyl groups, and $C_2$-$C_{20}$ alkoxy groups; and $R_5$ and $R_6$ are independently selected from the group consisting of hydrido, $C_1$-$C_5$ straight chain alkyl groups, $C_1$-$C_5$ branched alkyl groups, and $C_2$-$C_{20}$ alkoxy groups.

31. The process for producing cellulose esters according to claim 30, wherein $R_1$ is methyl or ethyl; $R_2$, $R_3$, and $R_4$ are different and independently selected from the group consisting of methyl, ethyl, propyl, butyl, isobutyl, pentyl; and $R^5$ and $R^6$ are independently selected from the group consisting of methyl, ethyl, propyl, and butyl.

32. The process for producing cellulose esters according to claim 30, wherein $R_1$ is methyl; $R_2$, $R_3$, and $R_4$ each are propyl or butyl; and $R_5$ and $R_6$ each are methyl or ethyl.

33. The process for producing cellulose esters according to claim 1, wherein said tetraalkylammonium alkylphosphate comprises tributylmethylammonium dimethylphosphate, tributylethylammonium diethylphosphate, tripropylmethylammonium dimethylphosphate, tripropylethylammonium diethyl phosphate, or mixtures thereof.

* * * * *